United States Patent
Zhang et al.

(10) Patent No.: US 12,089,249 B2
(45) Date of Patent: Sep. 10, 2024

(54) HIGH-PRIORITY DATA TRANSMISSION HANDLING

(71) Applicant: QUALCOMM Incorporated, San Diego, CA (US)

(72) Inventors: Qian Zhang, Basking Ridge, NJ (US); Junyi Li, Fairless Hills, PA (US); Yan Zhou, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 21 days.

(21) Appl. No.: 17/357,845

(22) Filed: Jun. 24, 2021

(65) Prior Publication Data

US 2022/0417955 A1    Dec. 29, 2022

(51) Int. Cl.
| | |
|---|---|
| *H04W 72/566* | (2023.01) |
| *H04B 7/0404* | (2017.01) |
| *H04B 7/06* | (2006.01) |
| *H04L 1/00* | (2006.01) |
| *H04L 5/00* | (2006.01) |
| *H04L 5/14* | (2006.01) |
| *H04W 52/26* | (2009.01) |
| *H04W 52/28* | (2009.01) |
| *H04W 52/42* | (2009.01) |
| *H04W 72/044* | (2023.01) |
| *H04W 72/0446* | (2023.01) |

(Continued)

(52) U.S. Cl.
CPC ......... *H04W 72/566* (2023.01); *H04L 1/0003* (2013.01); *H04W 72/046* (2013.01); *H04W 72/1273* (2013.01); *H04W 72/23* (2023.01)

(58) Field of Classification Search
CPC ........... H04W 72/1247; H04W 72/046; H04W 72/1273; H04W 72/14; H04L 1/0003
USPC ........................................................ 370/329
See application file for complete search history.

(56) References Cited

U.S. PATENT DOCUMENTS

| | | |
|---|---|---|
| 2018/0227958 A1 | 8/2018 | Xiong et al. |
| 2018/0262242 A1 * | 9/2018 | Chakraborty ........ H04B 7/0452 |

(Continued)

FOREIGN PATENT DOCUMENTS

| | | | |
|---|---|---|---|
| EP | 3454474 A1 * | 3/2019 | ............... H04B 7/02 |
| WO | 2017196246 A2 | 11/2017 | |

OTHER PUBLICATIONS

International Search Report and Written Opinion—PCT/US2022/031416—ISA/EPO—Sep. 5, 2022.

*Primary Examiner* — Xuan Lu

(74) *Attorney, Agent, or Firm* — Loza & Loza LLP

(57) ABSTRACT

A user equipment (UE) may obtain high-priority data (e.g., low latency data) to be transmitted to a base station. In some scenarios, the base station may be transmitting downlink transmissions to the UE or to a different UE, or may be receiving uplink transmissions from the UE or from the different UE. The described aspects enable the UE to timely transmit the high-priority data in these scenarios. In one example, the described aspects enable the UE to transmit, to the base station, while the base station performs one or more scheduled downlink transmissions to the UE or to the different UE, at least one of the high-priority data via a first uplink beam from a set of uplink beams for unscheduled uplink transmissions or an unscheduled data indication indicating that the high-priority data is to be transmitted without an uplink grant.

18 Claims, 52 Drawing Sheets

(51) Int. Cl.
    *H04W 72/1273*     (2023.01)
    *H04W 72/23*     (2023.01)
    *H04W 74/00*     (2009.01)
    *H04W 74/0808*     (2024.01)
    *H04W 74/0833*     (2024.01)

(56) References Cited

U.S. PATENT DOCUMENTS

| | | | | |
|---|---|---|---|---|
| 2018/0324768 | A1* | 11/2018 | Shaheen | H04W 72/042 |
| 2019/0014481 | A1* | 1/2019 | Yerramalli | H04W 74/0808 |
| 2019/0053227 | A1* | 2/2019 | Huang | H04W 72/0446 |
| 2019/0075584 | A1 | 3/2019 | Li et al. | |
| 2019/0199422 | A1* | 6/2019 | Li | H04W 72/046 |
| 2019/0363843 | A1* | 11/2019 | Gordaychik | H04W 52/58 |
| 2020/0037297 | A1* | 1/2020 | Pan | H04W 74/0833 |
| 2020/0059867 | A1* | 2/2020 | Haghighat | H04W 52/146 |
| 2020/0220582 | A1 | 7/2020 | Wu et al. | |
| 2020/0260486 | A1 | 8/2020 | Zhou et al. | |
| 2020/0336249 | A1 | 10/2020 | Yi et al. | |
| 2022/0279537 | A1* | 9/2022 | Freda | H04W 72/1284 |
| 2023/0098368 | A1* | 3/2023 | Yu | H04W 72/0446 370/281 |

* cited by examiner

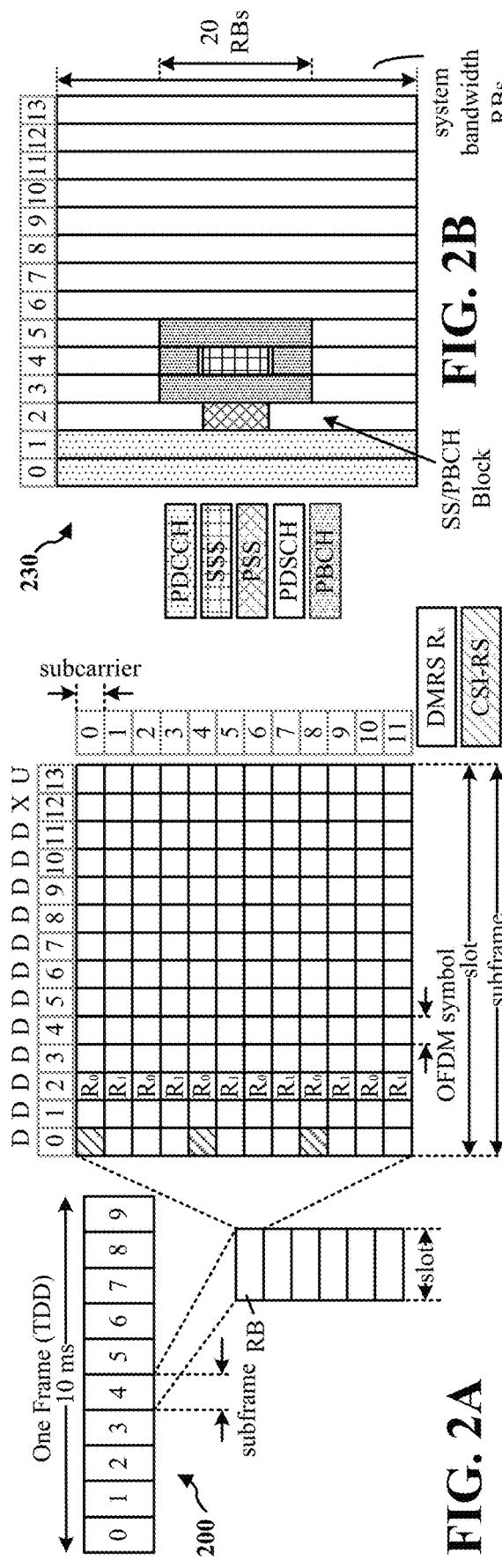
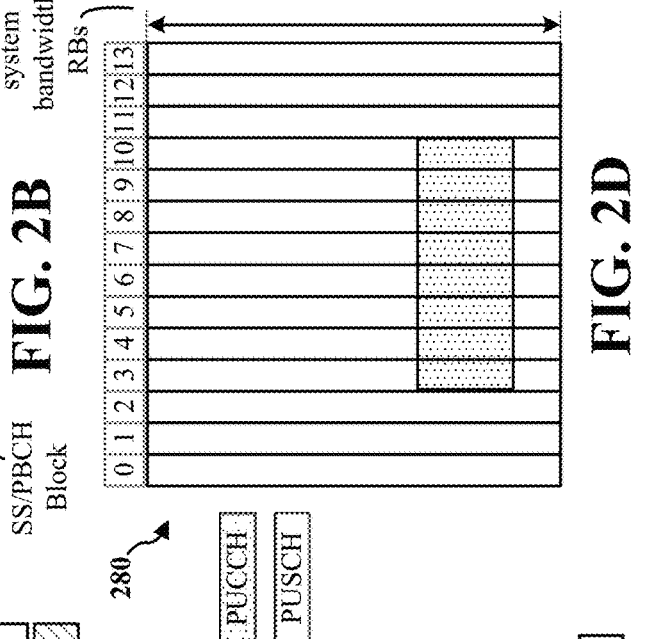
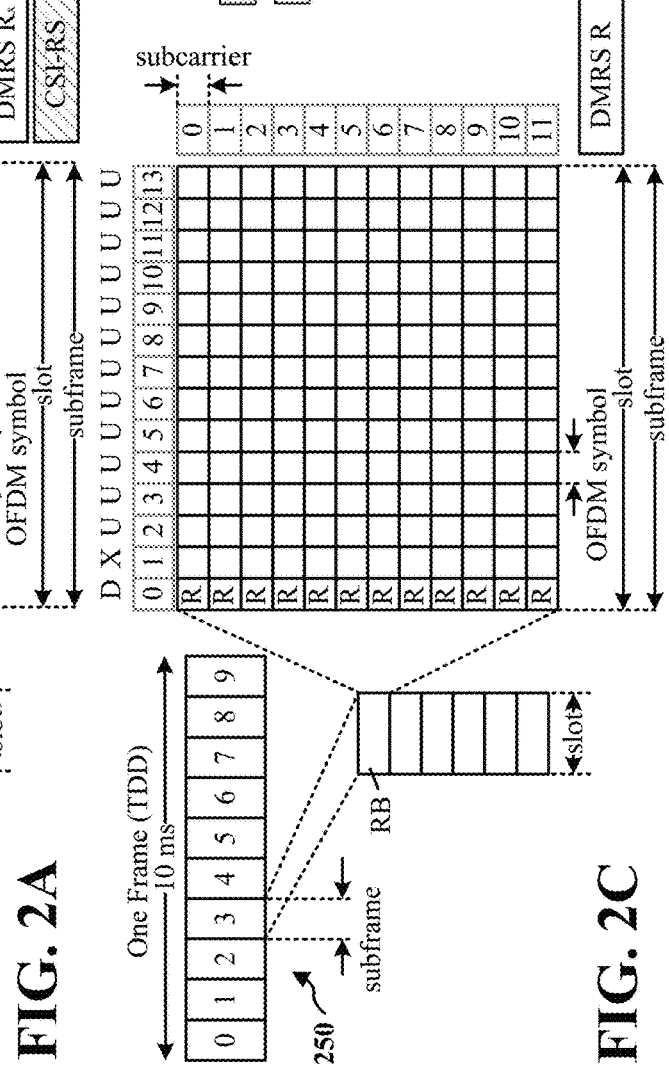
FIG. 2A  FIG. 2B  FIG. 2C  FIG. 2D

HIGH-PRIORITY DATA TRANSMISSION HANDLING

BACKGROUND

Technical Field

The present disclosure relates generally to communication systems, and more particularly, to high-priority data transmission handling.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

A user equipment (UE) may transmit data to a base station using resources (e.g., time-frequency resources) allocated to the UE by the base station. For example, the UE may receive an uplink (UL) grant that schedules one or more uplink transmissions for the UE, and the UE may transmit the data based on the uplink grant.

In some scenarios, a UE may obtain high-priority data (also referred to as low latency data, urgent data, or urgent traffic), such as ultra reliable low latency communications (URLLC) data, and may need to transmit the high-priority data to the base station within the delay tolerance of the high-priority data. However, if the base station has already scheduled uplink transmissions or downlink (DL) transmissions for the UE or for a different UE and is currently receiving the uplink transmissions or transmitting the downlink transmissions, the UE may not be able to timely transit the high-priority data to the base station. In other words, the UE may have to wait until the scheduled uplink or downlink transmissions are completed before the UE is allowed to transmit the high-priority data. This may delay the transmission of the high-priority data and degrade the performance of the UE. The aspects disclosed herein may overcome these issues.

In an aspect of the disclosure, a method, a computer-readable medium, and a first apparatus are provided. The first apparatus may be a UE. The first apparatus obtains high-priority data to be transmitted to a base station operating in a full-duplex mode. The first apparatus transmits, to the base station while the base station performs one or more scheduled downlink transmissions to the first apparatus or to a second apparatus, at least one of the high-priority data via a first uplink beam from a set of uplink beams for unscheduled uplink transmissions or an unscheduled data indication indicating that the high-priority data is to be transmitted without an uplink grant.

In an aspect of the disclosure, a method, a computer-readable medium, and a first apparatus are provided. The first apparatus may be a UE. The first apparatus obtains high-priority data to be transmitted to a base station. The first apparatus transmits, to the base station while the base station receives one or more scheduled uplink transmissions from the first apparatus or a second apparatus, at least one of: the high-priority data using a first transmit power greater than a second transmit power of the one or more scheduled uplink transmissions or using a first uplink beam from a set of uplink beams for unscheduled uplink transmissions, or an unscheduled data indication indicating that the high-priority data is to be transmitted without an uplink grant.

In an aspect of the disclosure, a method, a computer-readable medium, and an apparatus are provided. The apparatus may be a base station. The apparatus performs one or more scheduled downlink transmissions to a first user equipment (UE). The apparatus receives, from the first UE or a second UE during the one or more scheduled downlink transmissions, at least one of high-priority data in an uplink beam from a set of uplink beams for unscheduled uplink transmissions or an unscheduled data indication indicating that the first UE or the second UE is to transmit the high-priority data to the apparatus.

In some aspects of the disclosure, the apparatus further receives a scheduling request for high-priority data to be transmitted to the apparatus, wherein the scheduling request is received in one of a plurality of scheduling request transmission occasions configured for at least the first UE or the second UE, and wherein a time between any two consecutive scheduling request transmission occasions in the plurality of scheduling request transmission occasions is configured to be less than or equal to an acceptable latency for the high-priority data. The apparatus transmits a high-priority uplink grant in response to the scheduling request, wherein the high-priority data is received based on the high-priority uplink grant.

In some examples, the unscheduled data indication includes a unique indication sequence associated with the first UE or the second UE. In some examples, the apparatus receives the high-priority data within a threshold time after the unscheduled data indication.

In some aspects of the disclosure, the unscheduled data indication is received from the first UE or the second UE. In these aspects, the apparatus transmits at least one of an uplink modulation and coding scheme (MCS), a transmit power configuration, or an uplink beam configuration to the first UE or the second UE for the high-priority data in response to the unscheduled data indication, wherein the MCS, the transmit power configuration, or the uplink beam configuration enables the apparatus to receive the high-priority data in the full-duplex mode. The apparatus receives the high-priority data based on at least one of the uplink MCS, the transmit power configuration, or the uplink beam configuration.

In some aspects of the disclosure, the apparatus transmits a beam information message to at least the second UE indicating an association between a downlink beam used for the one or more scheduled downlink transmissions and the set of uplink beams, wherein the set of uplink beams is for the second UE or a group of UEs including the second UE.

In some examples, the high-priority data is received in a periodic uplink resource allocation associated with a configured grant, wherein a periodicity of the periodic uplink resource allocation is configured to be less than or equal to an acceptable latency for the high-priority data.

In some examples, the configured grant is associated with at least a second uplink beam of the second UE.

In some aspects of the disclosure, the apparatus receives the unscheduled data indication. In some aspects, the apparatus cancels the one or more scheduled downlink transmissions to the first UE in response to the unscheduled data indication. In other aspects, the apparatus reconfigures a downlink transmission configuration for the one or more scheduled downlink transmissions in response to the unscheduled data indication. The downlink transmission configuration includes at least one of an MCS or a transmit power for the one or more scheduled downlink transmissions. The reconfigured downlink transmission configuration enables the apparatus to receive the high-priority data in the full-duplex mode.

In some aspects of the disclosure, the apparatus configures at least the first UE with a first unique indication sequence or the second UE with a second unique indication sequence, wherein the unscheduled data indication includes the first unique indication sequence or the second unique indication sequence. The apparatus determines whether the first UE or the second UE is to transmit the high-priority data to the apparatus based on the first unique indication sequence or the second unique indication sequence.

In an aspect of the disclosure, a method, a computer-readable medium, and an apparatus are provided. The apparatus may be a base station. The apparatus receives one or more scheduled uplink transmissions from a first user equipment (UE). The apparatus receives, from a second UE during the one or more scheduled uplink transmissions, at least one of high-priority data transmitted with a first transmit power greater than a second transmit power of the one or more scheduled uplink transmissions or transmitted via a first uplink beam from a set of uplink beams for unscheduled uplink transmissions, or an unscheduled data indication indicating that the high-priority data is to be transmitted without an uplink grant.

In some aspects of the disclosure, the apparatus further receives a scheduling request for high-priority data to be transmitted to the apparatus, wherein the scheduling request is received in one of a plurality of scheduling request transmission occasions configured for the second UE, and wherein a time between any two consecutive scheduling request transmission occasions in the plurality of scheduling request transmission occasions is configured to be less than or equal to an acceptable latency for the high-priority data. The apparatus transmits a high-priority uplink grant in response to the scheduling request, wherein the high-priority data is received based on the high-priority uplink grant.

In some aspects of the disclosure, the unscheduled data indication includes one or more indication bits preconfigured for the second UE or a unique indication sequence associated with the second UE.

In some aspects of the disclosure, the apparatus receives the unscheduled data indication. In some aspects, the apparatus cancels the one or more scheduled uplink transmissions from the first UE in response to the unscheduled data indication. In other aspects, the apparatus reconfigures an uplink transmission configuration for the one or more scheduled uplink transmissions in response to the unscheduled data indication, the uplink transmission configuration including at least one of an MCS, an uplink beam configuration, or a transmit power for the one or more scheduled uplink transmissions from the first UE, wherein the reconfigured uplink transmission configuration enables the apparatus to receive the high-priority data.

In some aspects of the disclosure, the apparatus receives the high-priority data within a threshold time after the unscheduled data indication.

In some aspects of the disclosure, the unscheduled data indication is received from the second UE. In these aspects, the apparatus transmits at least one of an uplink MCS, a transmit power configuration, or an uplink beam configuration for transmission of the high-priority data in response to the unscheduled data indication, wherein the at least one of the uplink MCS, the transmit power configuration, or the uplink beam configuration enables the apparatus to receive the high-priority data.

In some aspects of the disclosure, the apparatus configures a periodicity of a periodic uplink resource allocation associated with a configured grant for the high-priority data to be less than or equal to an acceptable latency for the high-priority data, wherein the high-priority data is received from the second UE in the periodic uplink resource allocation associated with the configured grant.

In some aspects of the disclosure, the configured grant is associated with at least a second uplink beam of the first UE.

In some aspects of the disclosure, the apparatus transmits a beam information message to at least the second UE indicating an association between an uplink beam used for the one or more scheduled uplink transmissions and the set of uplink beams, wherein the set of uplink beams is for the second UE or a group of UEs including the second UE.

In some examples, the unscheduled data indication is received using at least one of a frequency division multiplexing (FDM) configuration, a space division multiplexing (SDM) configuration, or a transmit power that enables reception of the unscheduled data indication.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIGS. 2A, 2B, 2C, and 2D are diagrams illustrating examples of a first 5G/NR frame, DL channels within a 5G/NR subframe, a second 5G/NR frame, and UL channels within a 5G/NR subframe, respectively.

DETAILED DESCRIPTION

Figure 1:
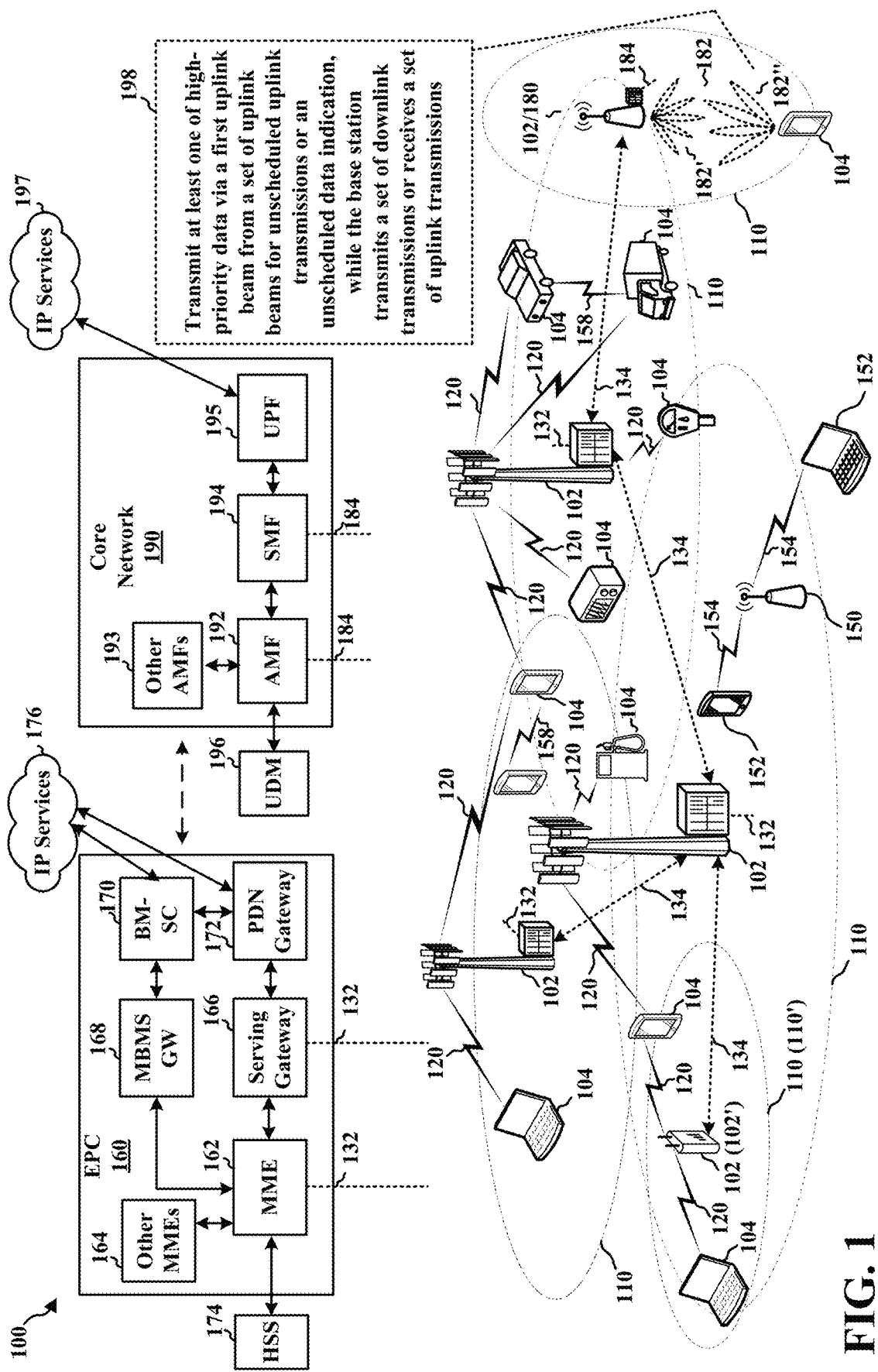
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through backhaul links 132 (e.g., S1 interface). The base stations 102 configured for 5G NR (collectively referred to as Next Generation RAN (NG-RAN)) may interface with core network 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or another type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band (e.g., 3 GHz-300 GHz) has extremely high path loss and a short range. The mmW base station 180 may utilize beamforming 182 with the UE 104 to compensate for the extremely high path loss and short range.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104 may be configured to transmit at least one of high-priority data via a first uplink beam from a set of uplink beams for unscheduled uplink transmissions or an unscheduled data indication, while the base station transmits a set of downlink transmissions or receives a set of uplink transmissions (198). Although the following description may be focused on 5G NR, the concepts described herein may be applicable to other similar areas, such as LTE, LTE-A, CDMA, GSM, and other wireless technologies.

FIG. 2A is a diagram 200 illustrating an example of a first subframe within a 5G/NR frame structure. FIG. 2B is a diagram 230 illustrating an example of DL channels within a 5G/NR subframe. FIG. 2C is a diagram 250 illustrating an example of a second subframe within a 5G/NR frame structure. FIG. 2D is a diagram 280 illustrating an example of UL channels within a 5G/NR subframe. The 5G/NR frame structure may be FDD in which for a particular set of subcarriers (carrier system bandwidth), subframes within the set of subcarriers are dedicated for either DL or UL, or may be TDD in which for a particular set of subcarriers (carrier system bandwidth), subframes within the set of subcarriers are dedicated for both DL and UL. In the examples provided by FIGS. 2A, 2C, the 5G/NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G/NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies $\mu$ 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2^\mu$ slots/subframe. The subcarrier spacing and symbol length/duration are a function of the numerology. The subcarrier spacing may be equal to $2^\mu *15$ kKz, where $\mu$ is the numerology 0 to 5. As such, the numerology $\mu=0$ has a subcarrier spacing of 15 kHz and the numerology $\mu=5$ has a subcarrier spacing of 480 kHz. The symbol length/duration is inversely related to the subcarrier spacing. FIGS. 2A-2D provide an example of slot configuration 0 with 14 symbols per slot and numerology $\mu=0$ with 1 slot per subframe. The subcarrier spacing is 15 kHz and symbol duration is approximately 66.7 $\mu$s.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as $R_x$ for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. Although not shown, the UE may transmit sounding reference signals (SRS). The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
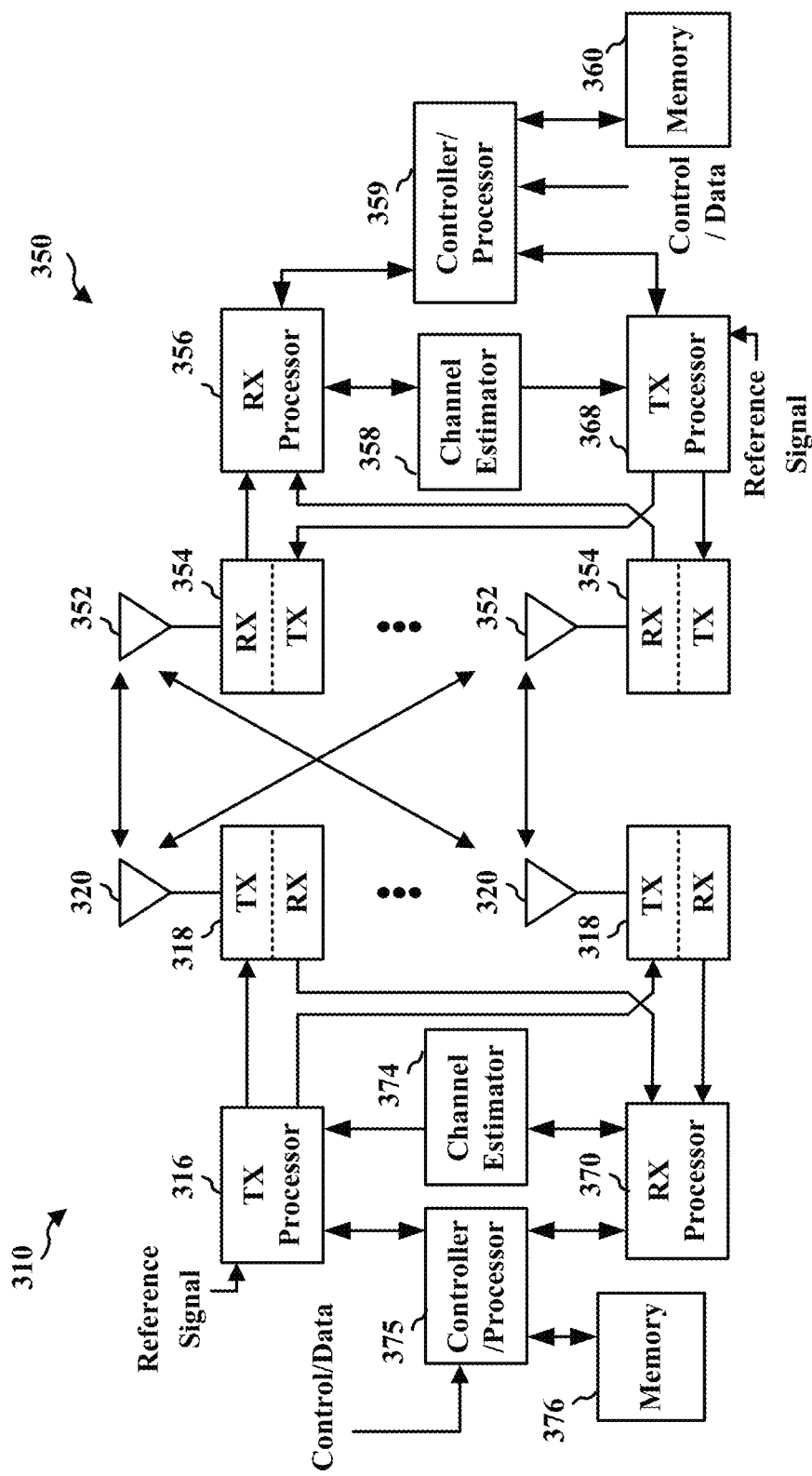
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with 198 of FIG. 1.

A base station and/or a UE may operate in the full-duplex (FD) mode enabling concurrent uplink and downlink transmissions in a given frequency range (e.g., Frequency Range 2 (FR2) including bands in the range 24.25 to 52.6 GHz). In some examples, integrated access and backhaul (IAB) nodes may operate in the full-duplex mode enabling concurrent transmission and reception between the IAB nodes. In other examples, a UE and a relay node may operate in the full-duplex mode enabling concurrent transmission and reception over an access link.

For example, a UE including first and second antenna panels may use its first antenna panel for uplink transmissions and may use its second antenna panel to receive downlink transmissions from a base station. As another example, a base station including first and second antenna panels may use its first antenna panel for downlink transmissions and may use its second antenna panel to receive uplink transmissions from a UE.

Full-duplex mode capability at a UE or a base station may be conditional on beam separation. For example, when a UE is transmitting uplink transmissions and is concurrently receiving downlink transmissions from a base station, the uplink transmissions may cause self-interference at the UE and may prevent successful reception of the downlink transmissions. In another example, when the base station is transmitting downlink transmissions and is concurrently receiving uplink transmissions from the UE, the downlink transmissions may cause self-interference at the base station and may prevent successful reception of the uplink transmissions. In other examples, clutter echoes may impact full-duplex mode operation at the UE or base station.

Since full-duplex mode operation may enable concurrent uplink and downlink transmissions at a UE and/or base station, communication latencies may be significantly reduced. For example, a UE may receive a downlink transmission in a slot or subframe designated for uplink transmissions. Moreover, full-duplex operation may enhance spectrum efficiency for a cell and/or a UE and may provide more efficient resource utilization.

Figure 4:
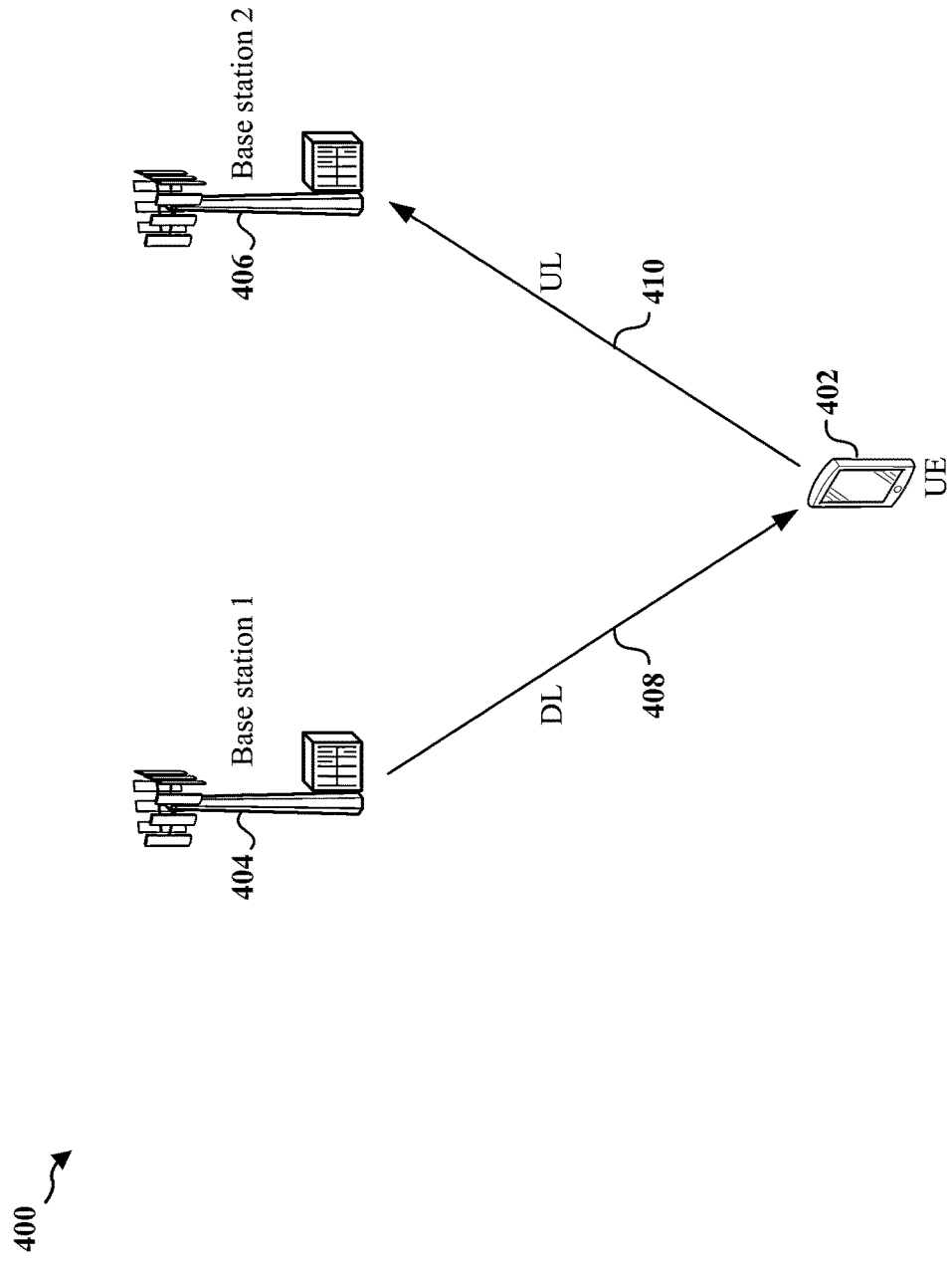
FIG. 4 illustrates an example network including a UE, a first base station, and a second base station.

FIG. 4 illustrates an example network 400 including a user equipment (UE) 402, a first base station 404, and a second base station 406. In the full-duplex mode use case shown in FIG. 4, the UE 402 may be operating in the full-duplex mode and the first and second base stations 404, 406 may be operating in a half-duplex mode. The UE 402 may receive downlink transmissions (e.g., downlink transmission 408) from the first base station 404 while concurrently transmitting uplink transmissions (e.g., uplink transmission 410) to the second base station 406. In the example of FIG. 4, the UE 402 may implement a flexible TDD scheme while the first and second base stations 404, 406 may not implement a flexible TDD scheme.

Figure 5:
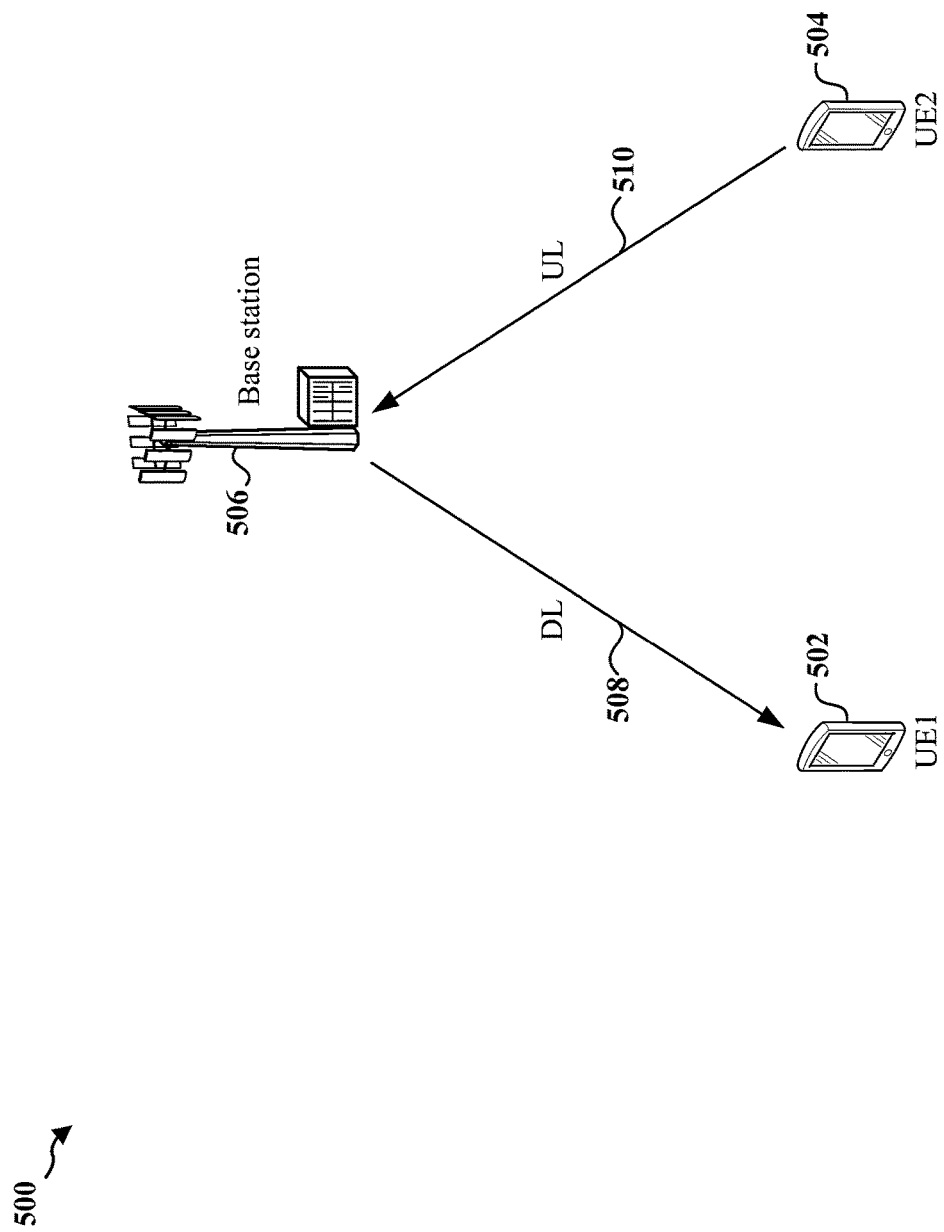
FIG. 5 illustrates an example network including a first UE, a second UE, and a base station.

FIG. 5 illustrates an example network 500 including a first user equipment (UE) 502, a second user equipment 504, and a base station 506. In the full-duplex mode use case shown in FIG. 5, the base station 506 may be operating in the full-duplex mode and the first and second UEs may be operating in a half-duplex mode. The base station 506 may transmit downlink transmissions (e.g., downlink transmission 508) to the first UE 502 while concurrently receiving uplink transmissions (e.g., uplink transmission 510) from the second UE 504. In the example of FIG. 5, the base station 506 may implement a flexible TDD scheme while the first and second UEs 502, 504 may not implement a flexible TDD scheme.

Figure 6:
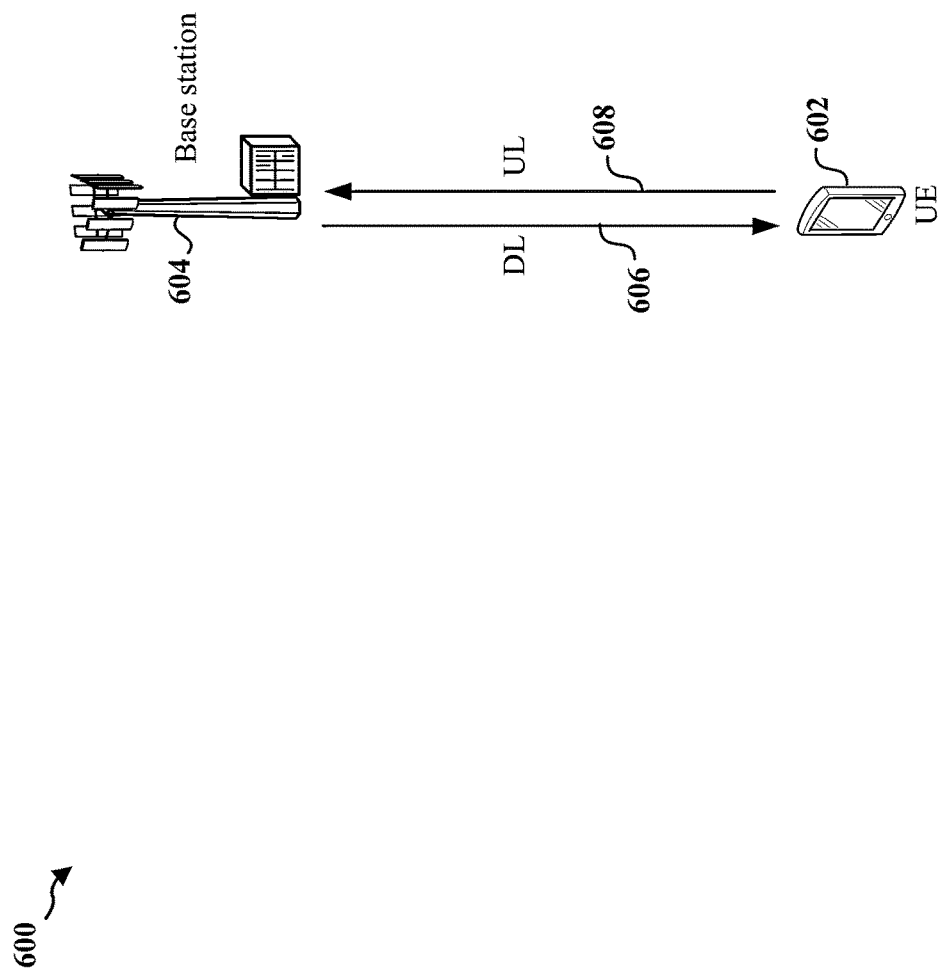
FIG. 6 illustrates an example network including a UE and a base station.

FIG. 6 illustrates an example network 600 including a user equipment (UE) 602 and a base station 604. In the full-duplex mode use case shown in FIG. 6, both the UE 602 and the base station 604 may be operating in the full-duplex mode. For example, the UE 602 may receive downlink transmissions (e.g., downlink transmission 606) from the base station 604 and may concurrently transmit uplink transmissions (e.g., uplink transmission 608) to the base station 604. Accordingly, the base station 604 may transmit downlink transmissions (e.g., downlink transmission 606) to the UE 602 and may concurrently receive uplink transmissions (e.g., uplink transmission 608) from the UE 602. In the example of FIG. 6, both the UE 602 and the base station 604 may implement a flexible TDD scheme.

Figure 7:
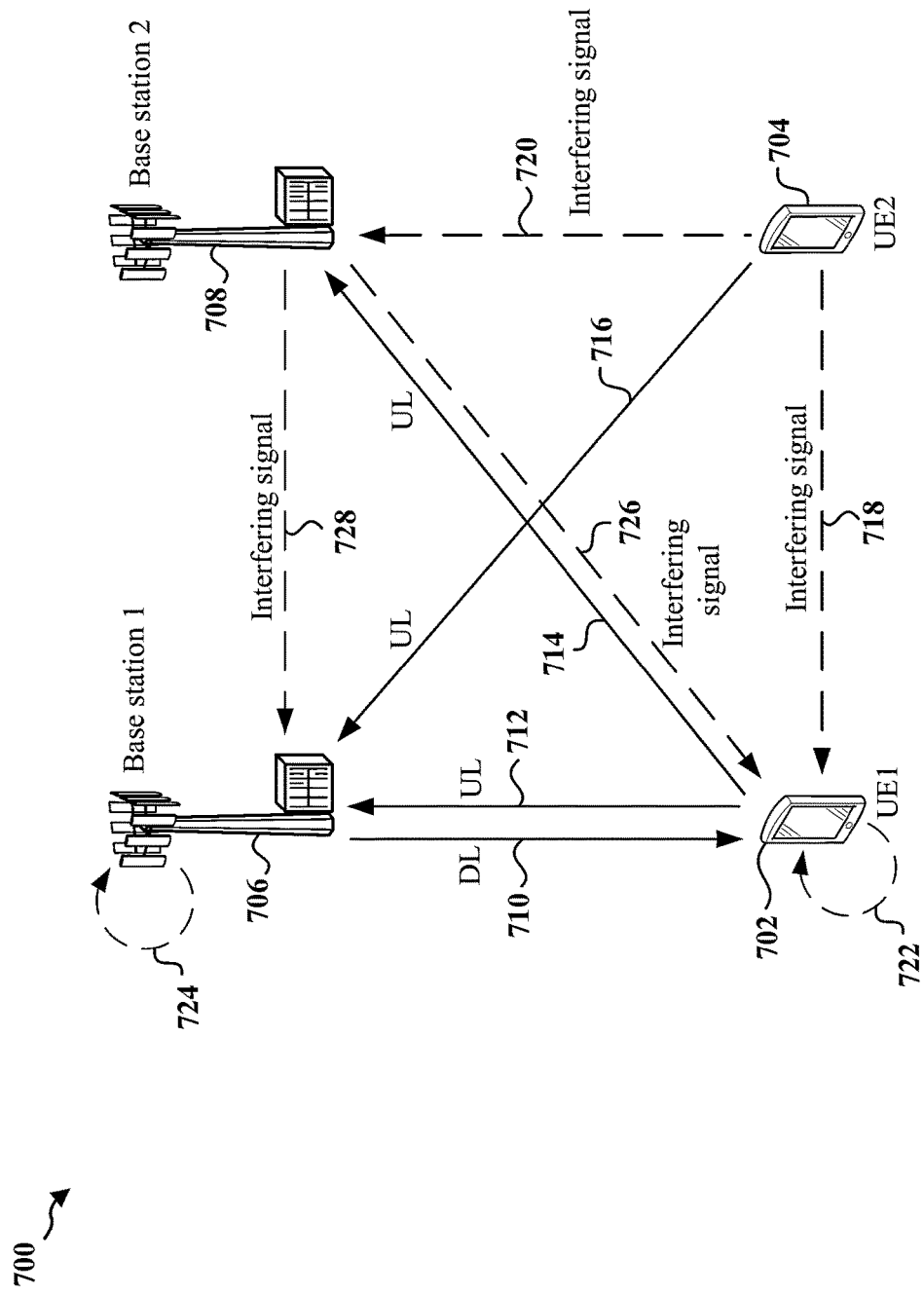
FIG. 7 illustrates an example network including a first UE, a second UE, a first base station, and a second base station.

FIG. 7 illustrates an example network 700 including a first UE 702, a second UE 704, a first base station 706, and a second base station 708. In a first scenario, the first UE 702 may be operating in the full-duplex mode and the first and second base stations 706, 708 may be operating in the half-duplex mode. In this scenario, the first UE 702 may receive downlink transmissions (e.g., downlink transmission 710) from the first base station 706 while concurrently transmitting uplink transmissions (e.g., uplink transmission 714) to the second base station 708.

The first UE 702 may experience interference from interfering signals 718, 722, 726 when receiving the downlink transmission 710. For example, the interfering signal 718 may result from the uplink transmission 716 from the second UE 704, the interfering signal 722 (also referred to as a self-interfering signal) may result from the uplink transmission 714, and the interfering signal 726 may result from a downlink transmission from the second base station 708. The second base station 708 may experience interference from interfering signal 720 when receiving the uplink transmission 714. For example, the interfering signal 720 may result from the uplink transmission 716 from the second UE 704.

In a second scenario, with reference to FIG. 7, the first base station 706 may be operating in the full-duplex mode and the first and second UEs 702, 704 may be operating in the half-duplex mode. In this scenario, the first base station 706 may transmit downlink transmissions (e.g., downlink transmission 710) to the first UE 702 while concurrently receiving uplink transmissions (e.g., uplink transmission 716) from the second UE 704. The first base station 706 may experience interference from interfering signals 724, 728 when receiving the uplink transmission 716. For example, the interfering signal 728 may result from a downlink transmission from the second base station 708, and the interfering signal 724 may result from the downlink transmission 710 to the first UE 702.

In a third scenario, with reference to FIG. 7, both the first UE 702 and the first base station 706 may be operating in the full-duplex mode. In this scenario, the first UE 702 may receive downlink transmissions (e.g., downlink transmission 710) from the first base station 706 while concurrently transmitting uplink transmissions (e.g., uplink transmission 712) to the first base station 706. Accordingly, the first base station 706 may transmit downlink transmissions (e.g., downlink transmission 710) to the first UE 702 while concurrently receiving uplink transmissions (e.g., uplink transmission 712) from the first UE 702. The first UE 702 may experience interference from interfering signals 718, 722, 726 when receiving the downlink transmission 710. The first base station 706 may experience interference from interfering signals 724, 728 and the uplink transmission 716 when receiving the uplink transmission 712.

Figure 8:
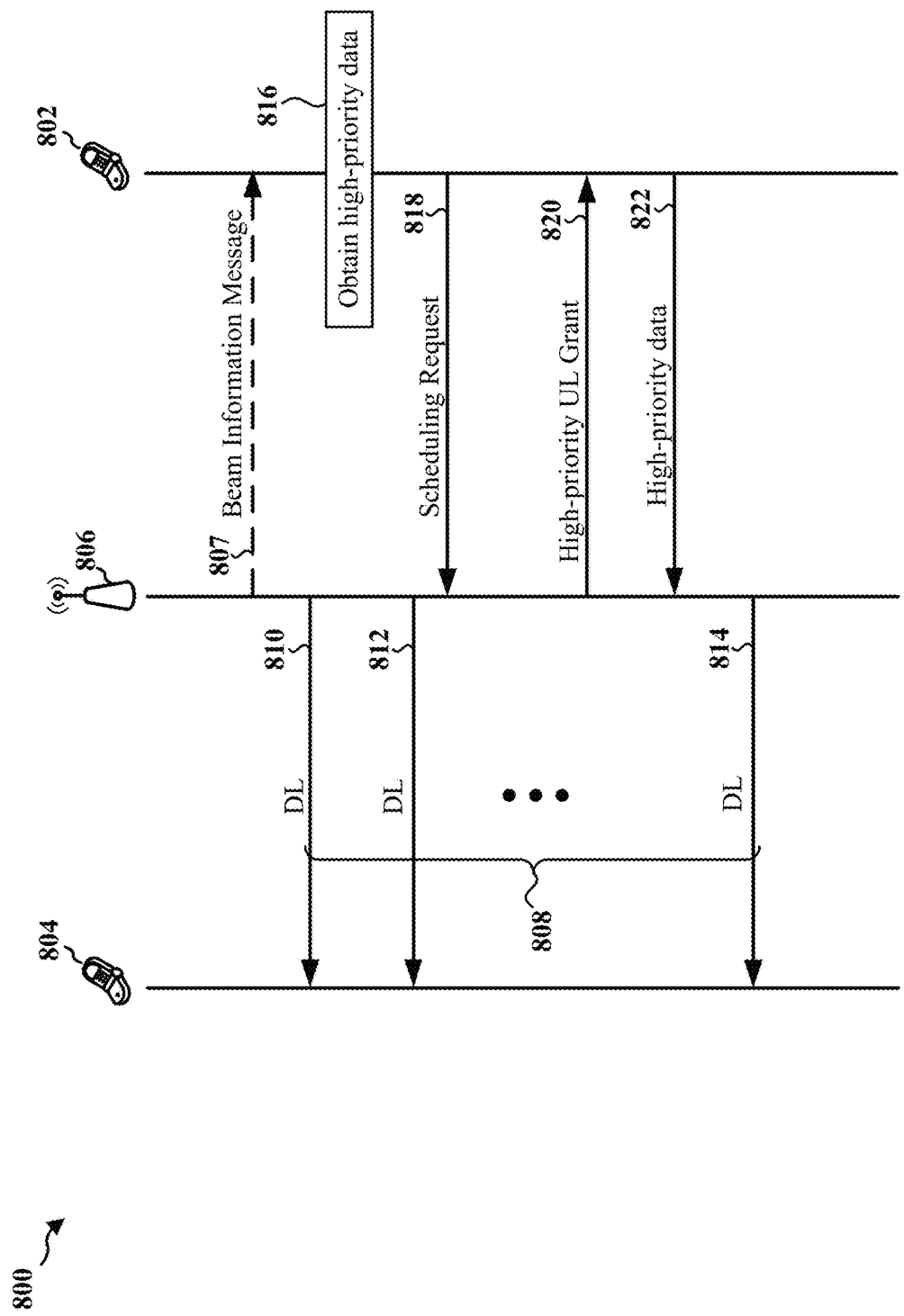
FIG. 8 illustrates a signal flow diagram in accordance with various aspects of the present disclosure.

FIG. 8 illustrates a signal flow diagram 800 in accordance with various aspects of the present disclosure. FIG. 8 includes a first UE 802, a second UE 804, and a base station 806. In some aspects of the disclosure, the base station 806 may be operating in the full-duplex mode. In some examples, the base station 806 may schedule a set of downlink (DL) transmissions 808 (also referred to as a scheduled set of downlink transmissions) to the second UE 804. The scheduled set of downlink transmissions 808 may include one or more downlink transmissions, such as a first DL transmission 810, a second downlink transmission 812, and an nth DL transmission 814.

The base station 806 may optionally transmit a beam information message 807 to the first UE 802. As described in detail herein with reference to the beam information message 1110 or 1112 in FIG. 11, the beam information message 807 may indicate a pairing or association between a downlink beam and a set of uplink beams for unscheduled uplink transmissions. The downlink beam (e.g., the downlink beam used for the scheduled set of downlink transmissions 808) may be associated with a specific UE (e.g., the second UE 804) and the set of uplink beams for unscheduled uplink transmissions may be associated with a different UE (e.g., the first UE 802) or a group of different UEs.

At 816, the first UE 802 may obtain high-priority data to be transmitted to the base station 806. In the aspects described herein, the term high-priority data (also referred to as urgent data or urgent traffic) may refer to low-latency data. For example, high-priority data may include URLLC data. In some examples, the amount of high-priority data to be transmitted from a UE (e.g., the first UE 802) to a base station (e.g., the base station 806) may be less than or equal to a threshold amount. In some examples, the high-priority data to be transmitted from a UE (e.g., the first UE 802) to a base station may be a part of bursty and/or low data rate traffic.

In some examples, a UE (e.g., the first UE 802) may obtain the high-priority data by generating the high-priority data, receiving the high-priority data, and/or fetching the high-priority data. In one example, the UE may generate the high-priority data at a processor (e.g., the processor 4104) of the UE. In this example, an application running in the processor of the UE may cause the processor to output the high-priority data for transmission on the uplink.

In another example, the UE may receive the high-priority data from an external source, such as a sensor device, a wireless communication device, or other suitable device capable of transmitting the high-priority data to the UE. In another example, the UE may fetch the high-priority data from an internal or external memory device.

In some aspects of the disclosure, the base station 806 may not be informed that the first UE 802 has obtained the high-priority data at 816. The first UE 802 may transmit a scheduling request 818 to the base station 806 to receive an uplink (UL) resource allocation (e.g., a high-priority UL grant).

As shown in FIG. 8, the first UE 802 may transmit the scheduling request 818 to the base station 806 while the base station 806 transmits the scheduled set of downlink transmissions 808 to the second UE 804. Since the base station 806 is operating in the full-duplex mode, the base station 806 may receive the scheduling request 818 from the first UE 802 while transmitting the scheduled set of downlink transmissions 808 to the second UE 804. In some examples, the first UE 802 may transmit the scheduling request in one of a number of scheduling request transmission occasions using one or more resources (e.g., time-frequency resources) for the scheduling request. A time between any two consecutive scheduling request transmission occasions in the plurality of scheduling request transmission occasions may be configured to be less than or equal to an acceptable latency for the high-priority data.

In the aspects described herein, an acceptable latency for high-priority data may be based on the use case scenario of the high-priority data. In some example use case scenarios, if the high-priority data is associated with a mission-critical service or an application where URLLC services are needed, the acceptable latency for the high-priority data may be less than or equal to 1 ms. In other use case scenarios, the acceptable latency for the high-priority data may be within a range of 1 ms to 2 ms.

The base station 806 may transmit a high-priority uplink (UL) grant 820 to the first UE 802. The first UE 802 may transmit the high-priority data (e.g., the high-priority data obtained at 816) in an uplink transmission 822 based on the high-priority uplink grant 820. For example, the high-priority uplink grant 820 may include an uplink resource allocation that the first UE 802 can use for the uplink transmission 822. In some examples, the first UE 802 may transmit the high-priority data in an uplink transmission 822 using an uplink beam from the set of uplink beams for unscheduled uplink transmissions indicated in the beam information message 807.

Figure 9:
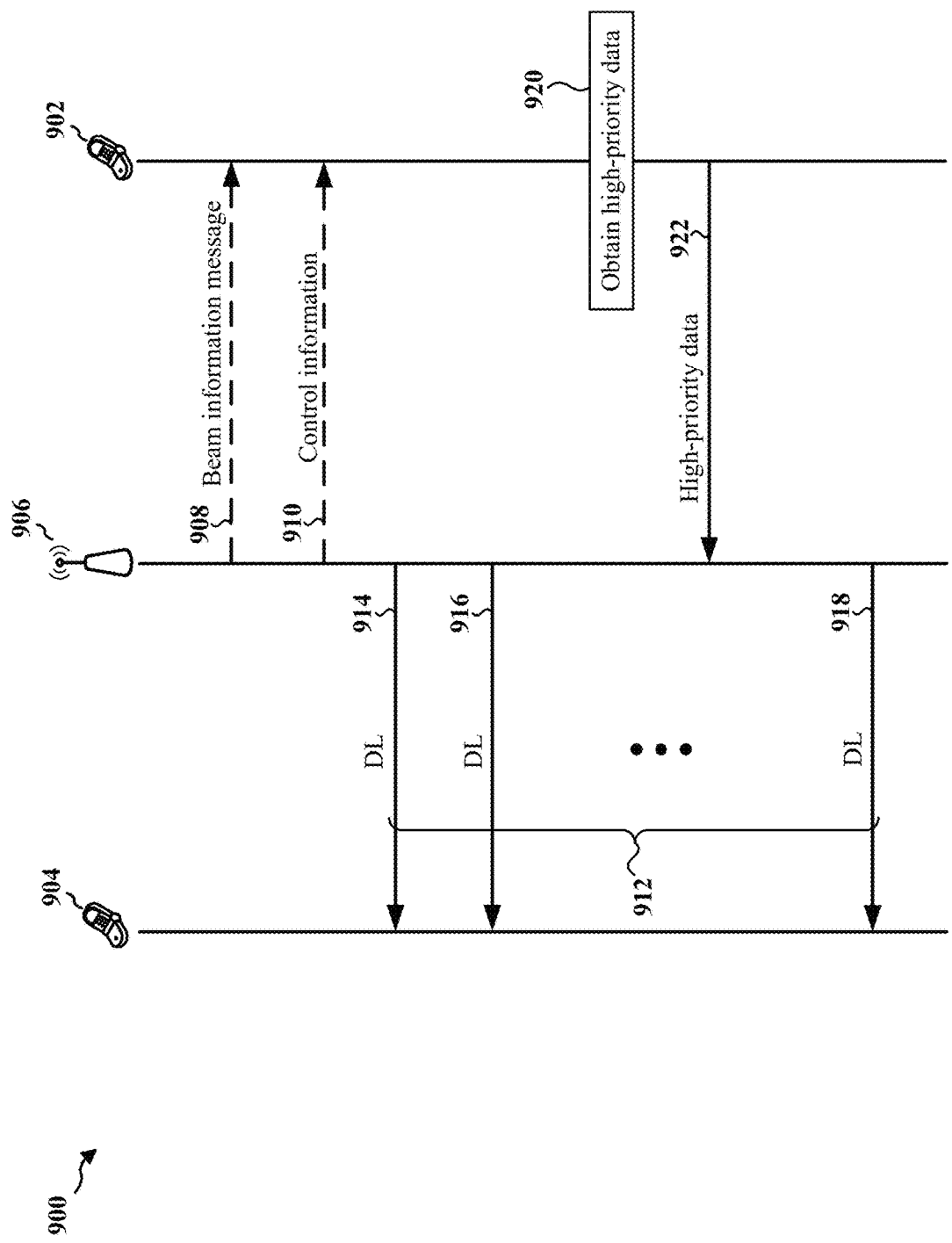
FIG. 9 illustrates a signal flow diagram in accordance with various aspects of the present disclosure.

FIG. 9 illustrates a signal flow diagram 900 in accordance with various aspects of the present disclosure. FIG. 9 includes a first UE 902, a second UE 904, and a base station 906. In some aspects of the disclosure, the base station 906 may be operating in a full-duplex mode. The base station 906 may optionally transmit a beam information message 908 to the first UE 902. As described in detail herein with reference to the beam information message 1110 or 1112 in FIG. 11, the beam information message 908 may indicate a pairing or association between a downlink beam and a set of uplink beams for unscheduled uplink transmissions. The downlink beam (e.g., the downlink beam used for the scheduled set of downlink transmissions 912) may be associated with a specific UE (e.g., the second UE 904) and the set of uplink beams for unscheduled uplink transmissions may be associated with a different UE (e.g., the first UE 902) or a group of different UEs.

The base station 906 may further optionally transmit control information 910 to the first UE 902 including a configured grant (CG) for uplink transmissions. The configured grant may indicate a periodic uplink resource for the first UE 902 and a periodicity of the periodic uplink resource. In some examples, the base station 906 may transmit the control information 910 including the configured grant whether or not the first UE 902 has data to be transmitted to the base station 906. The configured grant may be associated with at least one beam of the first UE 902 or a beam sweep operation of the at least one beam of the first UE 902.

The base station 906 may schedule a set of downlink (DL) transmissions 912 (also referred to as a scheduled set of downlink (DL) transmissions) to the second UE 904. The set of downlink transmissions 912 may include one or more downlink transmissions, such as a first downlink transmission 914, a second downlink transmission 916, and an nth downlink transmission 918.

At 920, the first UE 902 may obtain high-priority data to be transmitted to the base station 906. In some aspects of the disclosure, the base station 906 may not be informed that the first UE 902 has obtained the high-priority data at 920.

Figure 10:
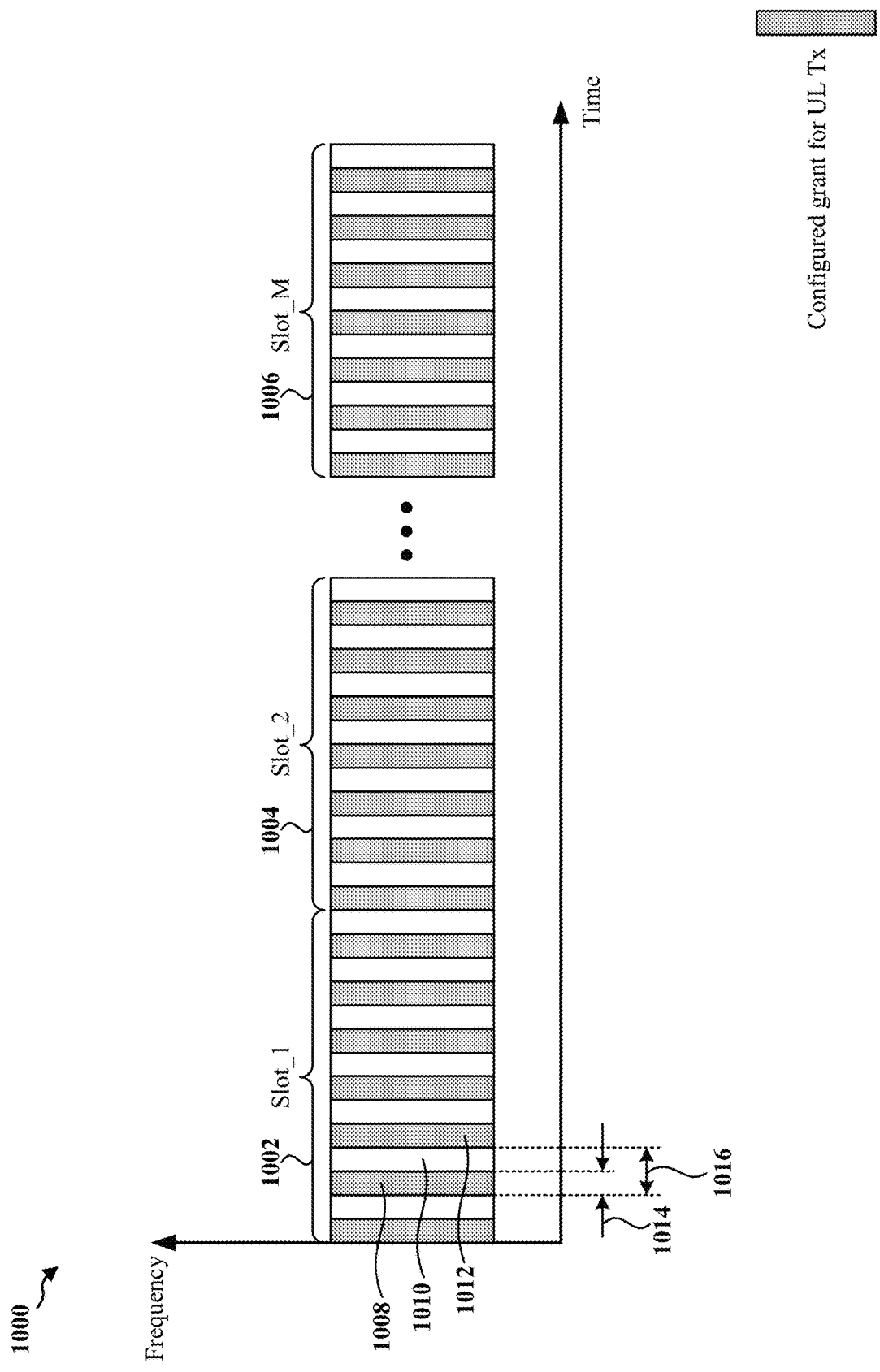
FIG. 10 illustrates an exemplary configured grant for the first UE.

The first UE 902 may transmit the high-priority data obtained at 920 in an uplink transmission 922 using the periodic uplink resource associated with the configured grant. For example, FIG. 10 illustrates an exemplary configured grant for the first UE 902. In FIG. 10, each slot (e.g., slot_1 1002, slot_2 1004, slot_M 1006, where M is an integer greater than or equal to 3) may include 14 symbols, such as symbols 1008, 1010, 1012. Each symbol (e.g., symbols 1008, 1010, 1012) may have a symbol duration 1014.

In one example, the base station 906 may configure the first UE 902 (e.g., via the control information 910) with a configured grant that periodically allocates an uplink resource to the first UE 902 in alternating symbols. For example, the shaded symbols in FIG. 10 (e.g., symbols 1008 and 1012) may include uplink resources, and the non-shaded symbols (e.g., symbol 1010) may not include uplink resources. When the base station 906 implements a configured grant, the periodic uplink resources may be allocated for the first UE 902 without the need for a scheduling request from the first UE 902 and/or may be allocated whether or not the first UE 902 has data to transmit on the uplink.

The periodicity 1016 of the uplink resource associated with the configured grant may be configured to be less than or equal to an acceptable latency for the high-priority data. In some examples, the acceptable latency for the high-priority data may be less than or equal to 1 ms. This may ensure that the first UE 902 has timely access to an uplink resource after obtaining the high-priority data to meet the latency requirements of the high-priority data. For example, if the first UE 902 obtains the high-priority data (e.g., at 920 in FIG. 9) during the symbol 1010, the periodicity 1016 in FIG. 10 may enable the first UE 902 to transmit the high-priority data in the subsequent symbol 1012. In some examples, if the high-priority data obtained at 920 in FIG. 9 has higher latency requirements, the periodicity 1016 in FIG. 10 may be lower than is shown in FIG. 10. In these examples, an uplink resource may be available to the first UE 902 in every symbol. In some examples, if the high-priority data obtained at 920 in FIG. 9 can tolerate larger delays, the periodicity 1016 in FIG. 10 may be greater than is shown in FIG. 10.

In some examples, the first UE 902 may transmit the high-priority data in an uplink transmission 922 using an uplink beam from the set of uplink beams for unscheduled uplink transmissions indicated in the beam information message 908.

Figure 11:
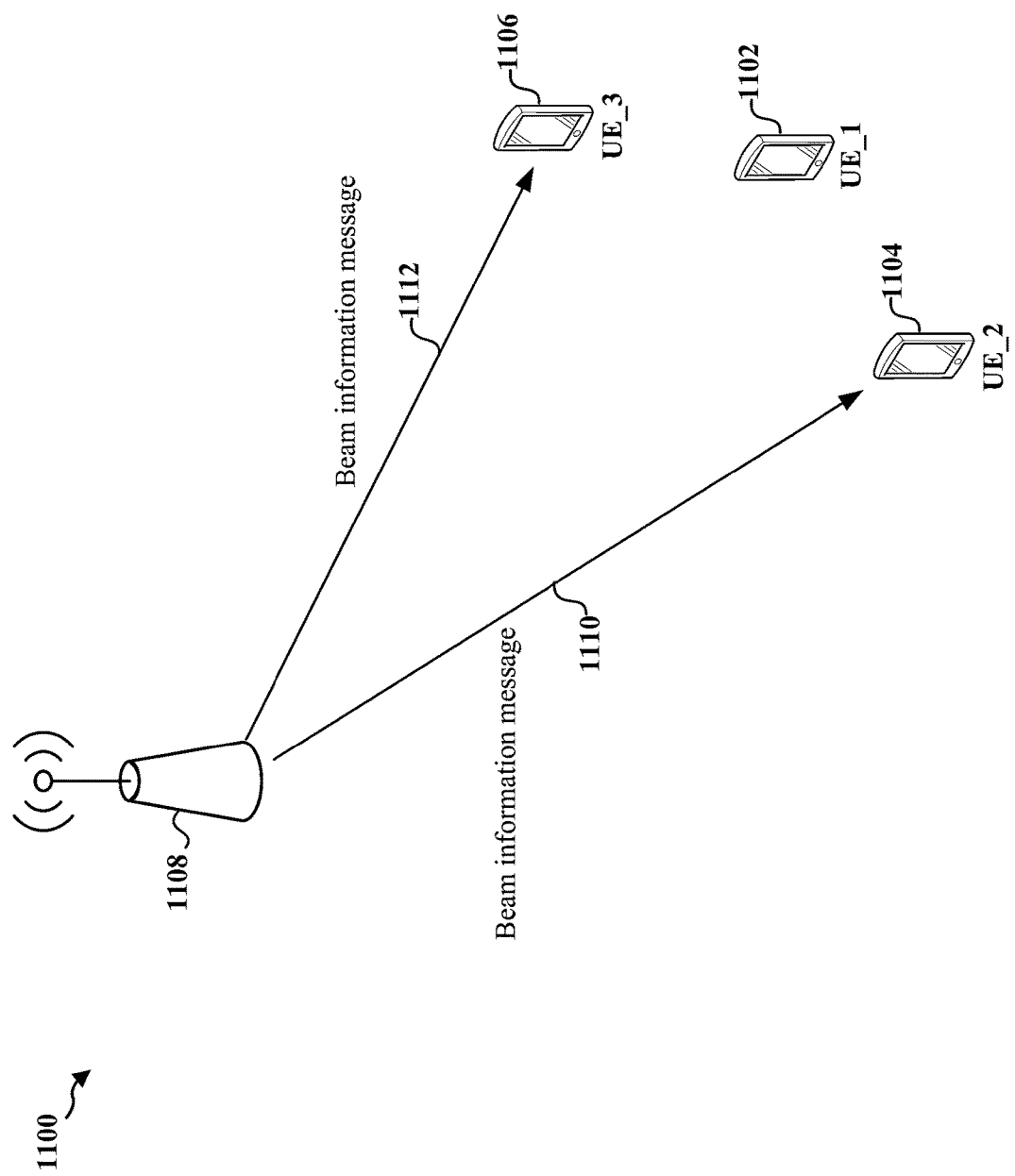
FIG. 11 illustrates an example network in accordance with various aspects of the present disclosure.

FIG. 11 illustrates an example network 1100 in accordance with various aspects of the present disclosure. The network 1100 includes a first UE (UE_1) 1102, a second UE (UE_2) 1104, a third UE (UE_3) 1106, and a base station 1108. In some aspects of the disclosure, the base station 1108 may be operating in a full-duplex mode. In the example of FIG. 11, the base station 1108 may unicast a beam information message to one or more UEs in the network 1100. For example, the base station 1108 may transmit the first beam information message 1110 to the second UE 1104 and the second beam information message 1112 to the third UE 1106. In other examples, the base station 1108 may multicast the beam information message to a group of UEs (e.g., using a group common downlink control information (DCI)).

In some aspects of the disclosure, the beam information message may indicate a pairing or association between a downlink beam and a set of uplink beams for unscheduled uplink transmissions. The downlink beam may be associated with a specific UE and the set of uplink beams for unscheduled uplink transmissions may be associated with a different UE or a group of different UEs. When the specific UE is receiving downlink transmissions from the base station 1108 via the downlink beam, the different UE may use at least one beam from the set of uplink beams for unscheduled uplink transmissions associated with the downlink beam to transmit high-priority data. In some examples, the beam information message may indicate a pairing or association between a certain UE and a group of different UEs, where any of the different UEs may transmit high-priority data on the uplink when the certain UE is receiving downlink transmissions. These aspects are described in detail with reference to FIGS. 12-14.

Figure 12:
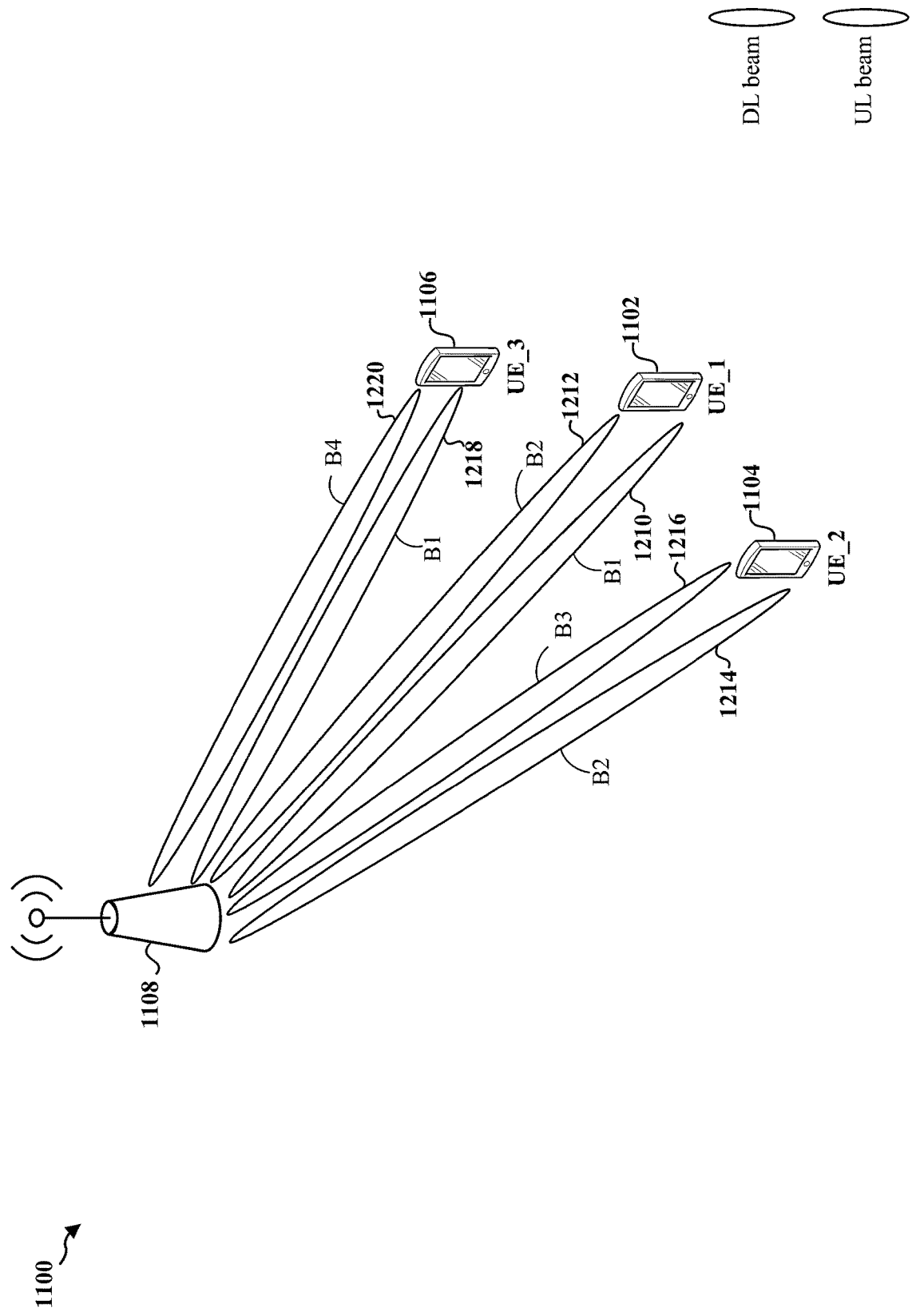
FIG. 12 illustrates an example scenario in the network of FIG. 11.

FIG. 12 illustrates an example scenario in the network 1100. In FIG. 12, each of the first, second, and third UEs 1102, 1104, 1106 may be in communication with base station 1108 using one or more beams. For example, the first UE 1102 may be in communication with the base station 1108 using downlink beam_1 (B1) 1210 and/or downlink beam_2 (B2) 1212. The second UE 1104 may be in communication with the base station 1108 using uplink beam_2 (B2) 1214 and/or uplink beam_3 (B3) 1216. The third UE 1106 may be in communication with the base station 1108 using uplink beam_1 (B1) 1218 and/or uplink beam_4 (B4) 1220.

The first beam information message 1110 may indicate to the second UE 1104 that downlink beam_1 (B1) 1210 is associated with uplink beam_2 (B2) 1214 and/or uplink beam_3 (B3) 1216. The second UE 1104 may use this association to determine the uplink beam to be used when high-priority data needs to be transmitted to the base station 1108. In some examples, the first beam information message 1110 may indicate that downlink beam_1 (B1) 1210 is associated with a first set of uplink beams for unscheduled uplink transmissions including the uplink beam_2 (B2) 1214 and/or uplink beam_3 (B3) 1216.

The second beam information message 1112 may indicate to the third UE 1106 that downlink beam_2 (B2) 1212 is associated with uplink beam_1 (B1) 1218 and/or uplink beam_4 (B4) 1220. The third UE 1106 may use this association to determine the uplink beam to be used when high-priority data needs to be transmitted to the base station 1108. In some examples, the second beam information message 1112 may indicate that downlink beam_2 (B2) 1212 is associated with a second set of uplink beams for unscheduled uplink transmissions including the uplink beam_1 (B1) 1218 and/or uplink beam_4 (B4) 1220.

Figure 13:
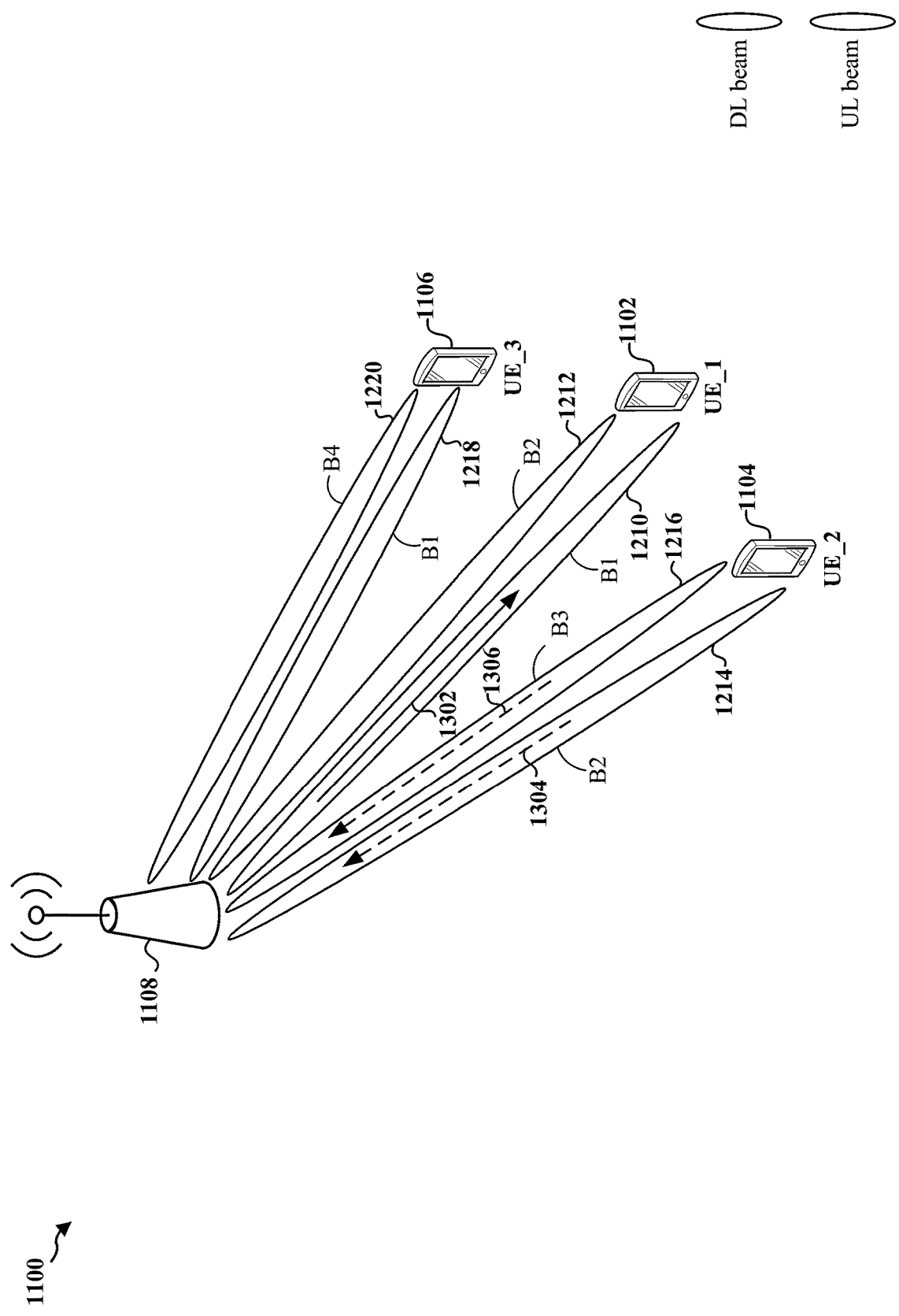
FIG. 13 illustrates an example scenario in the network of FIG. 11.

With reference to the network 1100 in FIG. 13, if the second UE 1104 obtains high-priority data that is to be transmitted to the base station 1108 without a grant when the first UE 1102 is receiving scheduled downlink transmissions (e.g., downlink transmission 1302) via downlink beam_1 (B1) 1210, the second UE 1104 may determine the set of uplink beams for unscheduled uplink transmissions from the beam information message 1110. For example, the second UE 1104 may determine the downlink beam in which the base station 1108 performs the one or more scheduled downlink transmissions and may determine the set of uplink beams for unscheduled uplink transmissions (e.g., uplink beam_2 (B2) 1214 and uplink beam_3 (B3) 1216) associated with the determined downlink beam based on the beam information message 1110. The second UE 1104 may transmit the high-priority data in an uplink transmission 1304 via the uplink beam_2 (B2) 1214 or in an uplink transmission 1306 via uplink beam_3 (B3) 1216.

Figure 14:
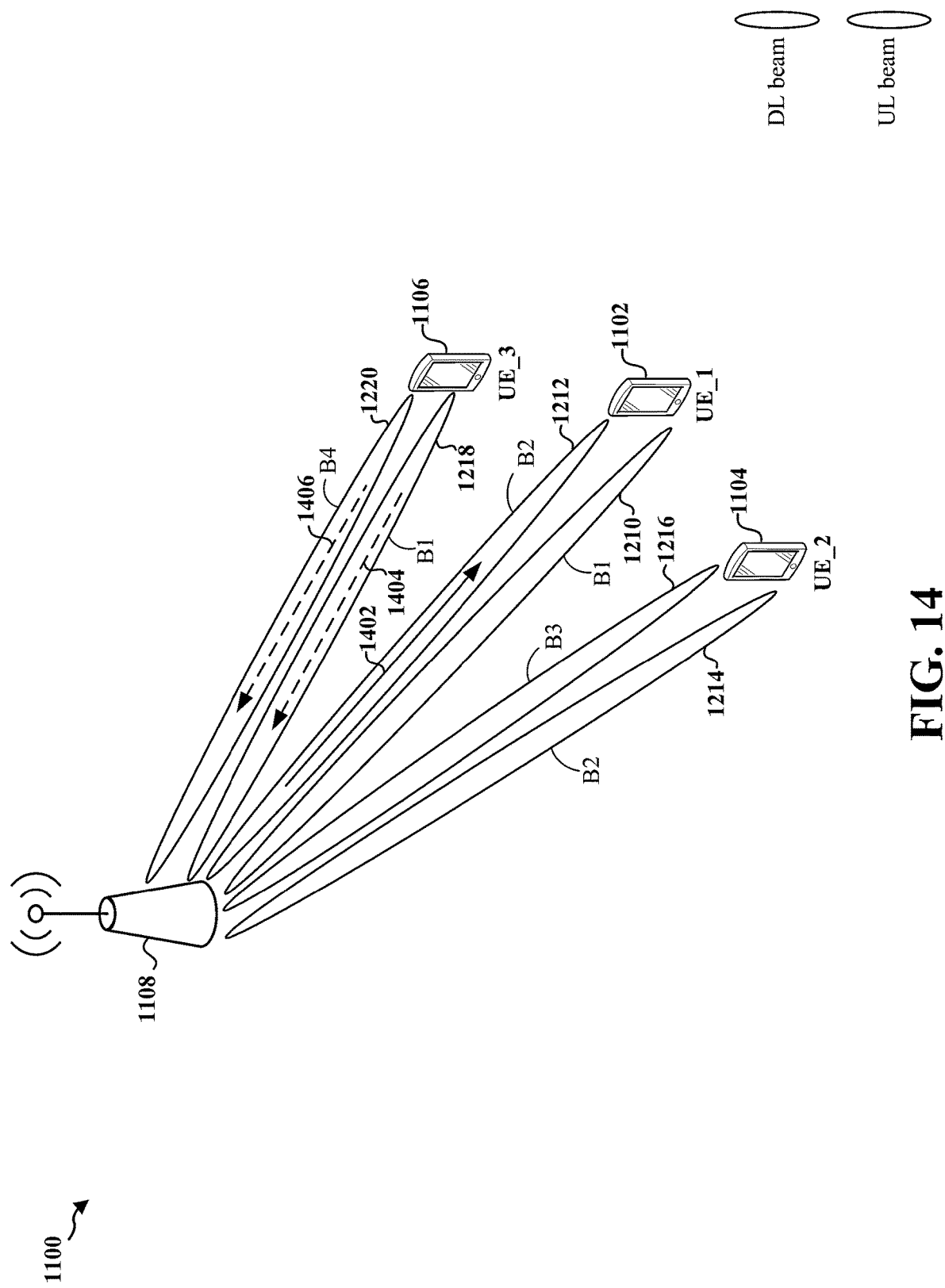
FIG. 14 illustrates an example scenario in the network of FIG. 11.

With reference to the network 1100 in FIG. 14, if the third UE 1106 obtains high-priority data that is to be transmitted to the base station 1108 without a grant when the first UE 1102 is receiving scheduled downlink transmissions (e.g., downlink transmission 1402) via downlink beam_2 (B2) 1212, the third UE 1106 may determine the set of uplink beams for unscheduled uplink transmissions from the beam information message 1112. For example, the third UE 1106 may determine the downlink beam in which the base station 1108 performs the one or more scheduled downlink transmissions and may determine the set of uplink beams for unscheduled uplink transmissions (e.g., uplink beam_1 (B1) 1218 and uplink beam_4 (B4) 1220) associated with the determined downlink beam based on the beam information message 1112. The third UE 1106 may transmit the high-priority data in an uplink transmission 1404 via uplink beam_1 (B1) 1218 or in an uplink transmission 1406 via uplink beam_4 (B4) 1220.

Since the second UE 1104 may use uplink beam_2 (B2) 1214 and/or uplink beam_3 (B3) 1216 to transmit high-priority data when the first UE 1102 is receiving downlink transmissions via downlink beam_1 (B1) 1210, and since the third UE 1106 may use uplink beam_1 (B1) 1218 and/or uplink beam_4 (B4) 1220 to transmit high-priority data when the first UE 1102 is receiving downlink transmissions via downlink beam_2 (B2) 1212, collisions on the uplink channel may be avoided or reduced when the second and third UEs 1104, 1106 need to concurrently transmit high-priority data to the base station 1108.

Figure 15:
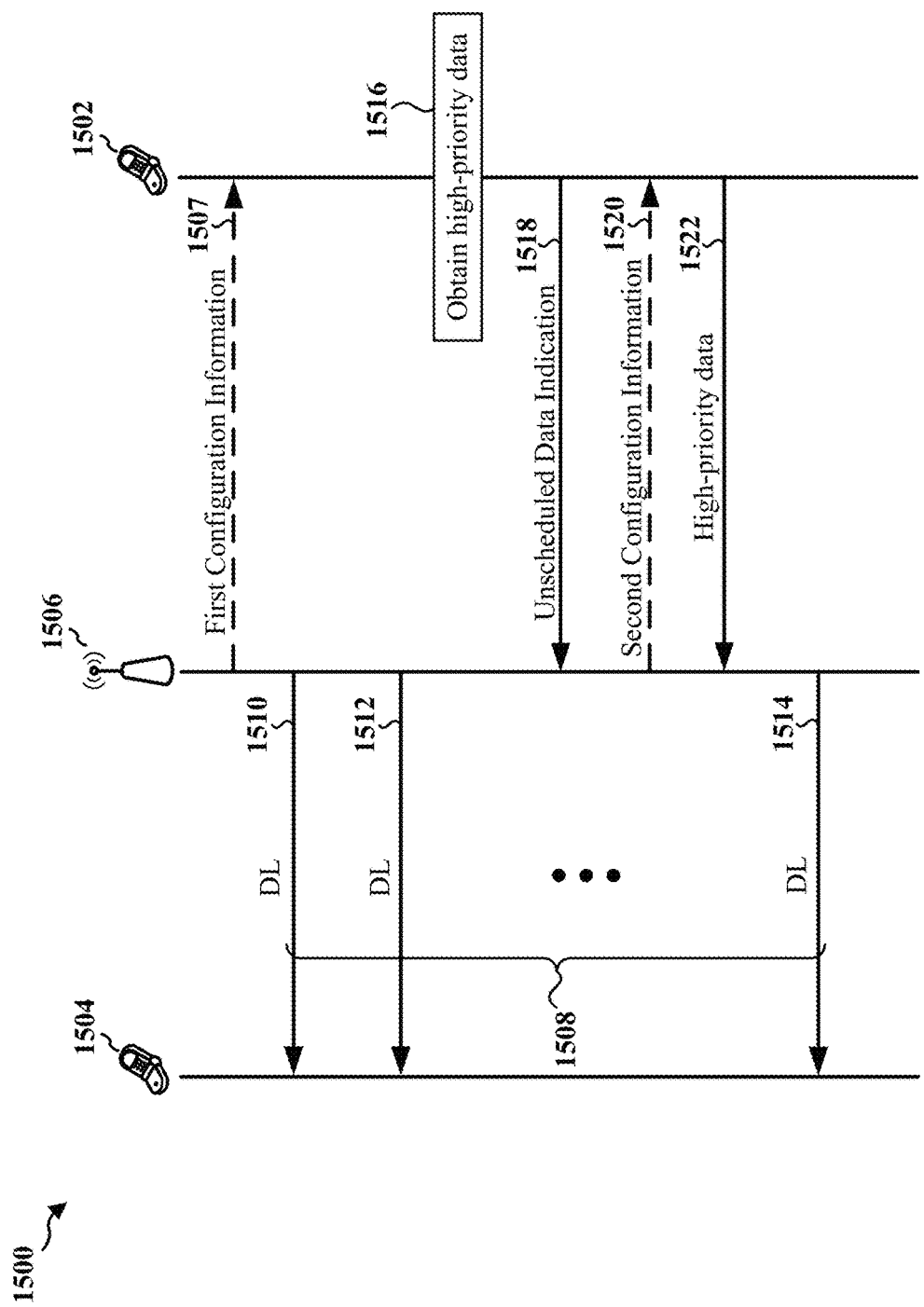
FIG. 15 illustrates a signal flow diagram in accordance with various aspects of the present disclosure.

FIG. 15 illustrates a signal flow diagram 1500 in accordance with various aspects of the present disclosure. FIG. 15 includes a first UE 1502, a second UE 1504, and a base station 1506. In some aspects of the disclosure, the base station 1506 may be operating in a full-duplex mode. The base station 1506 may optionally transmit first configuration information 1507. In some examples, the first configuration information 1507 may include a unique indication sequence associated with the first UE 1502. For example, base station 1506 may preconfigure the first UE 1502 with the unique indication sequence using the first configuration information 1507.

In some examples, the base station 1506 may schedule a set of downlink (DL) transmissions 1508 (also referred to as a scheduled set of downlink transmissions) to the second UE 1504. The scheduled set of downlink transmissions 1508 may include one or more downlink transmissions, such as a first downlink transmission 1510, a second downlink transmission 1512, and an nth downlink transmission 1514.

At 1516, the first UE 1502 may obtain high-priority data to be transmitted to the base station 1506. In some aspects of the disclosure, the base station 1506 may not be informed that the first UE 1502 has obtained the high-priority data at 1516.

The first UE 1502 may transmit an unscheduled data indication 1518 to the base station 1506 to indicate that the first UE 1502 is to transmit high-priority data to the base station 1506 without an uplink resource allocation (e.g., without an uplink grant). The first UE 1502 may transmit the unscheduled data indication 1518 to the base station 1506 while the base station 1506 transmits the scheduled set of downlink (DL) transmissions 1508 to the second UE 1504.

The base station 1506 may form a wide beam to listen for unscheduled data indications from UEs (e.g., the unscheduled data indication 1518 from the first UE 1502) in the cell served by the base station 1506 when the base station 1506 is transmitting the scheduled set of downlink transmissions 1508. In some examples, the unscheduled data indication 1518 may include the unique indication sequence associated with the first UE 1502. This may enable the base station 1506 to identify the first UE 1502 from the unique indication sequence in the unscheduled data indication 1518. For example, the unique indication sequence may be an m-bit word, where m is a positive integer. In some examples, the unscheduled data indication 1518 may or may not include an identifier of the UE (also referred to as the UE ID).

In some aspects of the disclosure, when the base station 1506 detects the unscheduled data indication 1518 from the first UE 1502, the base station 1506 may optionally respond by transmitting second configuration information 1520 to the first UE 1502. The second configuration information 1520 may facilitate or improve the ability of the base station 1506 to receive the high-priority data in the full-duplex mode. In some examples, the second configuration information 1520 may include an uplink MCS, a transmit power configuration, and/or an uplink beam configuration for transmission of the high-priority data.

In one example, the uplink MCS indicated in the second configuration information 1520 may include a higher MCS value than the MCS value used for the scheduled set of downlink transmissions 1508. In the aspects described herein, for example, an MCS value may refer to an MCS index value that corresponds to a certain modulation order (e.g., modulation order of 2, 4, 6, etc.) and modulation scheme (e.g., BPSK, QPSK, M-QAM, etc.) as defined in wireless communication standards, or may refer to a specific modulation order and/or a specific modulation scheme.

In another example, the uplink MCS indicated in the second configuration information 1520 may include an MCS value that is greater than or equal to a threshold MCS value (e.g., a threshold MCS index value). In other examples, the uplink MCS indicated in the second configuration information 1520 may include an MCS value that enables the base station 1506 to successfully receive uplink transmissions while transmitting downlink transmissions in the full-duplex mode.

In some examples, the transmit power configuration indicated in the second configuration information 1520 may include a transmit power that is greater than or equal to a threshold transmit power. In some examples, the transmit power configuration may include a transmit power that is the maximum permissible transmission power the first UE 1502 may use for an uplink transmission. In some examples, the uplink beam configuration may indicate an uplink beam (e.g., a best uplink beam from a set of candidate uplink beams) to be used for transmission of the uplink transmission 1522.

The first UE 1502 may transmit an uplink transmission 1522 including the high-priority data to the base station 1506 within a threshold time after transmission of the unscheduled data indication 1518. In some examples, the threshold time may be set according to the acceptable latency of the high-priority data. For example, if the high-priority data is associated with a mission-critical service or an application where URLLC services are needed, the threshold time may be less than or equal to 1 ms. In other examples, the threshold time may be within a range of 1 ms to 2 ms. In some aspects, the first UE 1502 may transmit the uplink transmission 1522 including the high-priority data to the base station 1506 immediately after transmission of the unscheduled data indication 1518.

In some aspects of the disclosure, if the first UE 1502 has received the second configuration information 1520, the first UE 1502 may transmit the uplink transmission 1522 including the high-priority data based on the uplink MCS, the transmit power configuration, and/or the uplink beam configuration included in the second configuration information 1520.

Figure 16:
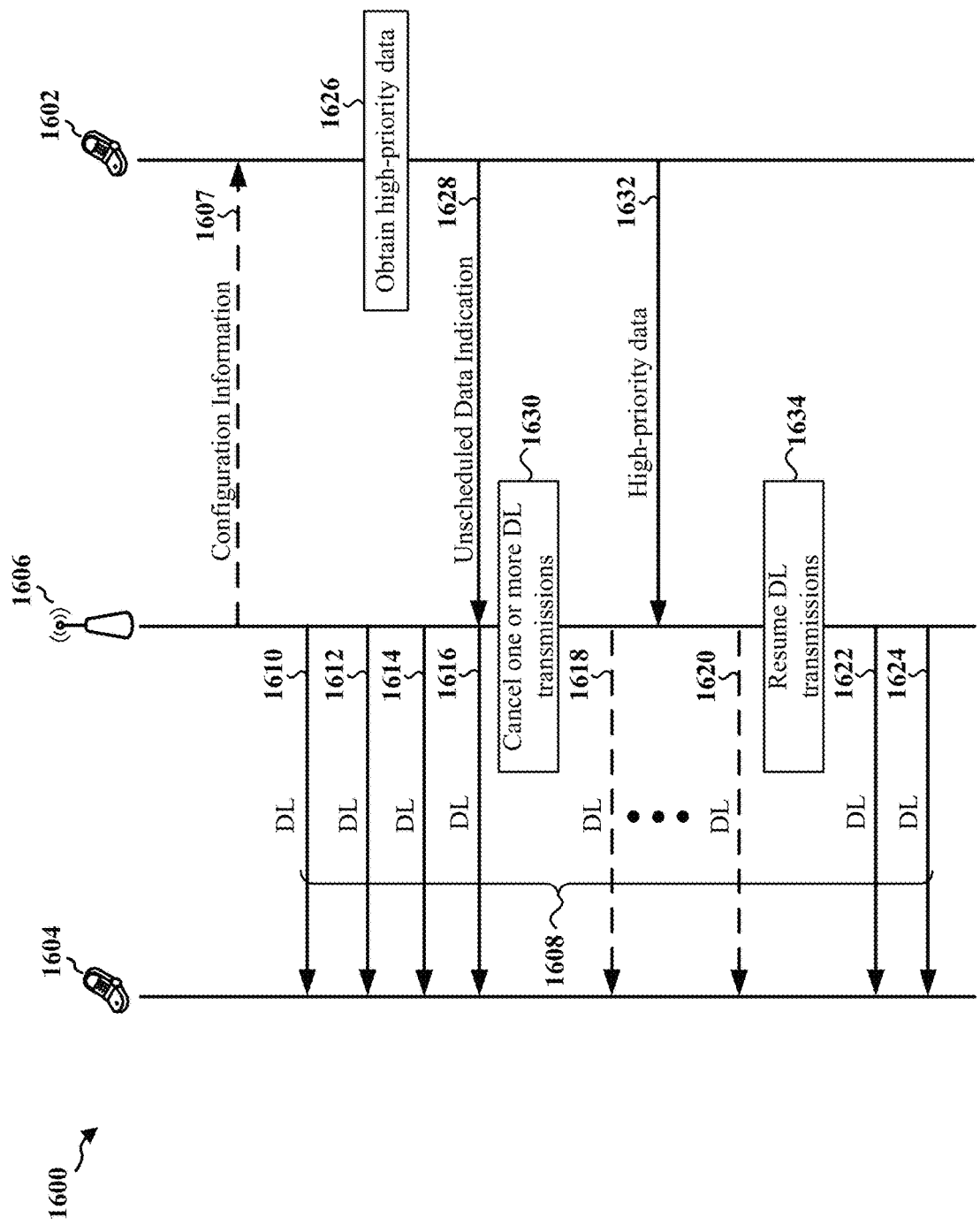
FIG. 16 illustrates a signal flow diagram in accordance with various aspects of the present disclosure.

FIG. 16 illustrates a signal flow diagram 1600 in accordance with various aspects of the present disclosure. FIG. 16 includes a first UE 1602, a second UE 1604, and a base station 1606. In some aspects of the disclosure, the base station 1606 may be operating in a full-duplex mode. The base station 1606 may optionally transmit configuration information 1607. In some examples, the configuration information 1607 may include a unique indication sequence associated with the first UE 1602. For example, base station 1606 may preconfigure the first UE 1602 with the unique indication sequence using the configuration information 1607.

In some examples, the base station 1606 may schedule a set of downlink (DL) transmissions 1608 (also referred to as a scheduled set of downlink transmissions) to the second UE 1604. The scheduled set of downlink transmissions 1608 may include one or more downlink transmissions, such as the downlink transmissions 1610, 1612, 1614, 1616, 1618, 1620, 1622, 1624.

At 1626, the first UE 1602 may obtain high-priority data to be transmitted to the base station 1606. In some aspects of the disclosure, the base station 1606 may not be informed that the first UE 1602 has obtained the high-priority data at 1626.

The first UE 1602 may transmit an unscheduled data indication 1628 to the base station 1606 to indicate that the first UE 1602 is to transmit high-priority data to the base station 1606 without an uplink resource allocation (e.g., without an uplink grant). The first UE 1602 may transmit the unscheduled data indication 1628 to the base station 1606 while the base station 1606 transmits the scheduled set of downlink transmissions 1608 to the second UE 1604.

The base station 1606 may form a wide beam to listen for unscheduled data indications from UEs (e.g., the unscheduled data indication 1628 from the first UE 1602) in the cell served by the base station 1606 when the base station 1606 is transmitting the scheduled set of downlink transmissions 1608. In some examples, the unscheduled data indication 1628 may include the unique indication sequence associated with the first UE 1602. This may enable the base station 1606 to identify the first UE 1602 from the unique indication sequence in the unscheduled data indication 1628. For example, the unique indication sequence may be an m-bit word, where m is a positive integer. In some examples, the unscheduled data indication 1628 may or may not include an identifier of the UE (also referred to as the UE ID).

In some aspects of the disclosure, when the base station 1606 detects the unscheduled data indication 1628 from the first UE 1602, the base station 1606 at 1630 may cancel one or more downlink transmissions in the scheduled set of downlink transmissions 1608 in response to the unscheduled data indication 1628. In FIG. 16, the downlink transmission 1618 indicated with dashed lines represents the first canceled downlink transmission and the downlink transmission 1620 indicated with dashed lines represents the last canceled downlink transmission. The base station 1606 may cancel the downlink transmissions to avoid or reduce self-interference at the base station 1606 while operating in the full-duplex mode, thereby improving the ability of the base station 1606 to successfully receive any uplink transmissions that may follow the unscheduled data indication 1628.

The first UE 1602 may transmit an uplink transmission 1632 including the high-priority data to the base station 1606 within a threshold time after transmission of the unscheduled data indication 1628. In some examples, the threshold time may be set according to the acceptable latency of the high-priority data. For example, if the high-priority data is associated with a mission-critical service or an application where URLLC services are needed, the threshold time may be less than or equal to 1 ms. In other examples, the threshold time may be within a range of 1 ms to 2 ms. In some aspects, the first UE 1602 may transmit the uplink transmission 1632 including the high-priority data to the base station 1606 immediately after transmission of the unscheduled data indication 1628.

Since the base station 1606 cancels one or more of the downlink transmissions in the scheduled set of downlink transmissions 1608 in response to the unscheduled data indication 1628, the base station 1606 may successfully receive the uplink transmission 1632 including the high-priority data. In some examples, at 1634, the base station may resume transmission of the scheduled set of downlink transmissions 1608.

Figure 17:
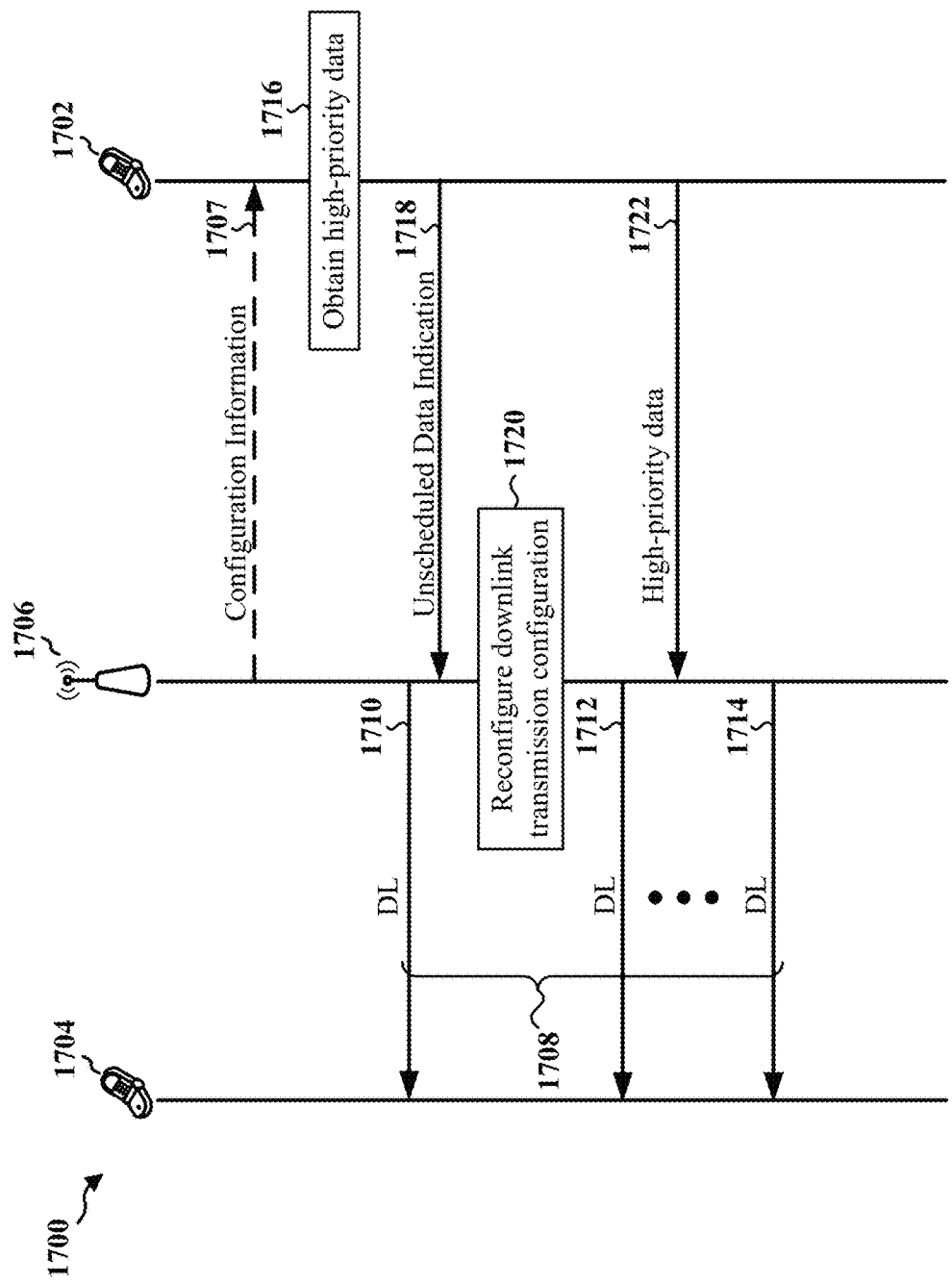
FIG. 17 illustrates a signal flow diagram in accordance with various aspects of the present disclosure.

FIG. 17 illustrates a signal flow diagram 1700 in accordance with various aspects of the present disclosure. FIG. 17 includes a first UE 1702, a second UE 1704, and a base station 1706. In some aspects of the disclosure, the base station 1706 may be operating in the full-duplex mode. The base station 1706 may optionally transmit configuration information 1707. In some examples, the configuration information 1707 may include a unique indication sequence associated with the first UE 1702. For example, the base station 1706 may preconfigure the first UE 1702 with the unique indication sequence using the configuration information 1707.

In some examples, the base station 1706 may schedule a set of downlink (DL) transmissions 1708 (also referred to as a scheduled set of downlink transmissions 1708) to the second UE 1704. The scheduled set of downlink transmissions 1708 may include one or more downlink transmissions, such as the first downlink transmission 1710, the second downlink transmission 1712, and the nth downlink transmission 1714.

At 1716, the first UE 1702 may obtain high-priority data to be transmitted to the base station 1706. In some aspects of the disclosure, the base station 1706 may not be informed that the first UE 1702 has obtained the high-priority data at 1716.

The first UE 1702 may transmit an unscheduled data indication 1718 to the base station 1706 to indicate that the first UE 1702 is to transmit high-priority data to the base station 1706 without an uplink resource allocation (e.g., without an uplink grant). The first UE 1702 may transmit the unscheduled data indication 1718 to the base station 1706 while the base station 1706 transmits the scheduled set of downlink transmissions 1708 to the second UE 1704.

The base station 1706 may form a wide beam to listen for unscheduled data indications from UEs (e.g., the unscheduled data indication 1718 from the first UE 1702) in the cell served by the base station 1706 when the base station 1706 is transmitting the scheduled set of downlink transmissions 1708. In some examples, the unscheduled data indication 1718 may include the unique indication sequence associated with the first UE 1702. This may enable the base station 1706 to identify the UE 1702 from the unique indication sequence in the unscheduled data indication 1718. For example, the unique indication sequence may be an m-bit word, where m is a positive integer. In some examples, the unscheduled data indication 1718 may or may not include an identifier of the UE (also referred to as the UE ID).

In some aspects of the disclosure, when the base station 1706 detects the unscheduled data indication 1718 from the first UE 1702, the base station 1706 at 1720 may reconfigure the downlink transmission configuration for the scheduled set of downlink transmissions 1708 in response to the unscheduled data indication 1718. For example, the base station 1706 may configure a different MCS for the scheduled set of downlink transmissions 1708 and/or a different transmit power for the scheduled set of downlink transmissions 1708 in response to the unscheduled data indication 1718. For example, the different MCS may include a lower MCS value (e.g., a lower MCS index value) for the scheduled set of downlink transmissions 1708. For example, the different transmit power may include a lower transmit power for the scheduled set of downlink transmissions 1708 to avoid or reduce self-interference at the base station 1706 while operating in the full-duplex mode, thereby improving the ability of the base station 1706 to successfully receive any uplink transmissions that may follow the unscheduled data indication 1718.

The first UE 1702 may transmit an uplink transmission 1722 including the high-priority data to the base station 1706 within a threshold time after transmission of the unscheduled data indication 1718. In some examples, the threshold time may be set according to the acceptable latency of the high-priority data. For example, if the high-priority data is associated with a mission-critical service or an application where URLLC services are needed, the threshold time may be less than or equal to 1 ms. In other examples, the threshold time may be within a range of 1 ms to 2 ms. In some aspects, the first UE 1702 may transmit the uplink transmission 1722 including the high-priority data to the base station 1706 immediately after transmission of the unscheduled data indication 1718. Since the base station 1706 reconfigures the downlink transmission configuration for the scheduled set of downlink transmissions 1708 in response to the unscheduled data indication 1718, the base station 1706 may successfully receive the uplink transmission 1722 including the high-priority data.

In some examples, a UE and a base station may both be operating in the full-duplex mode. In these examples, the UE may obtain high-priority data to be transmitted to the base station while receiving a set of scheduled downlink transmissions from the base station. The previously described aspects may be applied to these examples as described with reference to FIG. 18.

Figure 18:
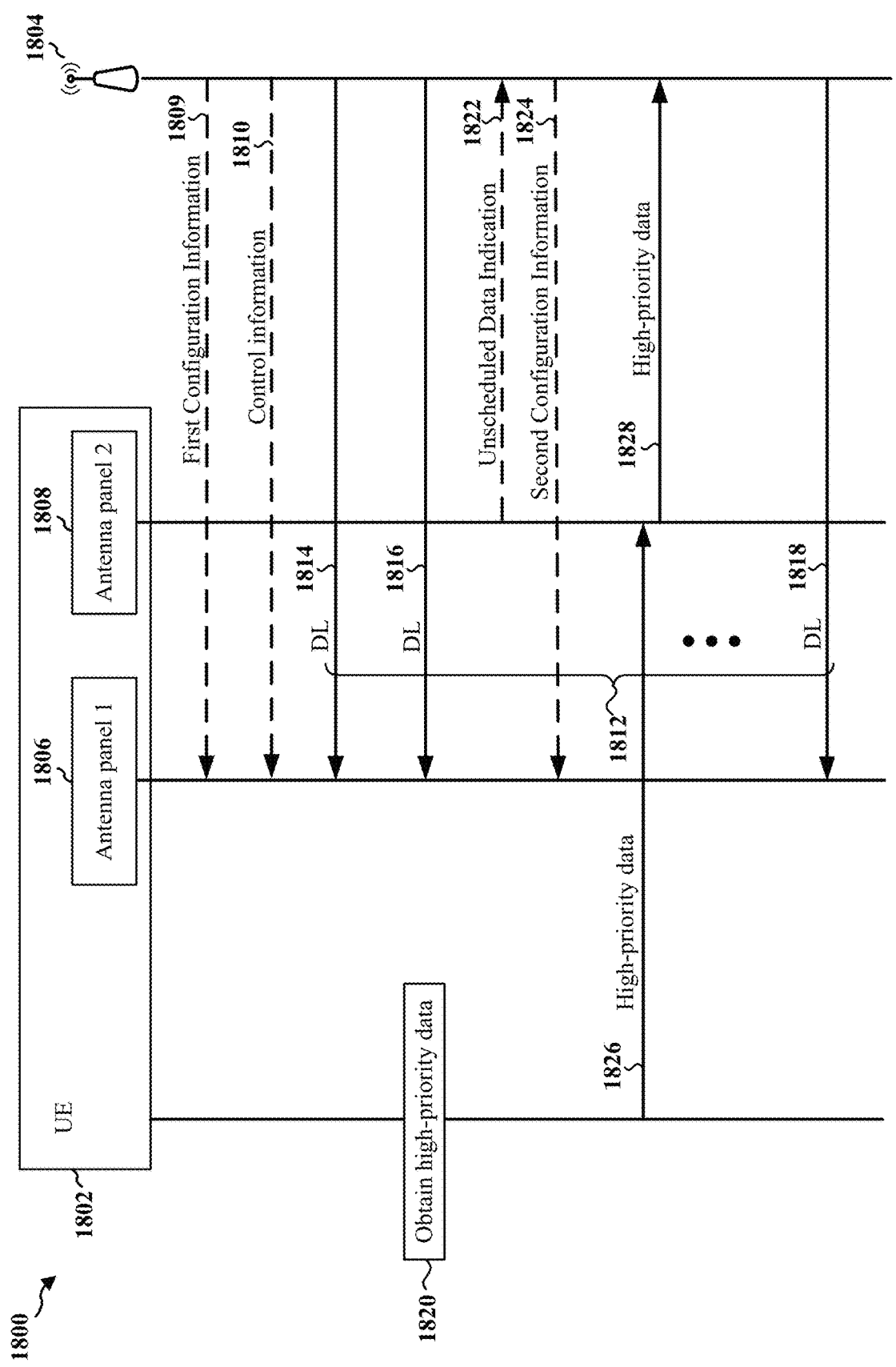
FIG. 18 illustrates a signal flow diagram in accordance with various aspects of the present disclosure.

FIG. 18 illustrates a signal flow diagram 1800 in accordance with various aspects of the present disclosure. FIG. 18 includes a UE 1802 and a base station 1804. The UE 1802 may include a first antenna panel 1806 configured to receive downlink transmissions from the base station 1804, and may include a second antenna panel 1808 configured to transmit uplink transmissions to the base station 1804.

In some aspects of the disclosure, the UE 1802 and the base station 1804 may be operating in the full-duplex mode. The base station 1804 may optionally transmit first configuration information 1809. In some examples, the first configuration information 1809 may include a unique indication sequence associated with the UE 1802. For example, base station 1804 may preconfigure the UE 1802 with the unique indication sequence using the first configuration information 1809. The base station 1804 may further optionally transmit control information 1810 to the UE 1802 including a configured grant (CG) for uplink transmissions.

In some examples, the base station 1804 may schedule a set of downlink (DL) transmissions 1812 (also referred to as a scheduled set of downlink transmissions 1812) for the UE 1802. The scheduled set of downlink transmissions 1812 may include one or more downlink transmissions, such as a first downlink transmission 1814, a second downlink transmission 1816, and an nth downlink transmission 1818.

At 1820, the UE 1802 may obtain high-priority data to be transmitted to the base station 1804. In some aspects of the disclosure, the base station 1804 may not be informed that the UE 1802 has obtained the high-priority data at 1820.

The UE 1802 may optionally transmit (e.g., from the second antenna panel 1808) an unscheduled data indication 1822 to the base station 1804 to indicate that the UE 1802 is to transmit high-priority data to the base station 1804 without an uplink resource allocation (e.g., without an uplink grant). The UE 1802 may transmit the unscheduled data indication 1822 to the base station 1804 while the base station 1804 transmits the scheduled set of downlink (DL) transmissions 1812 to the UE 1802.

The base station 1804 may form a wide beam to listen for unscheduled data indications from UEs (e.g., the unscheduled data indication 1822 from the UE 1802) in the cell served by the base station 1804 when the base station 1804 is transmitting the scheduled set of downlink transmissions 1812. In some examples, the unscheduled data indication 1822 may include the unique indication sequence associated with the UE 1802. This may enable the base station 1804 to identify the UE 1802 from the unique indication sequence in the unscheduled data indication 1822. For example, the unique indication sequence may be an m-bit word, where m is a positive integer. In some examples, the unscheduled data indication 1822 may or may not include an identifier of the UE (also referred to as the UE ID).

In some aspects of the disclosure, when the base station 1804 detects the unscheduled data indication 1822 from the first UE 1802, the base station 1804 may optionally respond by transmitting second configuration information 1824 to the UE 1802. The second configuration information 1824 may facilitate or improve the ability of the base station 1804 to receive the high-priority data in the full-duplex mode. In some examples, the second configuration information 1824 may include an uplink MCS, a transmit power configuration, and/or an uplink beam configuration for transmission of the high-priority data.

In one example, the uplink MCS indicated in the second configuration information 1824 may include a higher MCS value (e.g., a higher MCS index value) than the MCS value used for the scheduled set of downlink transmissions 1812. In another example, the uplink MCS indicated in the second configuration information 1824 may include an MCS value that is greater than or equal to a threshold MCS value (e.g., a threshold MCS index value). In other examples, the uplink MCS indicated in the second configuration information 1824 may include an MCS value that enables the base station 1804 to successfully receive uplink transmissions while transmitting downlink transmissions in the full-duplex mode.

In some examples, the transmit power configuration indicated in the second configuration information 1824 may include a transmit power that is greater than or equal to a threshold transmit power. In some examples, the transmit power configuration may include a transmit power that is the maximum permissible transmission power the UE 1802 may use for an uplink transmission. In some examples, the uplink beam configuration may indicate an uplink beam (e.g., a best uplink beam from a set of candidate uplink beams) to be used for transmission of the uplink transmission 1828.

The UE 1802 may provide (e.g., transfer) the high-priority data obtained at 1820 to the second antenna panel 1808 via a signal 1826. The UE 1802 may transmit the high-priority data obtained at 1820 in an uplink transmission 1828 via the second antenna panel 1808. In some examples, the UE 1802 may use the periodic uplink resource associated with the configured grant for the uplink transmission 1828. It should be noted that the UE 1802 may transmit the uplink transmission 1828 while the UE 1802 receives the scheduled set of downlink transmissions 1812.

In some examples, the UE 1802 may transmit the uplink transmission 1828 including the high-priority data to the base station 1804 within a threshold time after transmission of the unscheduled data indication 1822. In some examples, the threshold time may be set according to the acceptable latency of the high-priority data. For example, if the high-priority data is associated with a mission-critical service or an application where URLLC services are needed, the threshold time may be less than or equal to 1 ms. In other examples, the threshold time may be within a range of 1 ms to 2 ms. In some aspects, the UE 1802 may transmit the uplink transmission 1828 including the high-priority data to the base station 1804 immediately after transmission of the unscheduled data indication 1822.

In some aspects of the disclosure, if the UE 1802 has received the second configuration information 1824, the UE 1802 may transmit the uplink transmission 1828 including the high-priority data based on the uplink MCS, the transmit power configuration, and/or the uplink beam configuration included in the second configuration information 1824.

In some examples, a UE may support concurrent reception of downlink transmissions from multiple base stations. For example, a UE may include a first antenna panel and a second antenna panel. The UE may concurrently receive a first set of downlink transmissions from a first base station at the first antenna panel and a second set of downlink transmissions from a second base station at the second antenna panel. In other examples, a UE may support concurrent uplink transmissions from two different antenna panels at the UE. The UE may indicate support for the concurrent uplink transmissions via capability signaling to the base station.

In some scenarios, a base station may schedule a first UE with a set of uplink transmissions. During the reception of the set of uplink transmissions from the first UE, a different UE may need to transmit unscheduled high-priority data to the base station. The aspects described herein include approaches for transmission of the unscheduled high-priority data.

Figure 19:
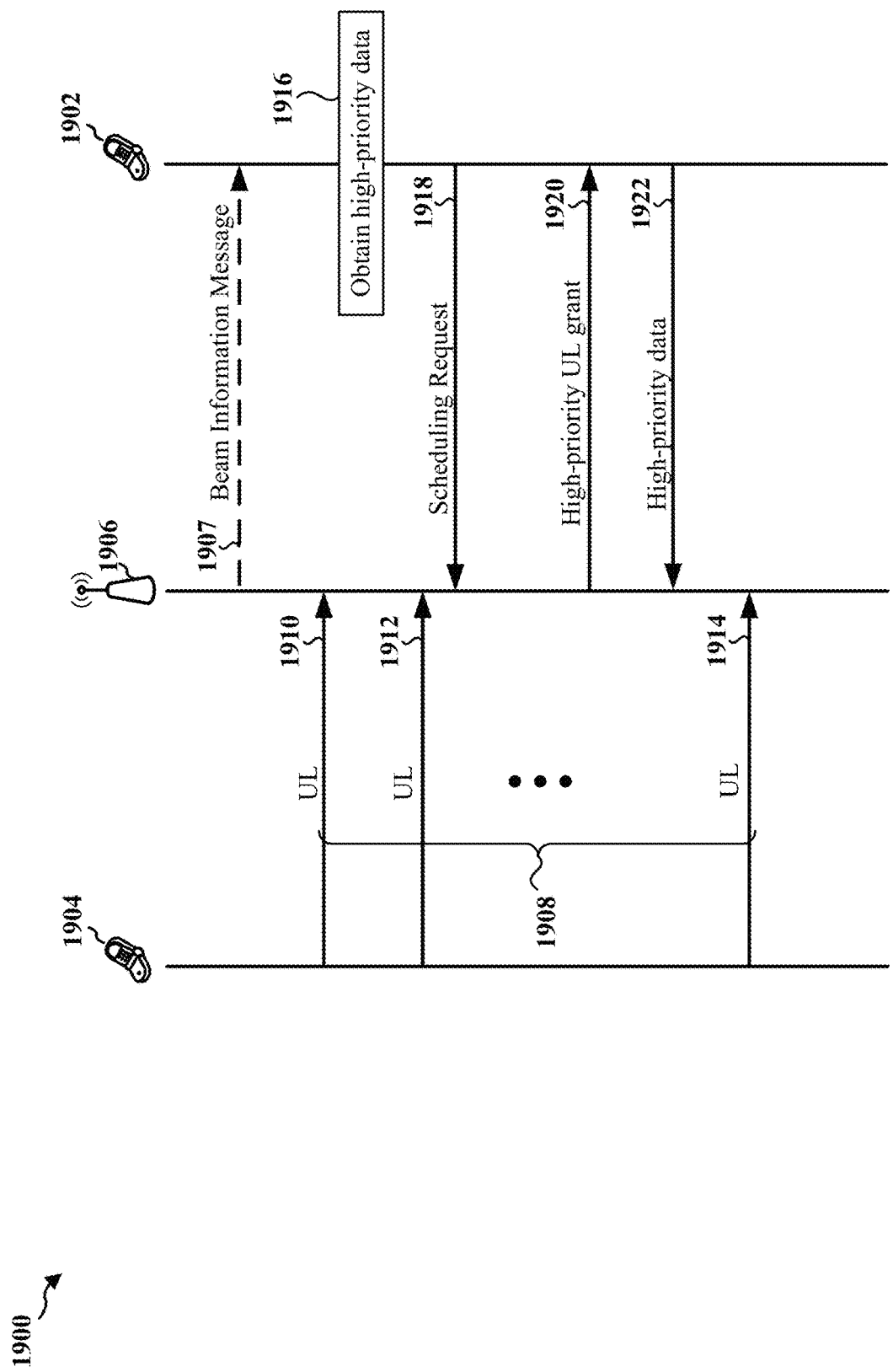
FIG. 19 illustrates a signal flow diagram in accordance with various aspects of the present disclosure.

FIG. 19 illustrates a signal flow diagram 1900 in accordance with various aspects of the present disclosure. FIG. 19 includes a first UE 1902, a second UE 1904, and a base station 1906. In some examples, the base station 1906 may schedule a set of uplink transmissions 1908 (also referred to as a scheduled set of uplink transmissions 1908) for the second UE 1904. The set of uplink transmissions 1908 may include one or more uplink transmissions, such as a first uplink transmission 1910, a second uplink transmission 1912, and an nth uplink transmission 1914.

The base station 1906 may optionally transmit a beam information message 1907 to the first UE 1902. As described in detail herein with reference to the beam information message 2410 or 2412 in FIG. 24, the beam information message 1907 may indicate a pairing or association between an uplink beam and a set of uplink beams for unscheduled uplink transmissions. The uplink beam (e.g., the uplink beam used for the scheduled set of uplink transmissions 1908) may be associated with a specific UE (e.g., the second UE 1904) and the set of uplink beams for unscheduled uplink transmissions may be associated with a different UE (e.g., the first UE 1902) or a group of different UEs.

At 1916, the first UE 1902 may obtain high-priority data to be transmitted to the base station 1906. In some aspects of the disclosure, the base station 1906 may not be informed that the first UE 1902 has obtained the high-priority data at 1916.

The first UE 1902 may transmit a scheduling request 1918 to the base station 1906 to receive an uplink resource allocation (e.g., an uplink grant). As shown in FIG. 19, the first UE 1902 may transmit the scheduling request 1918 to the base station 1906 while the base station 1906 receives the scheduled set of uplink transmissions 1908 from the second UE 1904.

The base station 1906 may transmit a high-priority uplink grant 1920 to the first UE 1902. The first UE 1902 may transmit the high-priority data (e.g., the high-priority data obtained at 1916) in an uplink transmission 1922 based on the high-priority uplink grant 1920. For example, the high-priority uplink grant 1920 may include an uplink resource allocation that the first UE 1902 can use for the uplink transmission 1922. In some examples, the first UE 1902 may optionally transmit the uplink transmission 1922 including high-priority data using an uplink beam from the set of uplink beams for unscheduled uplink transmissions indicated in the beam information message 1907.

Figure 20:
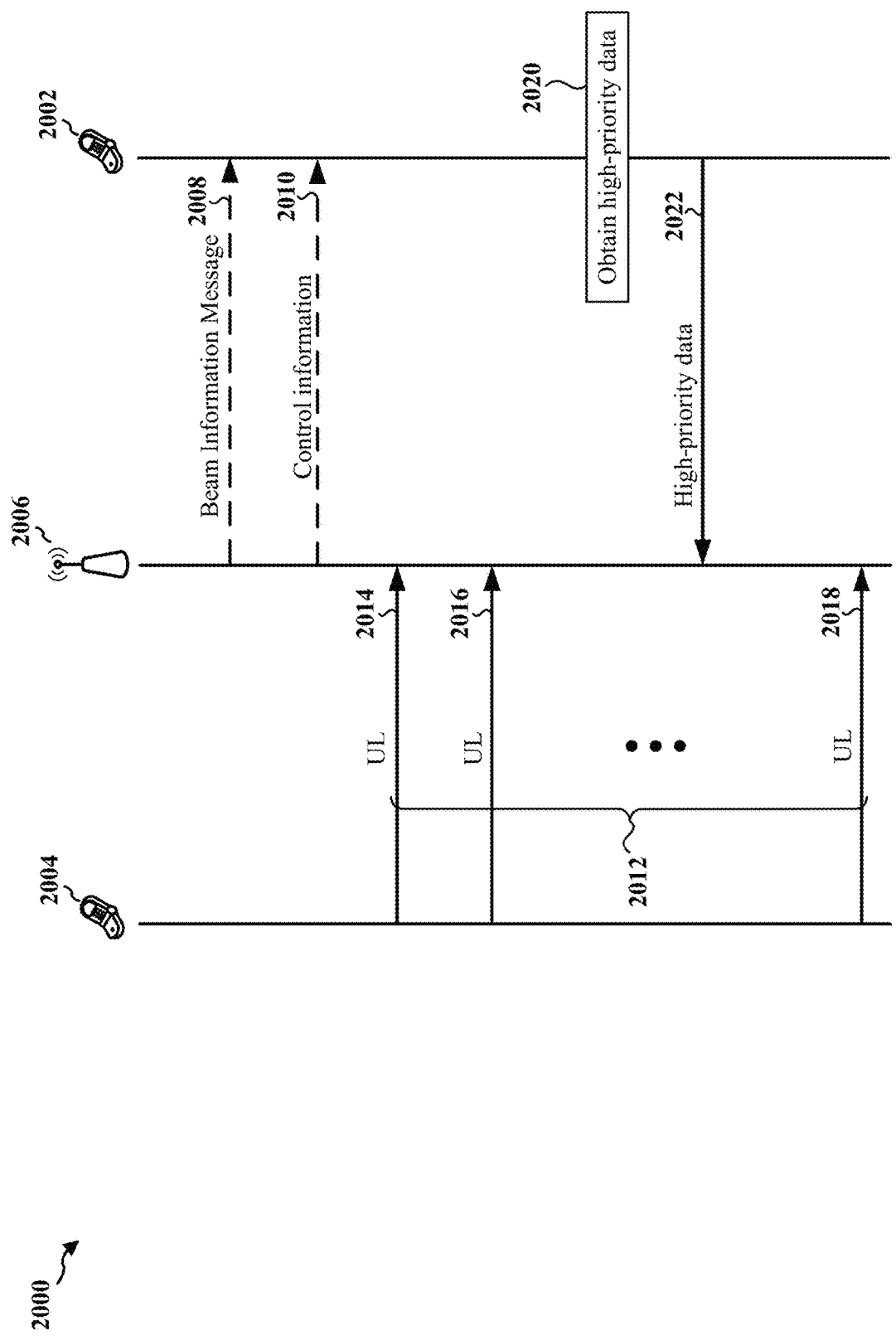
FIG. 20 illustrates a signal flow diagram in accordance with various aspects of the present disclosure.

FIG. 20 illustrates a signal flow diagram 2000 in accordance with various aspects of the present disclosure. FIG. 20 includes a first UE 2002, a second UE 2004, and a base station 2006.

The base station 2006 may optionally transmit a beam information message 2008 to the first UE 2002. As described in detail herein with reference to the beam information message 2410 or 2412 in FIG. 24, the beam information message 2008 may indicate a pairing or association between an uplink beam and a set of uplink beams for unscheduled uplink transmissions. The uplink beam (e.g., the uplink beam used for the scheduled set of uplink transmissions 2012) may be associated with a specific UE (e.g., the second UE 2004) and the set of uplink beams for unscheduled uplink transmissions may be associated with a different UE (e.g., the first UE 2002) or a group of different UEs.

The base station 2006 may further optionally transmit control information 2010 to the first UE 2002 including a configured grant (CG) for uplink transmissions. The configured grant may indicate a periodic uplink resource for the first UE 2002 and a periodicity of the periodic uplink resource. In some examples, the base station 2006 may transmit the control information 2010 including the configured grant whether or not the first UE 2002 has data to be transmitted to the base station 2006.

The base station 2006 may schedule a set of uplink transmissions 2012 (also referred to as a scheduled set of uplink transmissions 2012) for the second UE 2004. The scheduled set of uplink transmissions 2012 may include one or more uplink transmissions, such as a first uplink transmission 2014, a second uplink transmission 2016, and an nth uplink transmission 2018.

At 2020, the first UE 2002 may obtain high-priority data to be transmitted to the base station 2006. In some aspects of the disclosure, the base station 2006 may not be informed that the first UE 2002 has obtained the high-priority data at 2020.

The first UE 2002 may transmit the high-priority data obtained at 2020 in an uplink transmission 2022 using the periodic uplink resource associated with the configured grant. For example, with reference to FIG. 10, the base station 2006 may configure the first UE 2002 (e.g., via the control information 2010) with a configured grant that periodically allocates an uplink resource to the first UE 2002 in alternating symbols. In some aspects, the first UE 2002 may transmit the high-priority data in an uplink beam from the set of uplink beams for unscheduled uplink transmissions indicated in the beam information message 2008.

For example, the shaded symbols in FIG. 10 (e.g., symbols 1008 and 1012) may include uplink resources the first UE 2002 can use to transmit the high-priority data. The non-shaded symbols (e.g., symbol 1010) in FIG. 10 may not include uplink resources. When the base station 2006 implements a configured grant, the periodic uplink resources may be allocated for the first UE 2002 without the need for a scheduling request from the first UE 2002 and/or may be allocated whether or not the first UE 2002 has data to transmit on the uplink.

Figure 21:
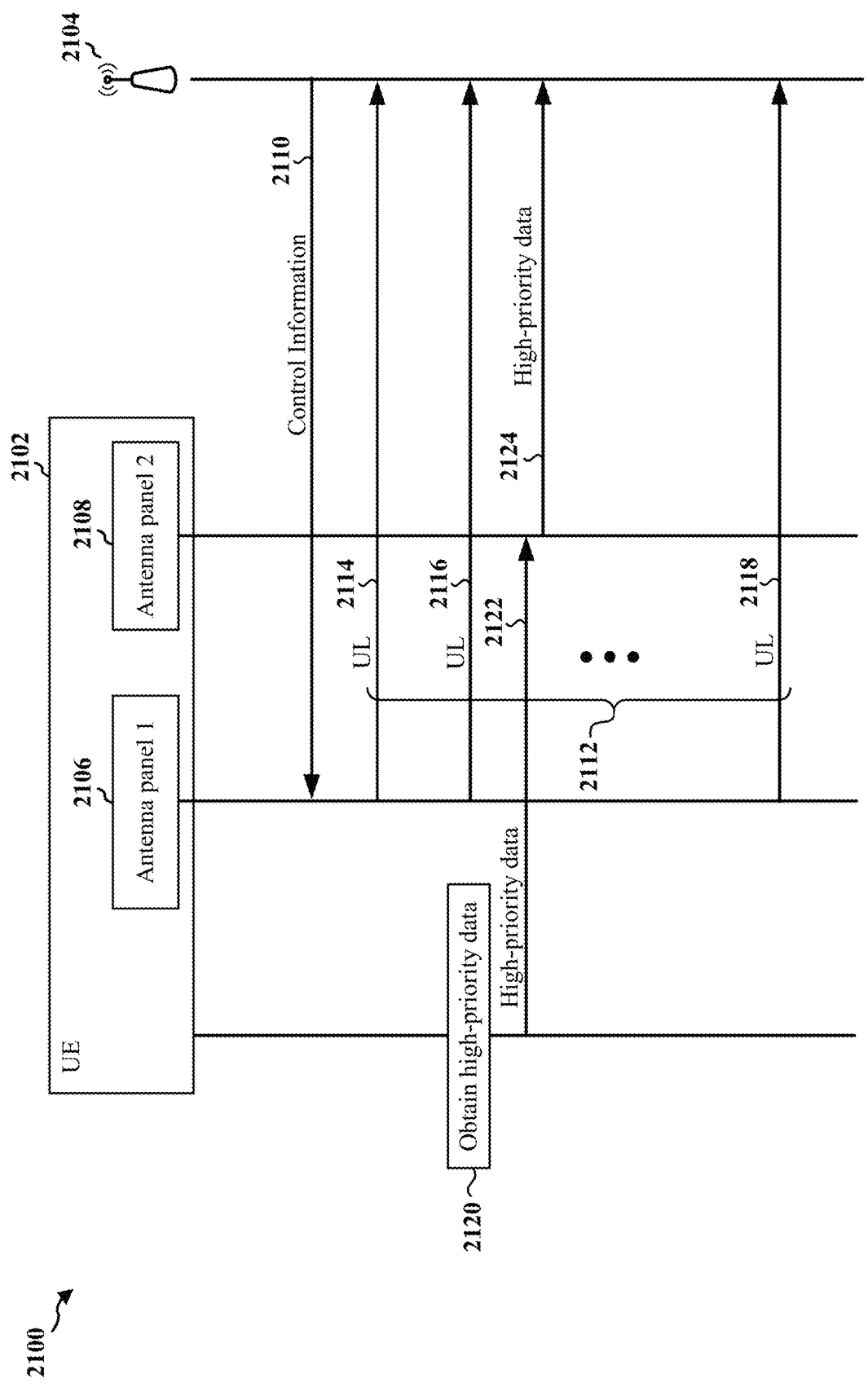
FIG. 21 illustrates a signal flow diagram in accordance with various aspects of the present disclosure.

FIG. 21 illustrates a signal flow diagram 2100 in accordance with various aspects of the present disclosure. FIG. 21 includes a UE 2102 and a base station 2104. The UE 2102 may include a first antenna panel 2106 and a second antenna panel 2108. In some examples, the UE 2102 may transmit uplink transmissions from the first antenna panel 2106 concurrently with uplink transmissions from the second antenna panel 2108.

The base station 2104 may transmit control information 2110 to the UE 2102 including a configured grant (CG) for uplink transmissions. The configured grant may indicate a periodic uplink resource for the UE 2102 and a periodicity of the periodic uplink resource. In some examples, the base station 2104 may transmit the control information 2110 including the configured grant whether or not the first UE 2102 has data to be transmitted to the base station 2104.

The base station 2104 may schedule a set of uplink transmissions 2112 for the UE 2102 (also referred to as a scheduled set of uplink transmissions 2112). The scheduled set of uplink transmissions 2112 may include one or more uplink transmissions, such as a first uplink transmission 2114, a second uplink transmission 2116, and an nth uplink transmission 2118. The UE 2102 may transmit the scheduled set of uplink transmissions 2112 from the first antenna panel 2106. In other examples, the UE 2102 may transmit the scheduled set of uplink transmissions 2112 from the second antenna panel 2108.

At 2120, the first UE 2102 may obtain high-priority data to be transmitted to the base station 2104. In some aspects of the disclosure, the base station 2104 may not be informed that the UE 2102 has obtained the high-priority data at 2120.

The UE 2102 may provide (e.g., transfer) the high-priority data obtained at 2120 to the second antenna panel 2108 via a signal 2122. The UE 2102 may transmit the high-priority data obtained at 2120 in an uplink transmission 2124 via the second antenna panel 2108 using the periodic uplink resource associated with the configured grant. It should be noted that the UE 2102 may transmit the uplink transmission 2124 while the UE 2102 transmits the scheduled set of uplink transmissions 2112.

Figure 22:
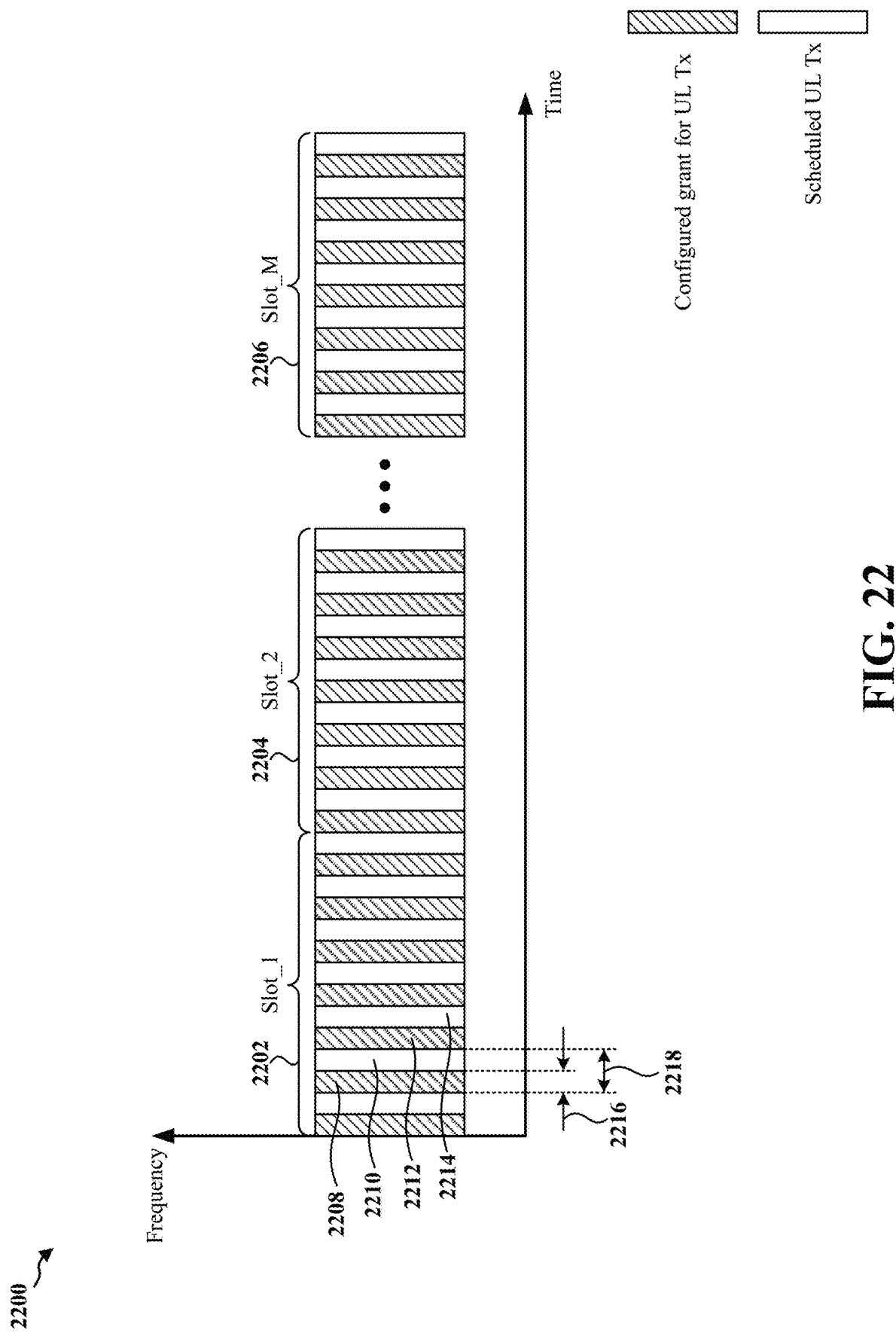
FIG. 22 illustrates an exemplary configured grant for a UE.

For example, FIG. 22 illustrates an exemplary configured grant for the UE 2102. In FIG. 22, each slot (e.g., slot_1 2202, slot_2 2204, slot_M 2206, where M is an integer greater than or equal to 3) may include 14 symbols, such as symbols 2208, 2210, 2212, 2214. Each symbol (e.g., symbols 2208, 2210, 2212, 2214) may have a symbol duration 2216.

In one example, the base station 2104 may configure the UE 2102 (e.g., via the control information 2110) with a configured grant (CG) that periodically allocates an uplink resource to the UE 2102 in alternating symbols. For example, the shaded symbols in FIG. 22 (e.g., symbols 2208 and 2212) may include uplink resources associated with the configured grant and the non-shaded symbols may include uplink resources for the scheduled set of uplink transmissions 2112. In some examples, the shaded symbols in FIG. 22 (e.g., symbols 2208 and 2212) may include uplink resources associated with the configured grant overlapping with uplink resources for the scheduled set of uplink transmissions 2112. When the base station 2104 implements a configured grant, the periodic uplink resources may be allocated for the UE 2102 without the need for a scheduling request from the UE 2102 and/or may be allocated whether or not the UE 2102 has data to transmit on the uplink.

The periodicity 2218 of the uplink resource associated with the configured grant may be configured to be less than or equal to an acceptable latency for the high-priority data obtained at 2120. This may ensure that the UE 2102 has timely access to an uplink resource after obtaining the high-priority data to meet the latency requirements of the high-priority data. For example, if the first UE 2102 obtains the high-priority data (e.g., at 2120 in FIG. 21) during the symbol 2210, the periodicity 2218 in FIG. 22 may enable the UE 2102 to transmit the high-priority data in the subsequent symbol 2212. In some examples, if the high-priority data obtained at 2120 in FIG. 21 has higher latency requirements, the periodicity 2218 in FIG. 22 may be lower than is shown in FIG. 22. In these examples, an uplink resource may be available to the UE 2102 in every symbol. In some examples, if the high-priority data obtained at 2120 in FIG. 21 can tolerate larger delays, the periodicity 2218 in FIG. 22 may be greater than is shown in FIG. 22.

Figure 23:
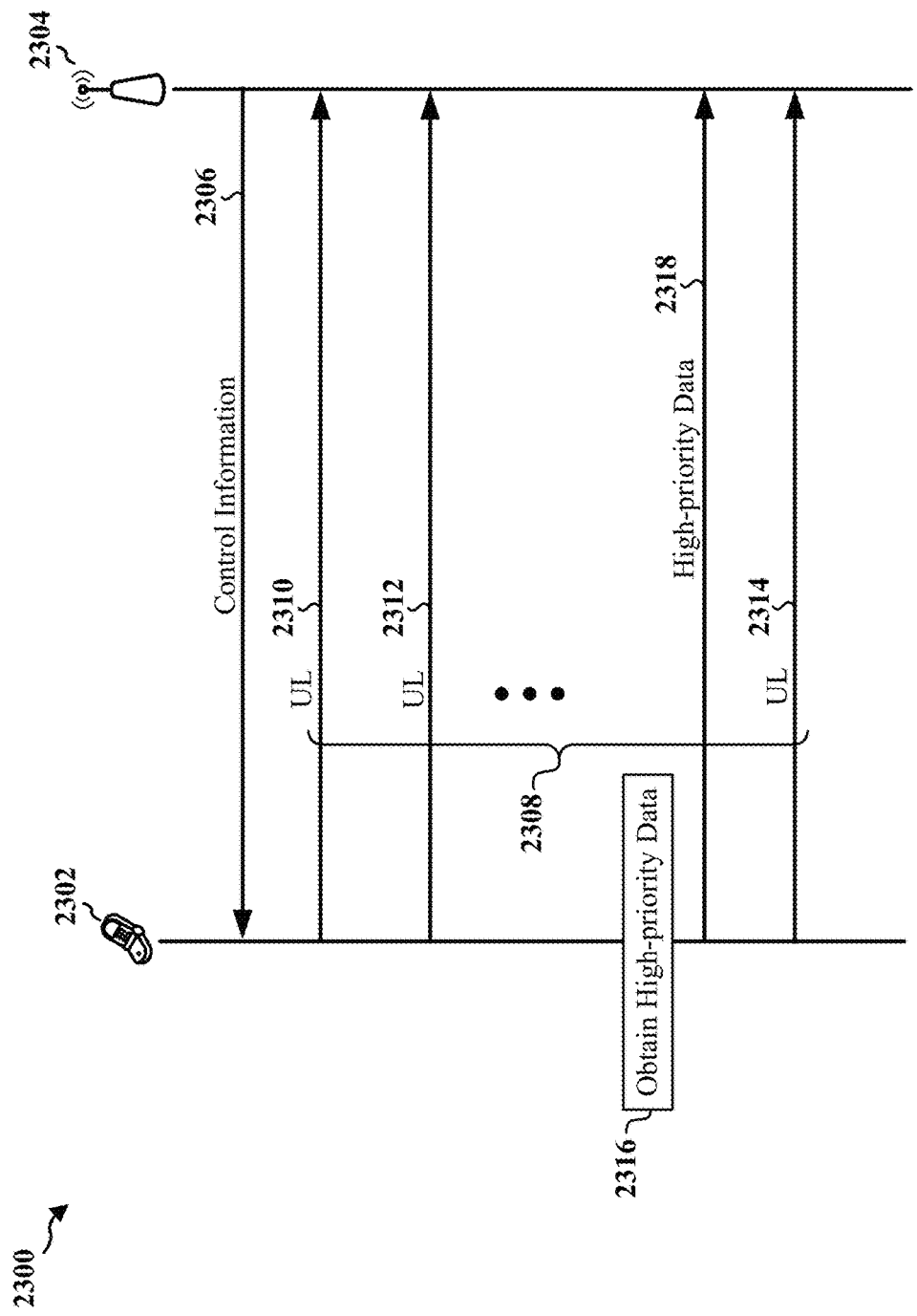
FIG. 23 illustrates a signal flow diagram in accordance with various aspects of the present disclosure.

FIG. 23 illustrates a signal flow diagram 2300 in accordance with various aspects of the present disclosure. FIG. 23 includes a UE 2302 and a base station 2304. The base station 2304 may transmit control information 2306 to the UE 2302 including a configured grant (CG) for uplink transmissions. The configured grant may indicate a periodic uplink resource for the UE 2302 and a periodicity of the periodic uplink resource. In some examples, the base station 2304 may transmit the control information 2306 including the configured grant whether or not the UE 2302 has data to be transmitted to the base station 2304.

The base station 2304 may schedule a set of uplink (UL) transmissions 2308 (also referred to as a scheduled set of uplink transmissions 2308) for the UE 2302. The scheduled set of uplink transmissions 2308 may include one or more uplink transmissions, such as a first uplink transmission 2310, a second uplink transmission 2312, and an nth uplink transmission 2314.

At 2316, the UE 2302 may obtain high-priority data to be transmitted to the base station 2304. In some aspects of the disclosure, the base station 2304 may not be informed that the UE 2302 has obtained the high-priority data at 2316.

The UE 2302 may transmit the high-priority data obtained at 2316 in an uplink (UL) transmission 2318 using the periodic uplink resource associated with the configured grant. For example, with reference to FIG. 22, the base station 2304 may configure the UE 2302 (e.g., via the control information 2306) with a configured grant that periodically allocates an uplink resource to the UE 2302 in alternating symbols. For example, the shaded symbols in FIG. 22 (e.g., symbols 2208 and 2212) may include uplink resources associated with the configured grant, and the non-shaded symbols (e.g., symbols 2210, 2214) may include uplink resources for the scheduled set of uplink transmissions 2308. When the base station 2304 implements a configured grant, the periodic uplink resources may be allocated for the UE 2302 without the need for a scheduling request from the UE 2302 and/or may be allocated whether or not the UE 2302 has data to transmit on the uplink.

The periodicity 2218 of the uplink resource associated with the configured grant may be configured to be less than or equal to an acceptable latency for the high-priority data. This may ensure that the UE 2302 has timely access to an uplink resource after obtaining the high-priority data to meet the latency requirements of the high-priority data. For example, if the UE 2302 obtains the high-priority data (e.g., at 2316 in FIG. 23) during the symbol 2210, the periodicity 2218 in FIG. 22 may enable the UE 2302 to transmit the high-priority data in the subsequent symbol 2212. In some examples, if the high-priority data obtained at 2316 in FIG. 23 has higher latency requirements, the periodicity 2218 in FIG. 22 may be lower than is shown in FIG. 22. In these examples, an uplink resource may be available to the UE 2302 in every symbol. In some examples, if the high-priority data obtained at 2316 in FIG. 23 can tolerate larger delays, the periodicity 2218 in FIG. 22 may be greater than is shown in FIG. 22.

Figure 24:
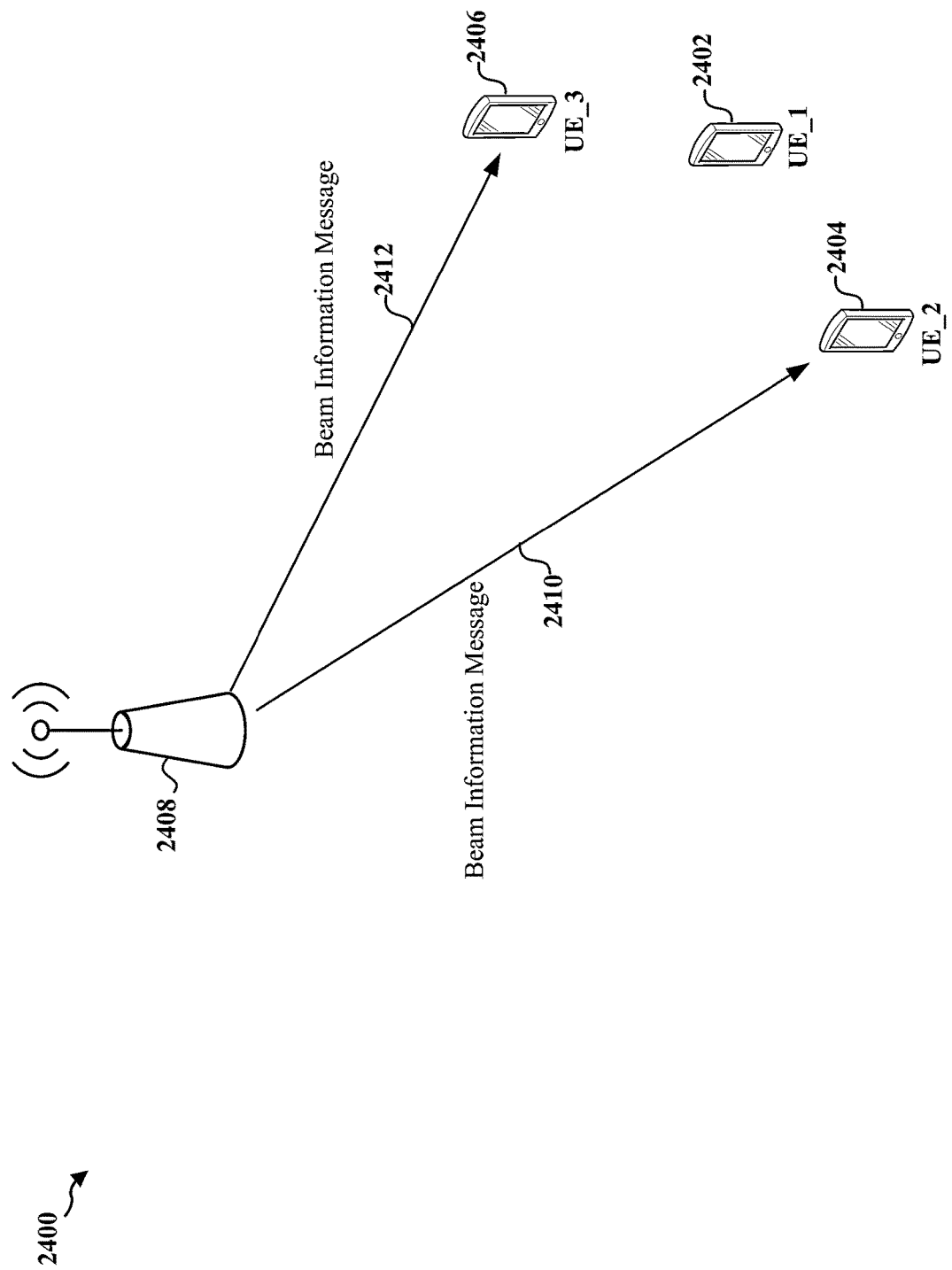
FIG. 24 illustrates an example network in accordance with various aspects of the present disclosure.

FIG. 24 illustrates an example network 2400 in accordance with various aspects of the present disclosure. The network 2400 includes a first UE (UE_1) 2402, a second UE (UE_2) 2404, a third UE (UE_3) 2406, and a base station 2408. In the example of FIG. 24, the base station 2408 may unicast a beam information message to one or more UEs in the network 2400. For example, the base station 2408 may transmit a first beam information message 2410 to the second UE 2404 and a second beam information message 2412 to the third UE 2406. In other examples, the base station 2408 may multicast the beam information message to a group of UEs (e.g., using a group common downlink control information (DCI)).

In some aspects of the disclosure, the beam information message may indicate a pairing or association between an uplink beam and a set of other uplink beams. The uplink beam may be associated with a specific UE and the set of other uplink beams may be associated with a different UE or a group of different UEs. When the specific UE is transmitting uplink transmissions to the base station 2408 via the uplink beam, the different UE may use at least one beam from the set of other uplink beams associated with the uplink beam to transmit high-priority data. In some examples, the beam information message may indicate a pairing or association between a certain UE and a group of different UEs, where any of the different UEs may transmit high-priority data on the uplink when the certain UE is transmitting uplink transmissions. These aspects are described in detail with reference to FIGS. 25-27.

Figure 25:
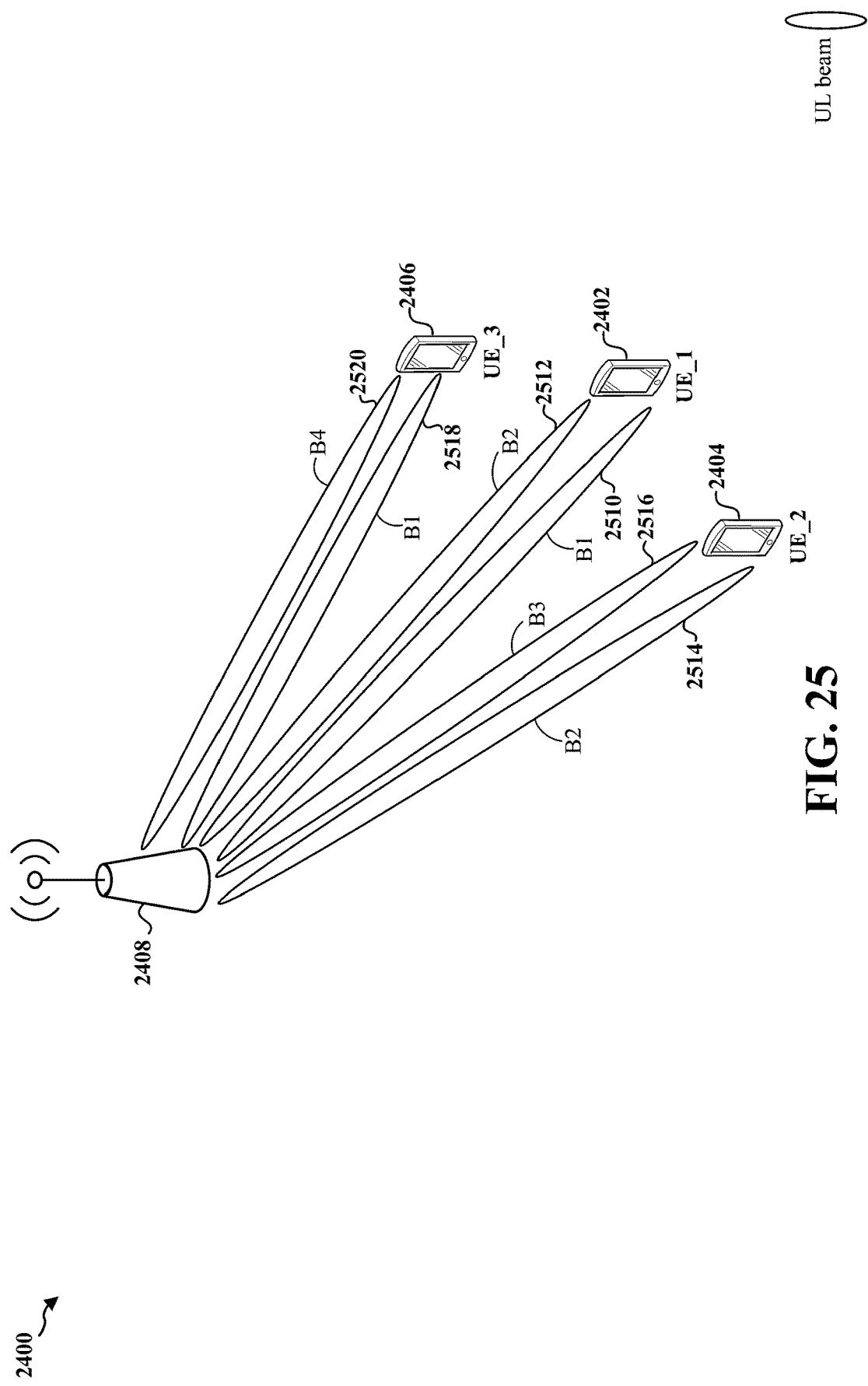
FIG. 25 illustrates an example scenario in the network of FIG. 24.

FIG. 25 illustrates an example scenario in the network 2400. In FIG. 25, each of the first, second, and third UEs 2402, 2404, 2406 may be in communication with base station 2408 using one or more beams. In the example of FIG. 25, the first UE 2402 may be in communication with base station 2408 using an uplink beam_1 (B1) 2510 and uplink beam_2 (B2) 2512, the second UE 2404 may be in communication with base station 2408 using uplink beam_2 (B2) 2514 and uplink beam_3 (B3) 2516, and the third UE 2406 may be in communication with base station 2408 using an uplink beam_1 (B1) 2518 and uplink beam_4 (B4) 2520.

The first beam information message 2410 may indicate to the second UE 2404 that uplink beam_1 (B1) 2510 is associated with uplink beam_2 (B2) 2514 and/or the uplink beam_3 (B3) 2516. The second UE 2404 may use this association to determine the uplink beam to be used when high-priority data needs to be transmitted to the base station 2408. In some examples, the first beam information message 2410 may indicate that uplink beam_1 (B1) 2510 is associated with a first set of uplink beams for unscheduled uplink transmissions including the uplink beam_2 (B2) 2514 and/or the uplink beam_3 (B3) 2516.

The second beam information message 2412 may indicate to the third UE 2406 that the uplink beam_2 (B2) 2512 is associated with the uplink beam_1 (B1) 2518 and/or uplink beam_4 (B4) 2520. The third UE 2406 may use this association to determine the uplink beam to be used when high-priority data needs to be transmitted to the base station 2408. In some examples, the second beam information message 2412 may indicate that uplink beam_2 (B2) 2512 is associated with a second set of uplink beams for unscheduled uplink transmissions including uplink beam_1 (B1) 2518 and/or uplink beam_4 (B4) 2520.

Figure 26:
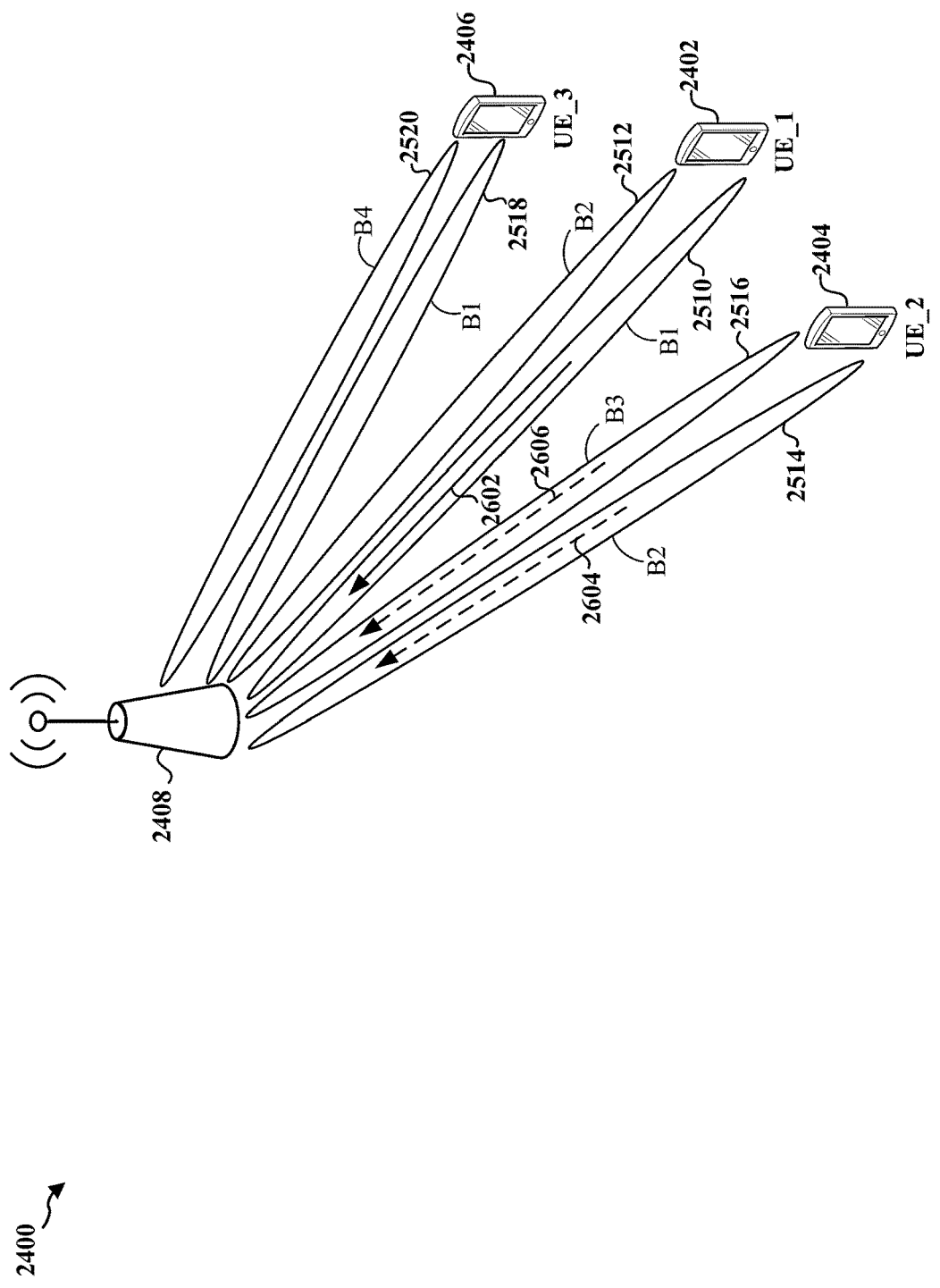
FIG. 26 illustrates an example scenario in the network of FIG. 24.
Figure 27:
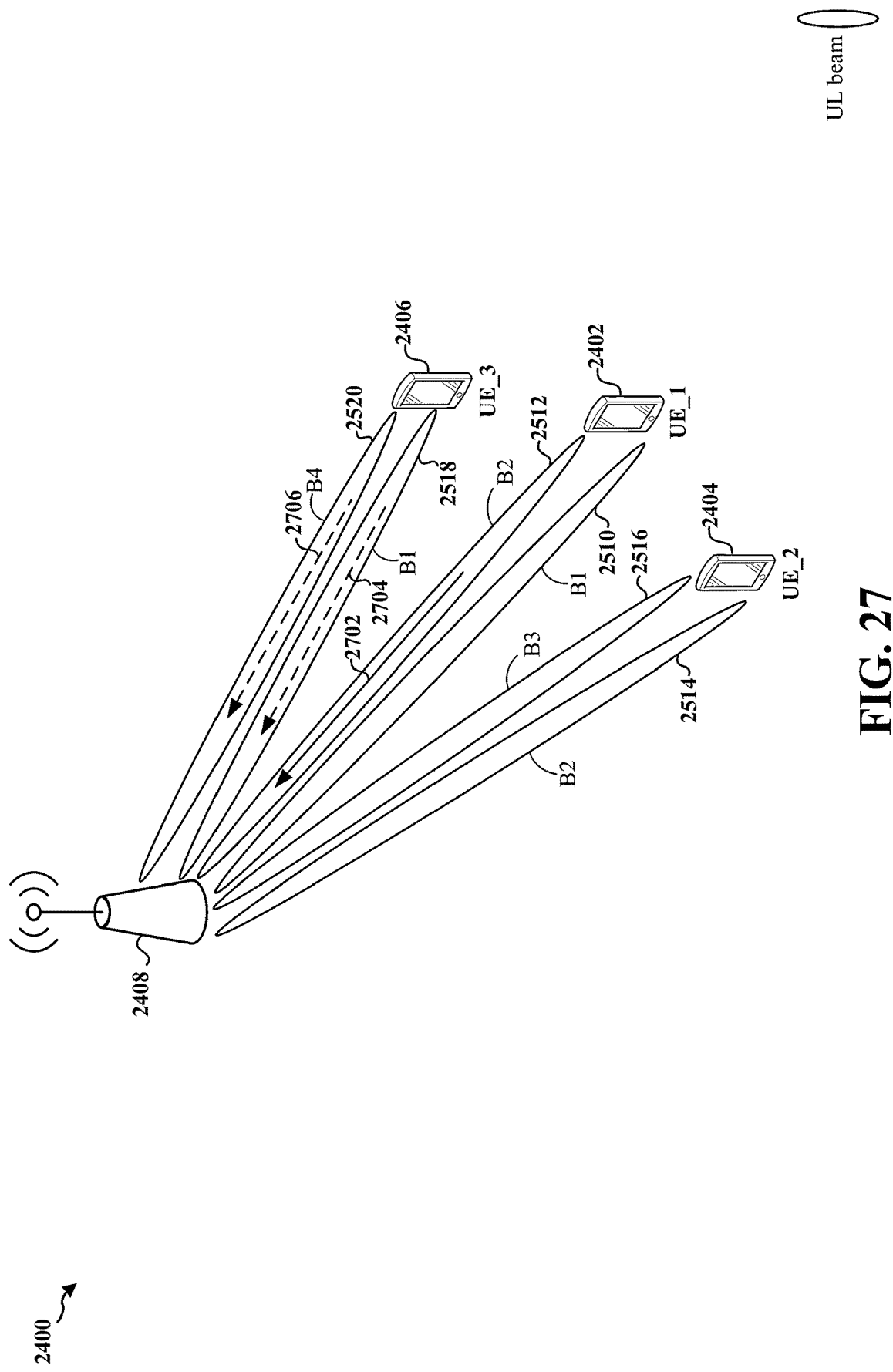
FIG. 27 illustrates an example scenario in the network of FIG. 24.

With reference to FIG. 26, if the second UE 2404 obtains high-priority data that is to be transmitted to the base station 2408 when the first UE 2402 is transmitting uplink transmissions (e.g., uplink transmission 2602) via uplink beam_1 (B1) 2510, the second UE 2404 may transmit the high-priority data in an uplink transmission 2604 via uplink beam_2 (B2) 2514 or in an uplink transmission 2606 via uplink beam_3 (B3) 2516. With reference to FIG. 27, if the third UE 2406 obtains high-priority data that is to be transmitted to the base station 2408 when the first UE 2402 is transmitting uplink transmissions (e.g., uplink transmission 2702) via uplink beam_2 (B2) 2512, the third UE 2406 may transmit the high-priority data in an uplink transmission 2704 via uplink beam_1 (B1) 2518 or in an uplink transmission 2706 via the uplink beam_4 (B4) 2520.

Since the second UE 2404 uses uplink beam_2 (B2) 2514 and/or uplink beam_3 (B3) 2516 to transmit high-priority data when the first UE 2402 is transmitting uplink transmissions via uplink beam_1 (B1) 2510, and since the third UE 2406 uses uplink beam_1 (B1) 2518 and/or uplink beam_4 (B4) 2520 to transmit high-priority data when the first UE 2402 is transmitting uplink transmissions via the uplink beam_B2 (B2) 2512, collisions on the uplink channel may be avoided or reduced when the second and third UEs 2404, 2406 need to concurrently transmit high-priority data to the base station 2408.

Figure 28:
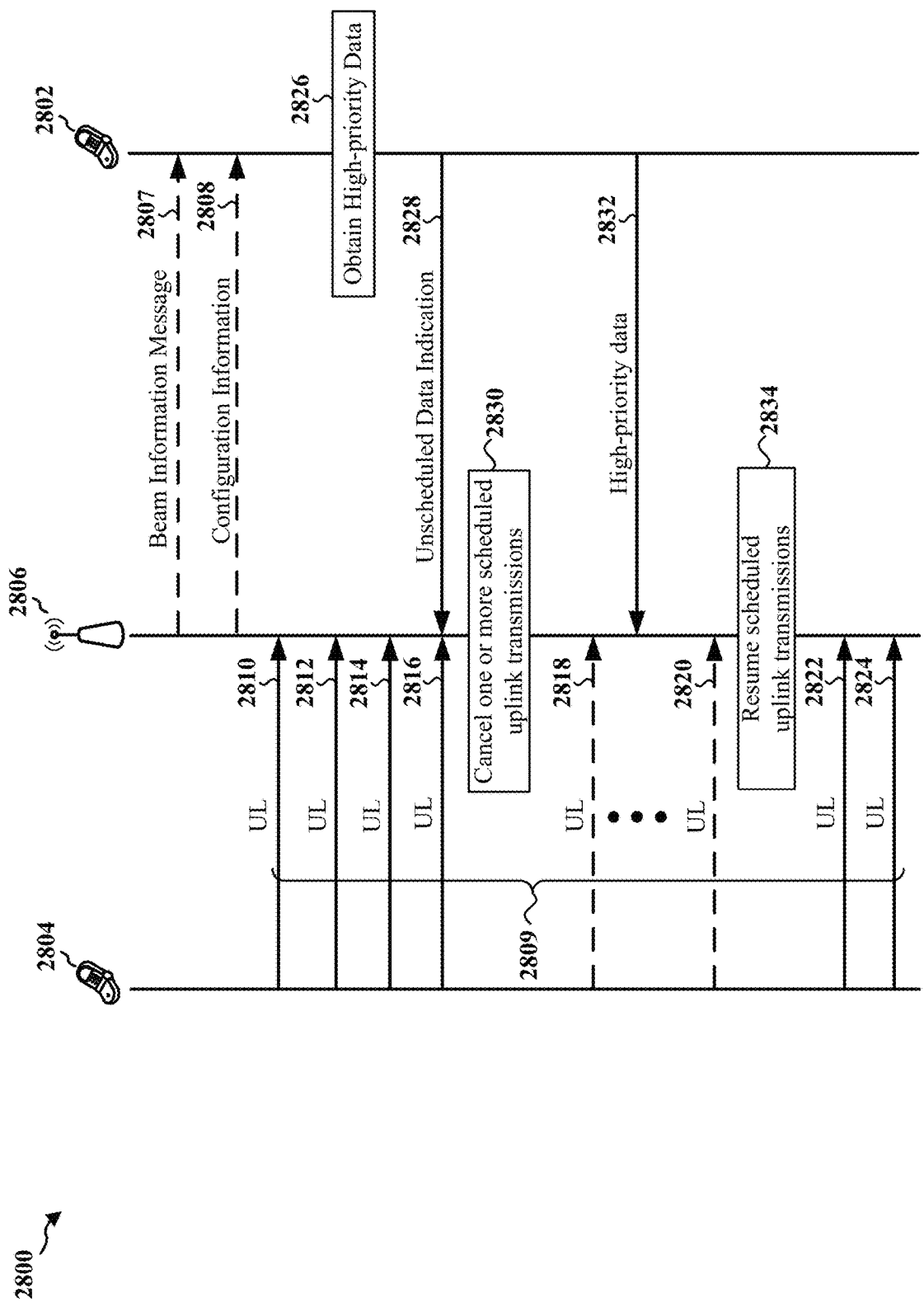
FIG. 28 illustrates a signal flow diagram in accordance with various aspects of the present disclosure.

FIG. 28 illustrates a signal flow diagram 2800 in accordance with various aspects of the present disclosure. FIG. 28 includes a first UE 2802, a second UE 2804, and a base station 2806.

The base station 2806 may optionally transmit a beam information message 2807 to the first UE 2802. As described in detail herein with reference to the first and second beam information messages 2410, 2412 in FIG. 24, the beam information message 2807 may indicate a pairing or association between an uplink beam and a set of uplink beams for unscheduled uplink transmissions. The uplink beam (e.g., the uplink beam used for the scheduled set of uplink transmissions 2809) may be associated with a specific UE (e.g., the second UE 2804) and the set of uplink beams for unscheduled uplink transmissions may be associated with a different UE (e.g., the first UE 2802) or a group of different UEs.

The base station 2806 may optionally transmit configuration information 2808. In some examples, the configuration information 2808 may include a unique indication sequence associated with the first UE 2802. For example, base station 2806 may preconfigure the first UE 2802 with the unique indication sequence using the configuration information 2808.

In some examples, the base station 2806 may schedule a set of uplink (UL) transmissions 2809 (also referred to as a scheduled set of uplink transmissions 2809) for the second UE 2804. The scheduled set of uplink transmissions 2809 may include one or more uplink transmissions, such as the uplink transmissions 2810, 2812, 2814, 2816, 2818, 2820, 2822, 2824.

At 2826, the first UE 2802 may obtain high-priority data to be transmitted to the base station 2806. In some aspects of the disclosure, the base station 2806 may not be informed that the first UE 2802 has obtained the high-priority data at 2826.

The first UE 2802 may transmit an unscheduled data indication 2828 to the base station 2806 to indicate that the first UE 2802 is to transmit high-priority data to the base station 2806 without an uplink resource allocation (e.g., without an uplink grant). The first UE 2802 may transmit the unscheduled data indication 2828 to the base station 2806 while the base station 2806 receives the scheduled set of uplink transmissions 2809 from the second UE 2804.

The base station 2806 may form a wide beam to listen for unscheduled data indications from UEs (e.g., the unscheduled data indication 2828 from the first UE 2802) in the cell served by the base station 2806 when the base station 2806 is receiving the scheduled set of uplink transmissions 2809. In some examples, the unscheduled data indication 2828 may include the unique indication sequence associated with the first UE 2802. This may enable the base station 2806 to identify the UE 2802 from the unique indication sequence in the unscheduled data indication 2828. For example, the unique indication sequence may be an m-bit word, where m is a positive integer. In some examples, the unscheduled data indication 2828 may or may not include an identifier of the UE (also referred to as the UE ID).

In some aspects of the disclosure, when the base station 2806 detects the unscheduled data indication 2828 from the first UE 2802, the base station 2806 at 2830 may cancel one or more uplink transmissions in the scheduled set of uplink transmissions 2809 in response to the unscheduled data indication 2828. For example, the first UE may use the DCI format 2-4 to cancel one or more of the scheduled set of uplink transmissions 2809.

In FIG. 28, the uplink transmission 2818 indicated with dashed lines represents the first canceled uplink transmission and the uplink transmission 2820 indicated with dashed lines represents the last canceled uplink transmission. The base station 2806 may cancel the uplink transmissions to avoid or reduce interference at the base station 2806 from the scheduled set of uplink transmissions 2809, thereby improving the ability of the base station 2806 to successfully receive any uplink transmissions that may follow the unscheduled data indication 2828.

The first UE 2802 may transmit an uplink transmission 2832 including the high-priority data to the base station 2806 within a threshold time after transmission of the unscheduled data indication 2828. In some examples, the threshold time may be set according to the acceptable latency of the high-priority data. For example, if the high-priority data is associated with a mission-critical service or an application where URLLC services are needed, the threshold time may be less than or equal to 1 ms. In other examples, the threshold time may be within a range of 1 ms to 2 ms. In some aspects, the first UE 2802 may transmit the uplink transmission 2832 including the high-priority data to the base station 2806 immediately after transmission of the unscheduled data indication 2818.

Since the base station 2806 cancels one or more of the uplink transmissions in the scheduled set of uplink transmissions 2809 in response to the unscheduled data indication 2828, the base station 2806 may successfully receive the uplink transmission 2832. At 2834, the base station 2806 may resume reception of the scheduled set of uplink transmissions 2809 (e.g., by rescheduling uplink transmissions for the second UE 2804).

In some examples, the first UE 2802 may transmit the uplink transmission 2832 including the high-priority data using an uplink beam from a set of uplink beams for unscheduled uplink transmissions indicated in the beam information message 2807.

Figure 29:
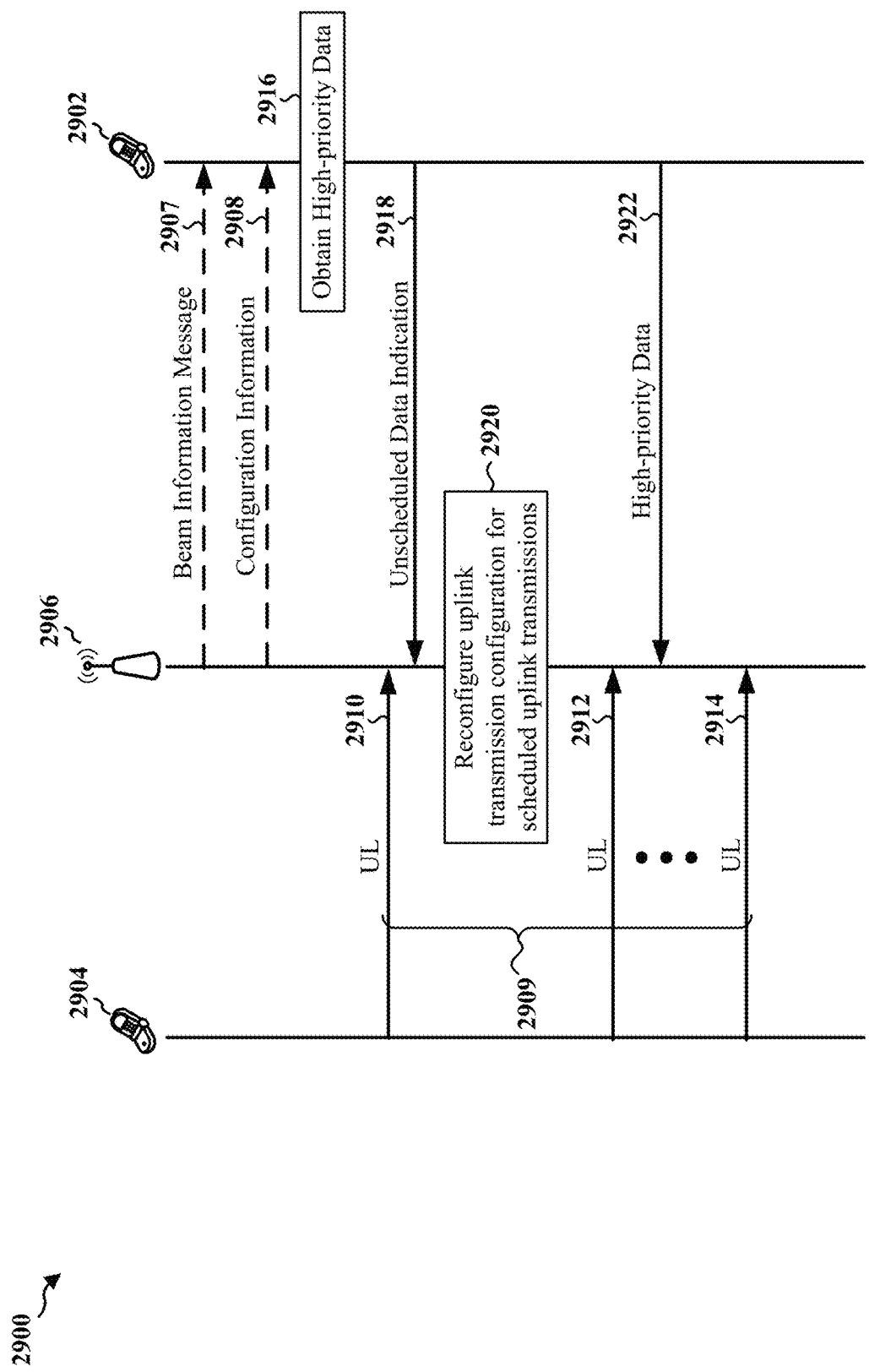
FIG. 29 illustrates a signal flow diagram in accordance with various aspects of the present disclosure.

FIG. 29 illustrates a signal flow diagram 2900 in accordance with various aspects of the present disclosure. FIG. 29 includes a first UE 2902, a second UE 2904, and a base station 2906.

The base station 2906 may optionally transmit a beam information message 2907 to the first UE 2902. As described in detail herein with reference to the first and second beam information messages 2410, 2412 in FIG. 24, the beam information message 2907 may indicate a pairing or association between an uplink beam and a set of uplink beams for unscheduled uplink transmissions. The uplink beam (e.g., the uplink beam used for the scheduled set of uplink transmissions 2909) may be associated with a specific UE (e.g., the second UE 2904) and the set of uplink beams for unscheduled uplink transmissions may be associated with a different UE (e.g., the first UE 2902) or a group of different UEs.

The base station 2906 may optionally transmit configuration information 2908.

In some examples, the configuration information 2908 may include a unique indication sequence associated with the first UE 2902. For example, base station 2906 may preconfigure the first UE 2902 with the unique indication sequence using the configuration information 2908.

In some examples, the base station 2906 may schedule a set of uplink (UL) transmissions 2909 for the second UE 2904. The scheduled set of uplink transmissions 2909 may include one or more uplink transmissions, such as the first uplink transmission 2910, the second uplink transmission 2912, and the nth uplink transmission 2914.

At 2916, the first UE 2902 may obtain high-priority data to be transmitted to the base station 2906. In some aspects of the disclosure, the base station 2906 may not be informed that the first UE 2902 has obtained the high-priority data at 2916.

The first UE 2902 may transmit an unscheduled data indication 2918 to the base station 2906 to indicate that the first UE 2902 is to transmit high-priority data to the base station 2906 without an uplink resource allocation (e.g., without an uplink grant). The first UE 2902 may transmit the unscheduled data indication 2918 to the base station 2906 while the base station 2906 receives the scheduled set of uplink transmissions 2909 from the second UE 2904.

The base station 2906 may form a wide beam to listen for unscheduled data indications from UEs (e.g., the unscheduled data indication 2918 from the first UE 2902) in the cell served by the base station 2906 when the base station 2906 is receiving the scheduled set of uplink transmissions 2909. In some examples, the unscheduled data indication 2918 may include the unique indication sequence associated with the first UE 2902. This may enable the base station 2906 to identify the UE 2902 from the unique indication sequence in the unscheduled data indication 2918. For example, the unique indication sequence may be an m-bit word, where m is a positive integer. In some examples, the unscheduled data indication 2918 may or may not include an identifier of the UE (also referred to as the UE ID).

In some aspects of the disclosure, when the base station 2906 detects the unscheduled data indication 2918 from the first UE 2902, the base station 2906 at 2920 may reconfigure an uplink transmission configuration for the scheduled set of uplink transmissions 2909 in response to the unscheduled data indication 2918. For example, the base station 2906 may configure a different MCS for the scheduled set of uplink transmissions 2909 and/or a different transmit power for the scheduled set of uplink transmissions 2909 in response to the unscheduled data indication 2918. For example, the different MCS may include a lower MCS value (e.g., a lower MCS index value) for the scheduled set of uplink transmissions 2909. For example, the different transmit power may include a lower transmit power for the scheduled set of uplink transmissions 2909 to avoid or reduce self-interference at the base station 2906, thereby improving the ability of the base station 2906 to successfully receive any uplink transmissions that may follow the unscheduled data indication 2918.

The first UE 2902 may transmit an uplink transmission 2922 including the high-priority data to the base station 2906 within a threshold time after transmission of the unscheduled data indication 2918. In some examples, the threshold time may be set to the acceptable latency of the high-priority data. For example, if the high-priority data is associated with a mission-critical service or an application where URLLC services are needed, the threshold time may be less than or equal to 1 ms. In other examples, the threshold time may be within a range of 1 ms to 2 ms. In some aspects, the first UE 2902 may transmit the uplink transmission 2922 including the high-priority data to the base station 2906 immediately after transmission of the unscheduled data indication 2918. Since the base station 2906 reconfigures the uplink transmission configuration for the scheduled set of uplink transmissions 2909 in response to the unscheduled data indication 2918, the base station 2906 may successfully receive the uplink transmission 2922.

In some examples, the first UE 2902 may transmit the uplink transmission 2922 including the high-priority data using an uplink beam from a set of uplink beams for unscheduled uplink transmissions indicated in the beam information message 2907.

Figure 30:
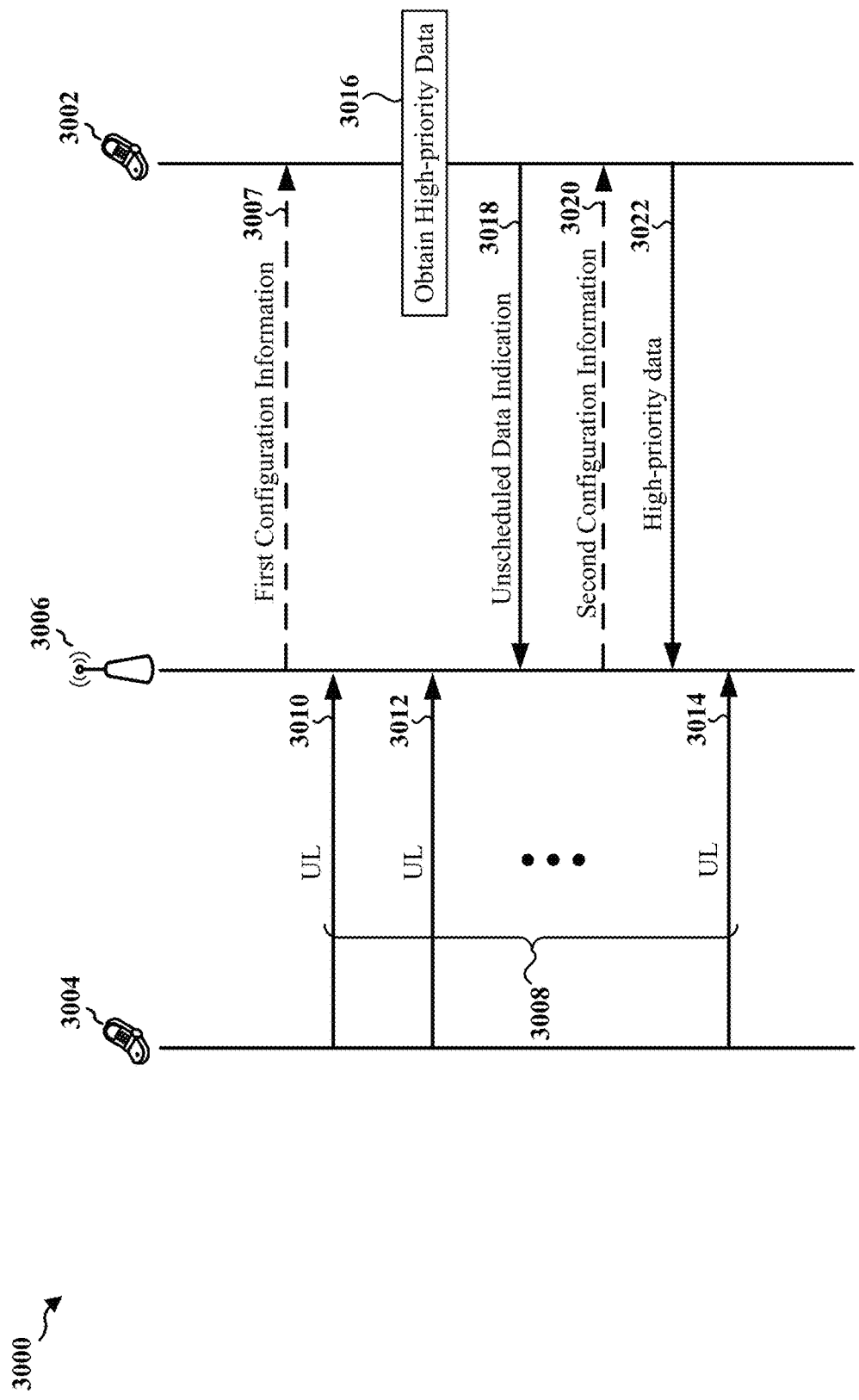
FIG. 30 illustrates a signal flow diagram in accordance with various aspects of the present disclosure.

FIG. 30 illustrates a signal flow diagram 3000 in accordance with various aspects of the present disclosure. FIG. 30 includes a first UE 3002, a second UE 3004, and a base station 3006.

The base station 3006 may optionally transmit first configuration information 3007. In some examples, the first configuration information 3007 may include a unique indication sequence associated with the first UE 3002. For example, base station 3006 may preconfigure the first UE 3002 with the unique indication sequence using the first configuration information 3007.

In some examples, the base station 3006 may schedule a set of uplink (UL) transmissions 3008 (also referred to as a scheduled set of uplink transmissions 3008) for the second UE 3004. The set of uplink transmissions 3008 may include one or more uplink transmissions, such as a first uplink transmission 3010, a second uplink transmission 3012, and an nth uplink transmission 3014.

At 3016, the first UE 3002 may obtain high-priority data to be transmitted to the base station 3006. In some aspects of the disclosure, the base station 3006 may not be informed that the first UE 3002 has obtained the high-priority data at 3016.

The first UE 3002 may transmit an unscheduled data indication 3018 to the base station 3006 to indicate that the first UE 3002 is to transmit high-priority data to the base station 3006 without an uplink resource allocation (e.g., without an uplink grant). The first UE 3002 may transmit the unscheduled data indication 3018 to the base station 3006 while the base station 3006 receives the scheduled set of uplink transmissions 3008 from the second UE 3004.

The base station 3006 may form a wide beam to listen for unscheduled data indications from UEs (e.g., the unscheduled data indication 3018 from the first UE 3002) in the cell served by the base station 3006 when the base station 3006 is receiving the scheduled set of uplink transmissions 3008. In some examples, the unscheduled data indication 3018 may include the unique indication sequence associated with the first UE 3002. This may enable the base station 3006 to identify the first UE 3002 from the unique indication sequence in the unscheduled data indication 3018. For example, the unique indication sequence may be an m-bit word, where m is a positive integer. In some examples, the unscheduled data indication 3018 may or may not include an identifier of the first UE 3002 (also referred to as the UE ID).

In some aspects of the disclosure, when the base station 3006 detects the unscheduled data indication 3018 from the first UE 3002, the base station 3006 may optionally respond by transmitting second configuration information 3020 to the first UE 3002. The second configuration information 3020 may facilitate or improve the ability of the base station 3006 to receive the high-priority data. In some examples, the second configuration information 3020 may include an uplink MCS, a transmit power configuration, and/or an uplink beam configuration for transmission of the high-priority data.

In one example, the uplink MCS indicated in the second configuration information 3020 may include a higher MCS value (e.g., a higher MCS index value) than the MCS value used for the scheduled set of uplink transmissions 3008. In another example, the uplink MCS indicated in the second configuration information 3020 may include an MCS value that is greater than or equal to a threshold MCS value (e.g., a threshold MCS index value). In other examples, the uplink MCS indicated in the second configuration information 3020 may include an MCS value that enables the base station 1506 to successfully receive uplink transmissions from the first UE 3002 while the second UE 3004 transmits the scheduled set of uplink transmissions 3008.

In some examples, the transmit power configuration indicated in the second configuration information 3020 may include a transmit power that is greater than or equal to a threshold transmit power. In some examples, the transmit power configuration may include a transmit power that is the maximum permissible transmission power the first UE 3002 may use for an uplink transmission. In some examples, the uplink beam configuration may indicate an uplink beam (e.g., a best uplink beam from a set of candidate uplink beams) to be used for transmission of an uplink transmission (e.g., uplink transmission 3022).

The first UE 3002 may transmit an uplink transmission 3022 including the high-priority data to the base station 3006 within a threshold time after transmission of the unscheduled data indication 3018. In some examples, the threshold time may be set to the acceptable latency of the high-priority data. For example, if the high-priority data is associated with a mission-critical service or an application where URLLC services are needed, the threshold time may be less than or equal to 1 ms. In other examples, the threshold time may be within a range of 1 ms to 2 ms. In some aspects, the first UE 3002 may transmit the uplink transmission 3022 including the high-priority data to the base station 3006 immediately after transmission of the unscheduled data indication 3018.

In some aspects of the disclosure, if the first UE 3002 has received the second configuration information 3020, the first UE 3002 may transmit the uplink transmission 3022 including the high-priority data based on the uplink MCS, the transmit power configuration, and/or the uplink beam configuration included in the second configuration information 3020.

Figure 31:
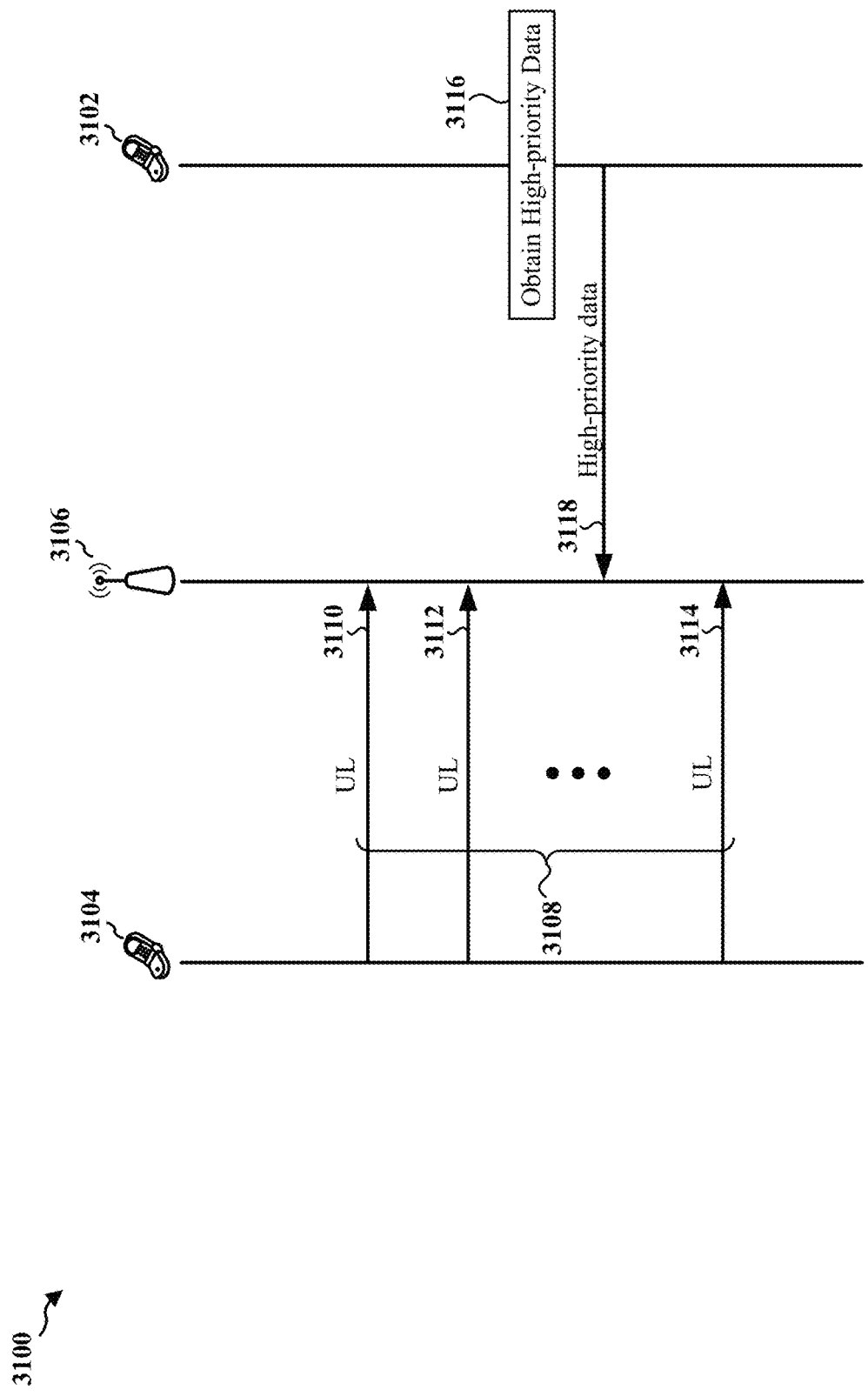
FIG. 31 illustrates a signal flow diagram in accordance with various aspects of the present disclosure.

FIG. 31 illustrates a signal flow diagram 3100 in accordance with various aspects of the present disclosure. FIG. 31 includes a first UE 3102, a second UE 3104, and a base station 3106. The base station 3106 may schedule a set of uplink (UL) transmissions 3108 (also referred to as a scheduled set of uplink transmissions 3108) for the second UE 3104. The scheduled set of uplink transmissions 3108 may include one or more uplink transmissions, such as a first uplink transmission 3110, a second uplink transmission 3112, and an nth uplink transmission 3114.

At 3116, the first UE 3102 may obtain high-priority data to be transmitted to the base station 3106. In some aspects of the disclosure, the base station 3106 may not be informed that the first UE 3102 has obtained the high-priority data at 3116.

The first UE 3102 may transmit the high-priority data obtained at 3116 in an uplink (UL) transmission 3118 using a transmit power that is greater than or equal to a threshold transmit power. In some examples, the first UE 3102 may use reserved, unused, or same resource blocks to transmit the high-priority data obtained at 3116. In some examples, the transmit power may be the maximum permissible transmission power the first UE 3102 may use for an uplink transmission. In some examples, the first UE 3102 may transmit the high-priority data obtained at 3116 in the uplink transmission 3118 using a transmit power that is greater than the transmit power of the scheduled set of uplink transmissions 3108 from the second UE 3104.

In some scenarios, the uplink transmission 3118 including the high-priority data may interfere with one or more uplink transmissions in the scheduled set of uplink transmissions 3108. This may be acceptable when the high-priority data has a higher priority than the data included in the scheduled set of uplink transmissions 3108.

Figure 32:
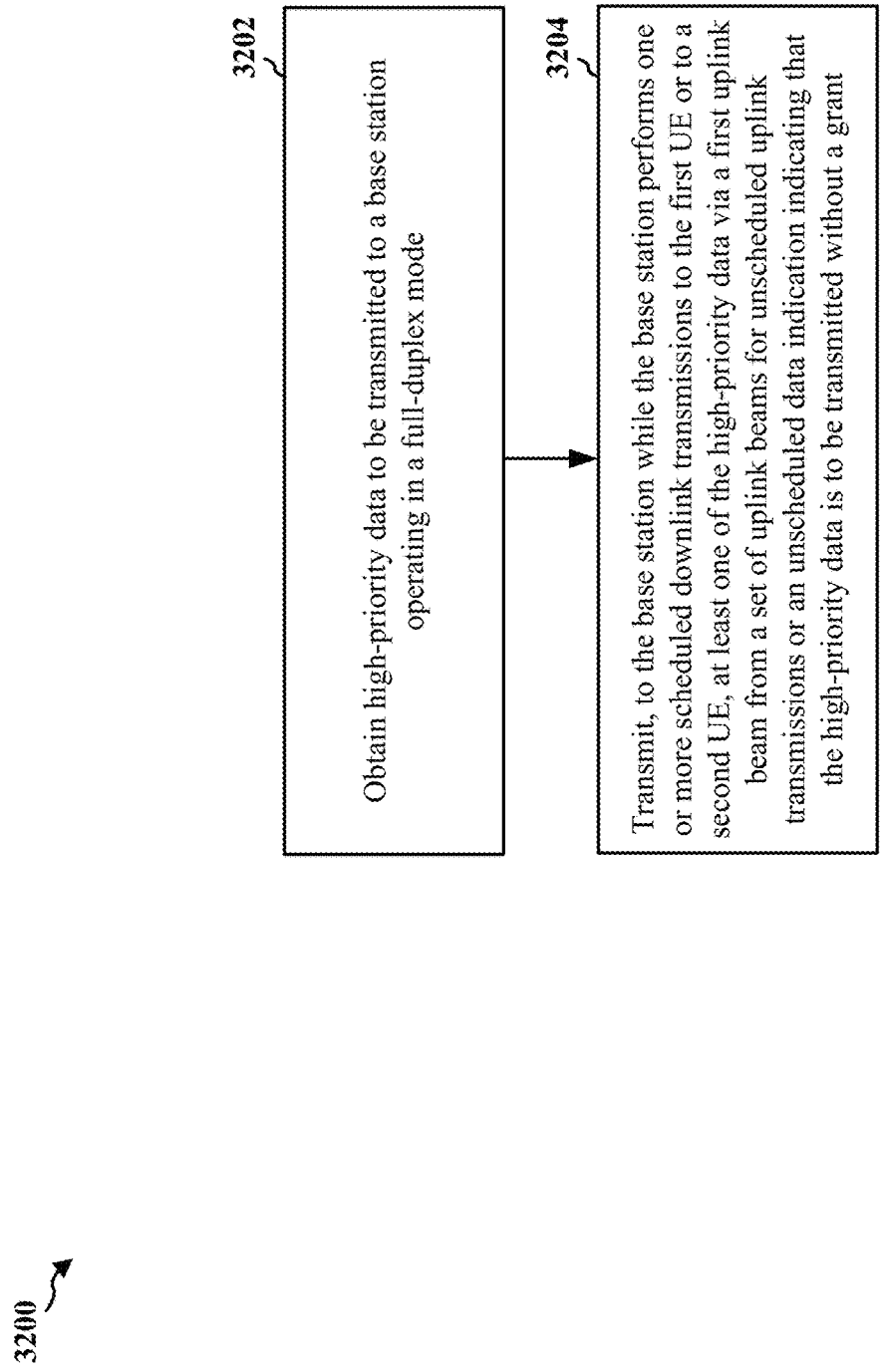
FIG. 32 is a flowchart of a method of wireless communication.

FIG. 32 is a flowchart 3200 of a method of wireless communication. The method may be performed by a first UE (e.g., the UE 802, 902, 1502, 1602, 1702, 1802, UE_2 1104, UE_3 1106; the apparatus 4002/4002'; the processing system 4114, which may include the memory 360 and which may be the entire UE 802, 902, 1502, 1602, 1702, 1802, UE_2 1104, UE_3 1106 or a component of the UE 802, 902, 1502, 1602, 1702, 1802, UE_2 1104, UE_3 1106, such as the TX processor 368, the RX processor 356, and/or the controller/processor 359).

At 3202, the first UE obtains high-priority data to be transmitted to a base station operating in a full-duplex mode. For example, the high-priority data (also referred to as urgent data or urgent traffic) may be low-latency data, such as URLLC data.

Finally, at 3204, the first UE transmits, to the base station while the base station performs one or more scheduled downlink transmissions to the first UE or to a second UE, at least one of the high-priority data via a first uplink beam from a set of uplink beams for unscheduled uplink transmissions or an unscheduled data indication indicating that the high-priority data is to be transmitted without an uplink grant.

In one example, with reference to FIG. 8, the first UE 802 may obtain high-priority-data at 816. In this example, the first UE 802 may transmit the high-priority data in an uplink beam from a set of uplink beams for unscheduled uplink transmissions indicated in the beam information message 807. In another example, with reference to FIG. 9, the first UE 902 may obtain high-priority-data at 920. In this example, the first UE 902 may transmit the high-priority data in an uplink beam from a set of uplink beams for unscheduled uplink transmissions indicated in the beam information message 908.

For example, as previously described with reference to FIG. 13, if the second UE (UE_2) 1104 in the network 1100 obtains high-priority data that is to be transmitted to the base station 1108 when the first UE 1102 is receiving scheduled downlink transmissions (e.g., downlink transmission 1302) via downlink beam_1 (B1) 1210, the second UE 1104 may transmit the high-priority data in an uplink transmission 1304 or 1306 via an uplink beam in the set of uplink beams for unscheduled uplink transmissions including uplink beam_2 (B2) 1214 and uplink beam_3 (B3) 1216.

In some examples, the unscheduled data indication indicating that the high-priority data is to be transmitted without a grant may be any one of the unscheduled data indications 1518, 1628, 1718, 1822 described herein. In some examples, the unscheduled data indication may include a unique indication sequence associated with the first UE.

For example, with reference to FIG. 15, the first UE 1502 may transmit the unscheduled data indication 1518 to the base station 1506 to indicate that the first UE 1502 is to transmit high-priority data to the base station 1506 without an uplink resource allocation (e.g., without an uplink grant). The first UE 1502 may transmit the unscheduled data indication 1518 to the base station 1506 while the base station 1506 transmits the set of downlink (DL) transmissions 1508 to the second UE 1504.

In some aspects of the disclosure, the first UE transmits the high-priority data in a periodic uplink resource allocation associated with a configured grant. A periodicity of the periodic uplink resource allocation associated with the configured grant is configured to be less than or equal to an acceptable latency for the high-priority data.

In some examples, the first apparatus transmits the high-priority data within a threshold time after the unscheduled data indication. In one example, with reference to FIG. 16, the first UE 1602 may transmit an uplink transmission 1632 including the high-priority data to the base station 1606 within a threshold time after transmission of the unscheduled data indication 1628. In some examples, the threshold time may be set according to the acceptable latency of the high-priority data. For example, if the high-priority data is associated with a mission-critical service or an application where URLLC services are needed, the threshold time may be less than or equal to 1 ms. In other examples, the threshold time may be within a range of 1 ms to 2 ms. In some aspects, the first UE 1602 may transmit the uplink transmission 1632 including the high-priority data to the base station 1606 immediately after transmission of the unscheduled data indication 1628.

Figure 33:
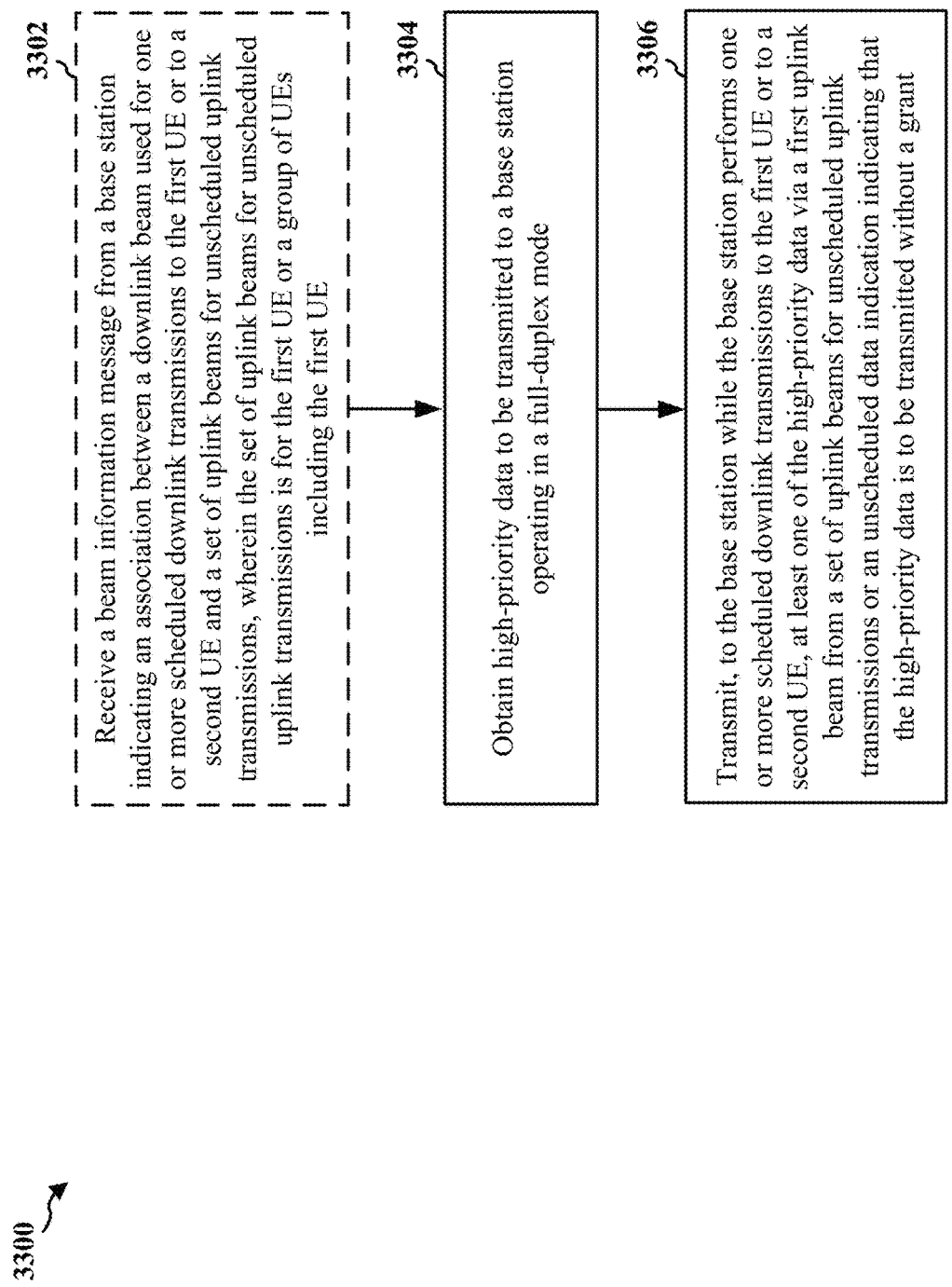
FIG. 33 is a flowchart of a method of wireless communication.

FIG. 33 is a flowchart 3300 of a method of wireless communication. The method may be performed by a first UE (e.g., the UE 802, 902, UE_2 1104, UE_3 1106; the apparatus 4002/4002'; the processing system 4114, which may include the memory 360 and which may be the entire UE 802, 902, UE_2 1104, or UE_3 1106, or a component of the UE 802, UE_2 1104, or UE_3 1106, such as the TX processor 368, the RX processor 356, and/or the controller/processor 359). In FIG. 33, blocks indicated with dashed lines represent optional blocks.

At 3302, the first UE receives a beam information message from a base station indicating an association between a downlink beam used for one or more scheduled downlink transmissions to the first UE or to a second UE and a set of uplink beams for unscheduled uplink transmissions. The set of uplink beams for unscheduled uplink transmissions is for the first UE or a group of UEs including the first UE. For example, the beam information message may be any one of the beam information messages 807, 908, 1110, and 1112 described herein.

In some examples, the beam information message may indicate a pairing or association between a downlink beam and a set of uplink beams for unscheduled uplink transmissions. The downlink beam may be associated with a specific UE (e.g., the second UE 904 in FIG. 9) and the set of uplink beams for unscheduled uplink transmissions may be associated with a different UE (e.g., the first UE 902 in FIG. 9) or a group of different UEs. When the specific UE (e.g., the second UE 904 in FIG. 9) is receiving downlink transmissions from the base station (e.g., base station 906) via the downlink beam, the different UE (e.g., the first UE 902 in FIG. 9) may use at least one beam from the set of uplink beams for unscheduled uplink transmissions associated with the downlink beam to transmit high-priority data.

For example, with reference to FIG. 13, if the second UE (UE_2) 1104 obtains high-priority data that is to be transmitted to the base station 1108 when the first UE 1102 is receiving scheduled downlink transmissions (e.g., downlink transmission 1302) via downlink beam_1 (B1) 1210, the second UE 1104 may transmit the high-priority data in an uplink transmission 1304 or 1306 via an uplink beam in the set of uplink beams for unscheduled uplink transmissions including uplink beam_2 (B2) 1214 and uplink beam_3 (B3) 1216.

At 3304, the first UE obtains high-priority data to be transmitted to the base station operating in a full-duplex mode. For example, the high-priority data (also referred to as urgent data or urgent traffic) may be low-latency data, such as URLLC data. For example, with reference to FIGS. 8 and 9, the first UE 802 may obtain high-priority data at 816, and the first UE 902 may obtain high-priority data at 920. As another example, with reference to FIG. 15, the first UE 1502 may obtain high-priority data at 1516.

At 3306, the first UE transmits, to the base station while the base station performs one or more scheduled downlink transmissions to the first UE or to a second UE, at least one of the high-priority data via a first uplink beam from a set of uplink beams for unscheduled uplink transmissions or an unscheduled data indication indicating that the high-priority data is to be transmitted without a grant.

For example, with reference to FIG. 8, the first UE 802 may transmit the high-priority data in an uplink transmission 822 using an uplink beam from the set of uplink beams for unscheduled uplink transmissions indicated in the beam information message 807. For example, with reference to FIG. 9, the first UE 902 may transmit the high-priority data in an uplink transmission 922 using an uplink beam from the set of uplink beams for unscheduled uplink transmissions indicated in the beam information message 908.

In some examples, the first UE determines the set of uplink beams to be used for unscheduled uplink transmissions from the beam information message. For example, the first UE may determine the downlink beam in which the base station performs one or more scheduled downlink transmissions and may determine the set of uplink beams for unscheduled uplink transmissions associated with the determined downlink beam based on the beam information message. The first UE may then select the best beam from the set of uplink beams for unscheduled uplink transmissions.

Figure 34:
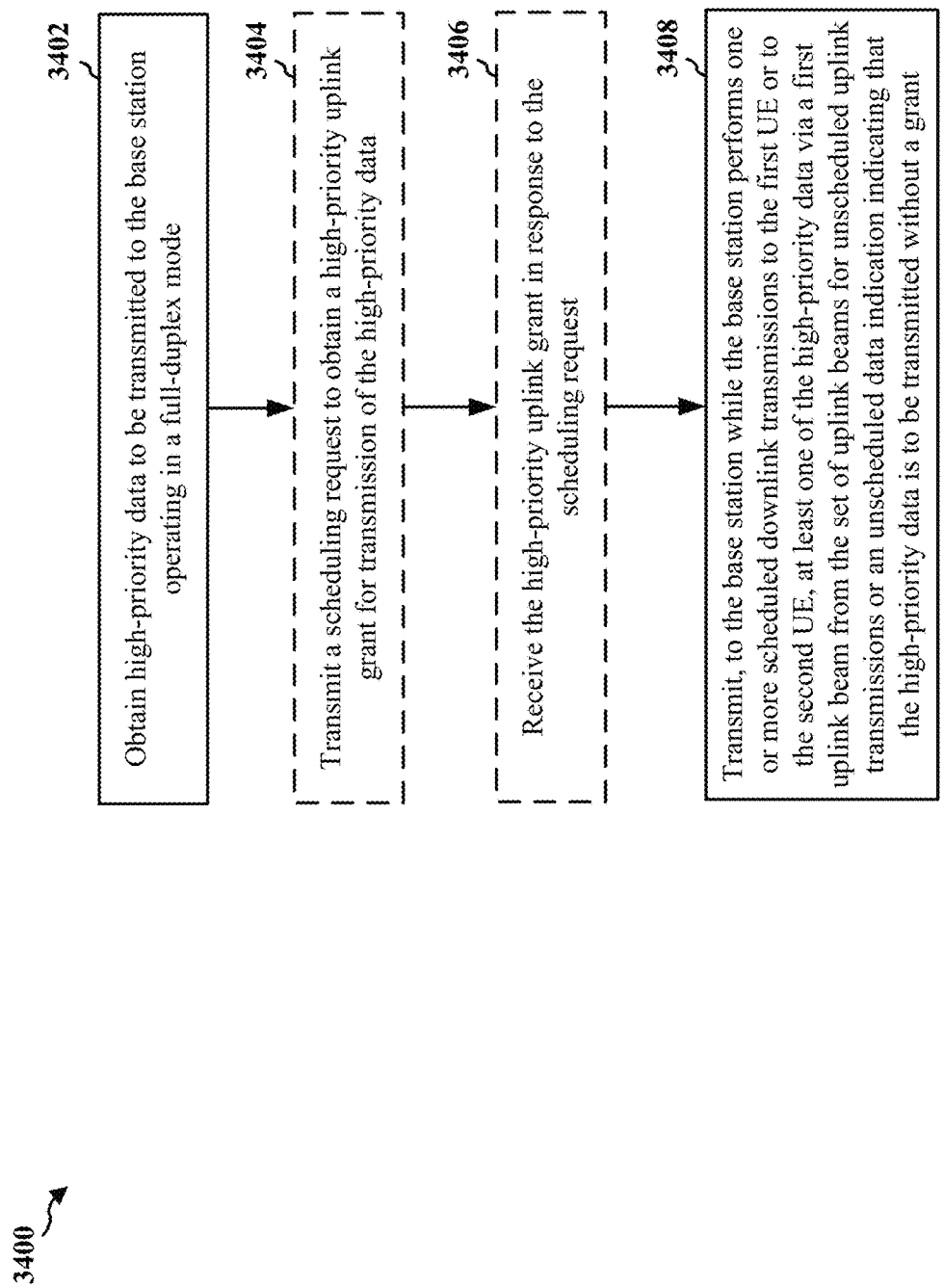
FIG. 34 is a flowchart of a method of wireless communication.

FIG. 34 is a flowchart 3400 of a method of wireless communication. The method may be performed by a first UE (e.g., the UE 802, UE_2 1104, UE_3 1106; the apparatus 4002/4002'; the processing system 4114, which may include the memory 360 and which may be the entire UE 802, UE_2 1104, or UE_3 1106, or a component of the UE 802, UE_2 1104, or UE_3 1106, such as the TX processor 368, the RX processor 356, and/or the controller/processor 359). In FIG. 34, blocks indicated with dashed lines represent optional blocks.

At 3402, the first UE obtains high-priority data to be transmitted to the base station operating in a full-duplex mode. For example, the high-priority data (also referred to as urgent data or urgent traffic) may be low-latency data, such as URLLC data. For example, with reference to FIG. 8, the first UE 802 obtains high-priority data at 816.

At 3404, the first UE transmits a scheduling request to obtain a high-priority uplink grant for transmission of the high-priority data. The scheduling request is transmitted in one of a plurality of scheduling request transmission occasions using one or more resources for the scheduling request. A time between any two consecutive scheduling request transmission occasions in the plurality of scheduling request transmission occasions is configured to be less than or equal to an acceptable latency for the high-priority data.

For example, with reference to FIG. 8, the first UE 802 may transmit a scheduling request 818 to the base station 806 to receive an uplink (UL) resource allocation (e.g., a high-priority UL grant). As shown in FIG. 8, the first UE 802 may transmit the scheduling request 818 to the base station 806 while the base station 806 transmits the scheduled set of downlink transmissions 808 to the second UE 804. Since the base station 806 is operating in the full-duplex mode, the base station 806 may receive the scheduling request 818 from the first UE 802 while transmitting the scheduled set of downlink transmissions 808 to the second UE 804.

At 3406, the first UE receives a high-priority uplink grant in response to the scheduling request. For example, with reference to FIG. 8, the first UE 802 receives the high-priority uplink grant 820 from the base station 806 in response to the scheduling request 818. In some examples, the high-priority uplink grant may include resources (e.g., time-frequency resources) that are immediately available to meet the latency requirements of the high-priority data.

Finally, at 3408, the first UE transmits, to the base station while the base station performs one or more scheduled downlink transmissions to the first UE or to the second UE, at least one of the high-priority data via a first uplink beam from the set of uplink beams for unscheduled uplink transmissions or an unscheduled data indication indicating that the high-priority data is to be transmitted without a grant. The high-priority data is transmitted using the high-priority uplink grant.

For example, the first UE 802 may transmit the high-priority data (e.g., the high-priority data obtained at 816) in an uplink transmission 822 based on the high-priority uplink grant 820. In some examples, the first UE 802 may transmit the high-priority data in an uplink transmission 822 using an uplink beam from the set of uplink beams for unscheduled uplink transmissions indicated in the beam information message 807.

Figure 35:
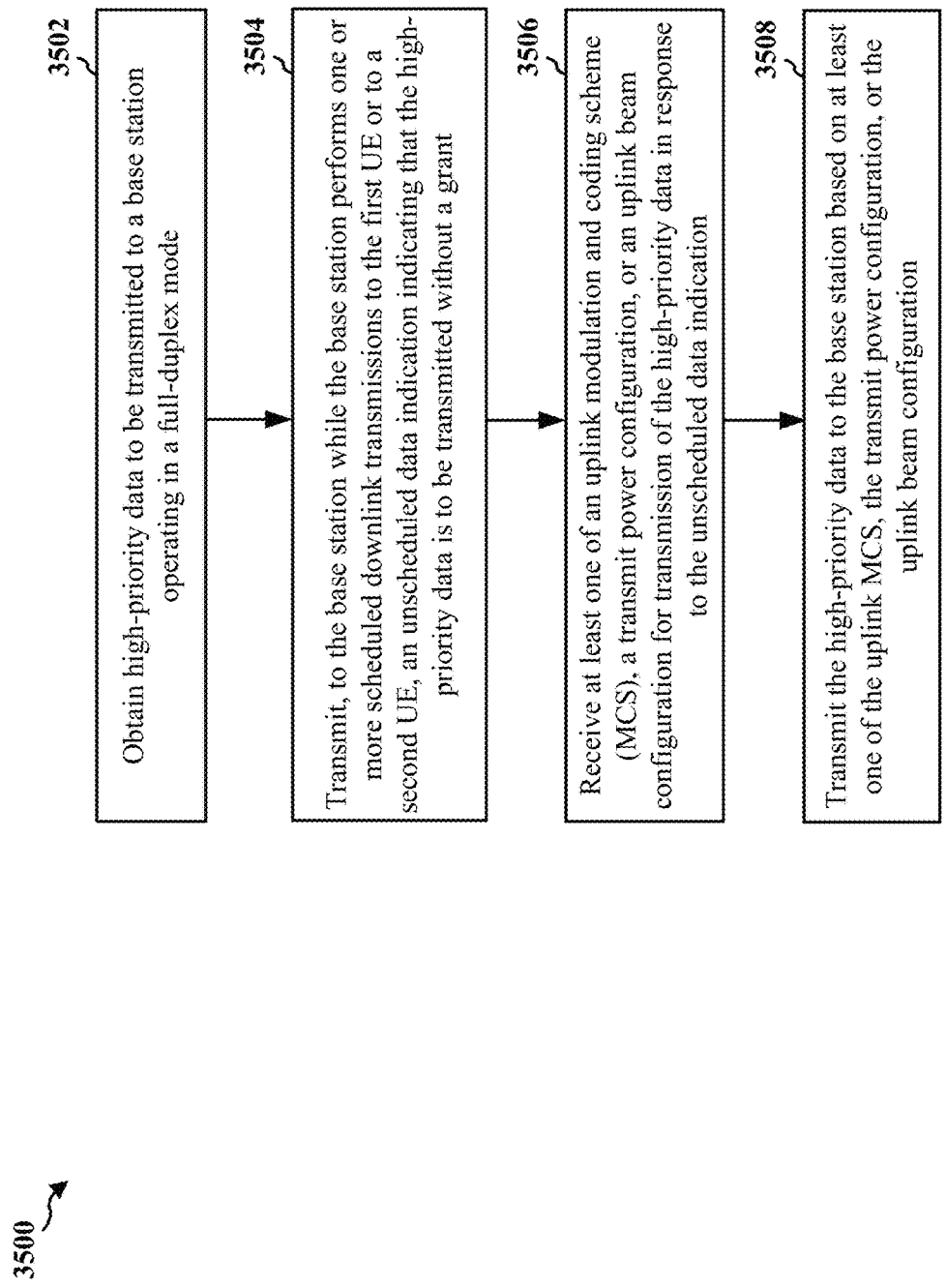
FIG. 35 is a flowchart of a method of wireless communication.

FIG. 35 is a flowchart 3500 of a method of wireless communication. The method may be performed by a first UE (e.g., the UE 1502; the apparatus 4002/4002'; the processing system 4114, which may include the memory 360 and which may be the entire UE 1502 or a component of the UE 1502, such as the TX processor 368, the RX processor 356, and/or the controller/processor 359).

At 3502, the first UE obtains high-priority data to be transmitted to a base station operating in a full-duplex mode. For example, the high-priority data (also referred to as urgent data or urgent traffic) may be low-latency data, such as URLLC data. For example, with reference to FIG. 15, the first UE 1502 may obtain high-priority data at 1516.

At 3504, the first UE transmits, to the base station while the base station performs one or more scheduled downlink transmissions to the first UE or to a second UE, an unscheduled data indication indicating that the high-priority data is to be transmitted without a grant. In some examples, the unscheduled data indication includes a unique indication sequence associated with the first apparatus. For example, with reference to FIG. 15, the first UE 1502 transmits the unscheduled data indication 1518 to the base station 1506.

At 3506, the first UE receives at least one of an uplink MCS, a transmit power configuration, or an uplink beam configuration for transmission of the high-priority data in response to the unscheduled data indication.

For example, with reference to FIG. 15, the first UE 1502 may receive the second configuration information 1520 from the base station 1506 in response to the unscheduled data indication 1518. The second configuration information 1520 may facilitate or improve the ability of the base station 1506 to receive the high-priority data in the full-duplex mode. In some examples, the second configuration information 1520 may include an uplink MCS, a transmit power configuration, and/or an uplink beam configuration for transmission of the high-priority data.

For example, the MCS indicated in the second configuration information 1520 may include a higher MCS value (e.g., a higher MCS index value) than the MCS value used for the set of downlink transmissions 1508. For example, the transmit power configuration indicated in the second configuration information 1520 may include a transmit power that is greater than or equal to a threshold transmit power. In some examples, the transmit power configuration may include a transmit power that is the maximum permissible transmission power the first UE 1502 may use for an uplink transmission. In some examples, the uplink beam configuration may indicate an uplink beam (e.g., a best uplink beam from a set of candidate uplink beams) to be used for transmission of the uplink transmission 1522.

At 3508, the first UE transmits the high-priority data to the base station based on at least one of the uplink MCS, the transmit power configuration, or the uplink beam configuration. The at least one of the uplink MCS, the transmit power configuration, or the uplink beam configuration enables the base station to receive the high-priority data in the full-duplex mode.

For example, with reference to FIG. 15, the first UE 1502 may transmit the uplink transmission 1522 including the high-priority data based on the uplink MCS, the transmit power configuration, and/or the uplink beam configuration included in the second configuration information 1520. In some examples, the uplink transmission 1522 including the high-priority data is transmitted to the base station 1506 concurrent with the scheduled set of downlink transmissions 1508 from the base station 1506. The at least one of the uplink MCS, the transmit power configuration, or the uplink beam configuration enables the base station to receive the uplink transmission 1522 including the high-priority data while the base station transmits the scheduled set of downlink transmissions 1508.

Figure 36:
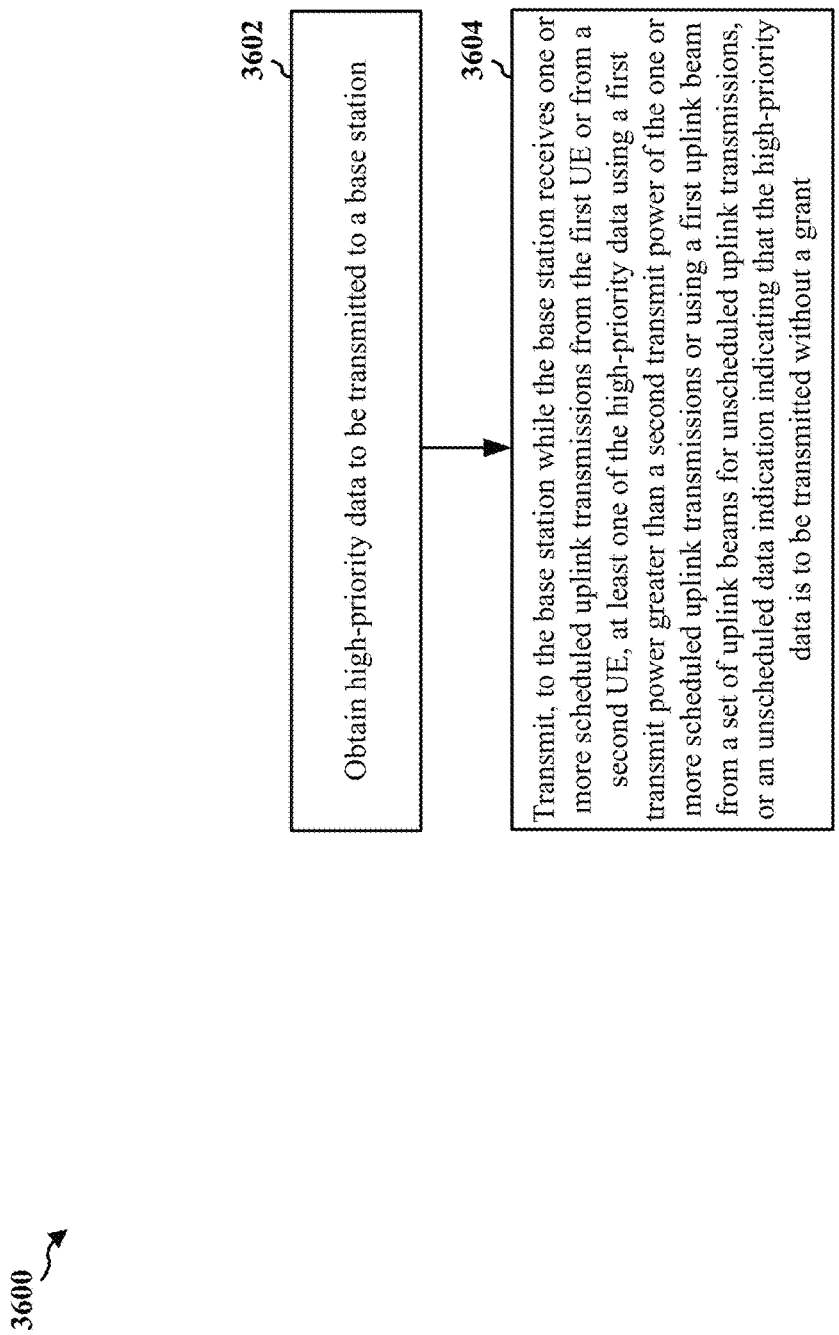
FIG. 36 is a flowchart of a method of wireless communication.

FIG. 36 is a flowchart 3600 of a method of wireless communication. The method may be performed by a first UE (e.g., the UE 1902, 2002, 2102, 2302, 2802, 2902, 3002, 3102, UE_2 2404, UE_3 2406; the apparatus 4002/4002'; the processing system 4114, which may include the memory 360 and which may be the entire UE 1902, 2002, 2102, 2302, 2802, 2902, 3002, 3102, UE_2 2404, UE_3 2406, or a component of the UE 1902, 2002, 2102, 2302, 2802, 2902, 3002, 3102, UE_2 2404, UE_3 2406, such as the TX processor 368, the RX processor 356, and/or the controller/processor 359).

At 3602, the first UE obtains high-priority data to be transmitted to a base station. In one example, with reference to FIG. 19, the first UE 1902 may obtain high-priority data at 1916. For example, the high-priority data (also referred to as urgent data or urgent traffic) may be low-latency data, such as URLLC data.

Finally at 3604, the first UE transmits, to the base station while the base station receives one or more scheduled uplink transmissions from the first UE or from a second UE, at least one of the high-priority data using a first transmit power greater than a second transmit power of the one or more scheduled uplink transmissions or using a first uplink beam from a set of uplink beams for unscheduled uplink transmissions, or an unscheduled data indication indicating that the high-priority data is to be transmitted without a grant.

In one example, with reference to FIG. 19, the first UE 1902 may transmit the uplink transmission 1922 including high-priority data using an uplink beam from the set of uplink beams for unscheduled uplink transmissions indicated in the beam information message 1907. In another example, with reference to FIG. 20, the first UE 2002 may transmit the uplink transmission 2022 including high-priority data using an uplink beam from the set of uplink beams for unscheduled uplink transmissions indicated in the beam information message 2008.

For example, as previously described with reference to FIG. 24, if the second UE (UE_2) 2404 in the network 2400 obtains high-priority data that is to be transmitted to the base station 2408 when the first UE (UE_1) 2402 is transmitting scheduled uplink transmissions (e.g., uplink transmission 2602) via uplink beam_1 (B1) 2510, the second UE (UE_2) 2404 may transmit the high-priority data in an uplink transmission 2604 or 2606 via an uplink beam in the set of uplink beams for unscheduled uplink transmissions including uplink beam_2 (B2) 2604 and uplink beam_3 (B3) 2606.

In some examples, the unscheduled data indication indicating that the high-priority data is to be transmitted without a grant may be any one of the unscheduled data indications 2828, 2918, 3018 described herein. In some examples, the unscheduled data indication includes one or more indication bits preconfigured for the first UE or a unique indication sequence associated with the first UE.

In some examples, the first UE transmits the high-priority data to the base station within a threshold time after the unscheduled data indication. In some examples, the threshold time may be set according to the acceptable latency of the high-priority data. For example, if the high-priority data is associated with a mission-critical service or an application where URLLC services are needed, the threshold time may be less than or equal to 1 ms. In other examples, the threshold time may be within a range of 1 ms to 2 ms.

In some examples, the high-priority data is transmitted in a periodic uplink resource allocation associated with a configured grant, wherein a periodicity of the periodic uplink resource allocation is configured to be less than or equal to an acceptable latency for the high-priority data. In some examples, the configured grant is associated with at least a second uplink beam of the first apparatus.

In some examples, the first UE may transmit the unscheduled data indication using at least one of a frequency division multiplexing (FDM) configuration, a space division multiplexing (SDM) configuration, or a transmit power that enables reception of the unscheduled data indication at the base station. For example, the parameters and/or values for the FDM configuration, SDM configuration, or transmit power may be set to facilitate reception of the unscheduled data indication at the base station while the base station receives a set of scheduled uplink transmissions from a second UE.

For example, with reference to FIG. 31, the first UE 3102 may transmit the high-priority data obtained at 3116 in an uplink (UL) transmission 3118 using a transmit power that is greater than or equal to a threshold transmit power. In some examples, the transmit power configuration may include a transmit power that is the maximum permissible transmission power the first UE 3102 may use for an uplink transmission. In some examples, the first UE 3102 may transmit the high-priority data obtained at 3116 in the uplink transmission 3118 using a transmit power that is greater than the transmit power of the scheduled set of uplink transmissions 3108 from the second UE 3104.

In some examples, the first UE includes a first antenna panel and a second antenna panel. The first UE transmits the high-priority data from the first antenna panel concurrently with the one or more scheduled uplink transmissions from the second antenna panel. For example, with reference to FIG. 21, the UE 2102 includes a first antenna panel 2106 and a second antenna panel 2108. In this example, the UE 2102 may transmit the scheduled set of uplink transmissions 2112 from the first antenna panel 2106 and may transmit an uplink transmission 2124 including high-priority data from the second antenna panel 2108.

Figure 37:
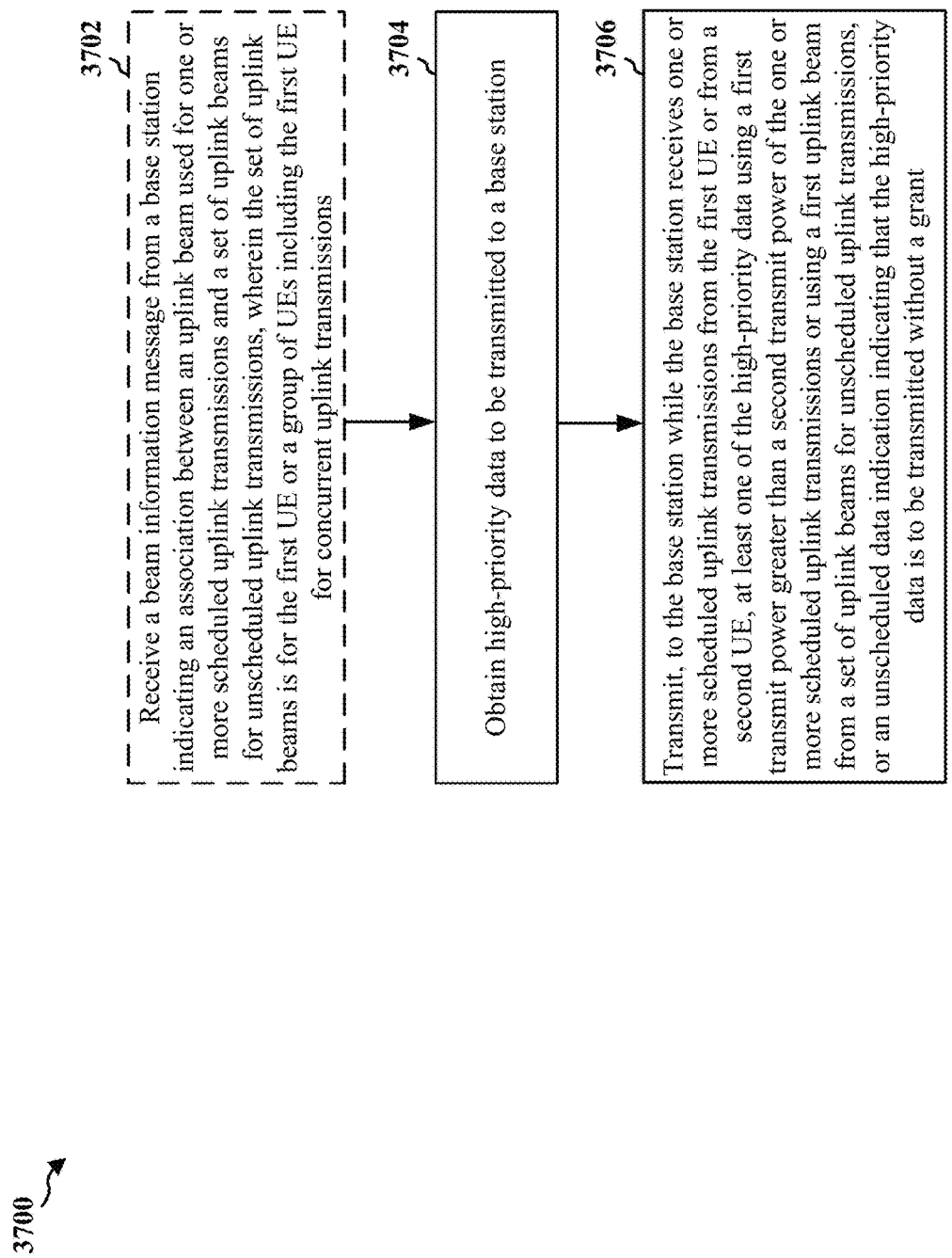
FIG. 37 is a flowchart of a method of wireless communication.

FIG. 37 is a flowchart 3700 of a method of wireless communication. The method may be performed by a first UE (e.g., the UE 1902, UE_2 2404, UE_3 2406; the apparatus 4002/4002'; the processing system 4114, which may include the memory 360 and which may be the entire UE 1902, UE_2 2404, UE_3 2406 or a component of the UE 1902, UE_2 2404, UE_3 2406, such as the TX processor 368, the RX processor 356, and/or the controller/processor 359). In FIG. 37, blocks indicated with dashed lines represent optional blocks.

At 3702, the first UE receives a beam information message from a base station indicating an association between an uplink beam used for one or more scheduled uplink transmissions and a set of uplink beams for unscheduled uplink transmissions. The set of uplink beams is for the first UE or a group of UEs including the first UE for concurrent uplink transmissions. For example, the beam information message may be any one of the beam information messages 1907, 2008, 2410, 2412, 2807, 2907 described herein.

In some examples, the beam information message may indicate a pairing or association between an uplink beam (for a scheduled uplink transmission) and a set of uplink beams for unscheduled uplink transmissions. The uplink beam (e.g., the uplink beam used for the scheduled set of uplink transmissions 1908) may be associated with a specific UE (e.g., the second UE 1904 in FIG. 19) and the set of uplink beams for unscheduled uplink transmissions may be associated with a different UE (e.g., the first UE 1902 in FIG. 19) or a group of different UEs. When the specific UE (e.g., the second UE 1904 in FIG. 19) is transmitting uplink transmissions to the base station (e.g., base station 1906 in FIG. 19) via the uplink beam, the different UE (e.g., the first UE 1902 in FIG. 19) may use at least one beam from the set of uplink beams for unscheduled uplink transmissions associated with the uplink beam to transmit high-priority data.

For example, with reference to FIG. 26, if the UE_2 2404 obtains high-priority data that is to be transmitted to the base station 2408 when the UE_1 2402 is transmitting scheduled uplink transmissions (e.g., uplink transmission 2602) via uplink beam_1 (B1) 2510, the UE_2 2404 may transmit the high-priority data in an uplink transmission 2604 or 2606 via an uplink beam in the set of uplink beams for unscheduled uplink transmissions including uplink beam_2 (B2) 2514 and uplink beam_3 (B3) 2516.

At 3704, the first UE obtains high-priority data to be transmitted to the base station. For example, the high-priority data (also referred to as urgent data or urgent traffic) may be low-latency data, such as URLLC data. For example, with reference to FIGS. 19 and 20, the first UE 1902 may obtain high-priority data at 1916, and the first UE 2002 may obtain high-priority data at 2020. As another example, with reference to FIGS. 28 and 29, the first UE 2802 may obtain high-priority data at 2826, and the first UE 2902 may obtain high-priority data at 2916.

At 3706, the first UE transmits, to the base station while the base station receives one or more scheduled uplink transmissions from the first UE or from a second UE, at least one of the high-priority data using a first transmit power greater than a second transmit power of the one or more scheduled uplink transmissions or using a first uplink beam from a set of uplink beams for unscheduled uplink transmissions, or an unscheduled data indication indicating that the high-priority data is to be transmitted without a grant.

For example, with reference to FIG. 19, the first UE 1902 may transmit the high-priority data in an uplink transmission 1922 using an uplink beam from the set of uplink beams for unscheduled uplink transmissions indicated in the beam information message 1907. For example, with reference to FIG. 20, the first UE 2002 may transmit the high-priority data in an uplink transmission 2022 using an uplink beam from the set of uplink beams for unscheduled uplink transmissions indicated in the beam information message 2008.

In some examples, the first UE determines the set of uplink beams to be used for unscheduled uplink transmissions from the beam information message. For example, the first UE 2002 may determine the uplink beam in which the second UE 2004 transmits one or more scheduled uplink transmissions and may determine the set of uplink beams for unscheduled uplink transmissions associated with the determined uplink beam based on the beam information message. The first UE 2002 may then select the best beam from the set of uplink beams for unscheduled uplink transmissions.

Figure 38:
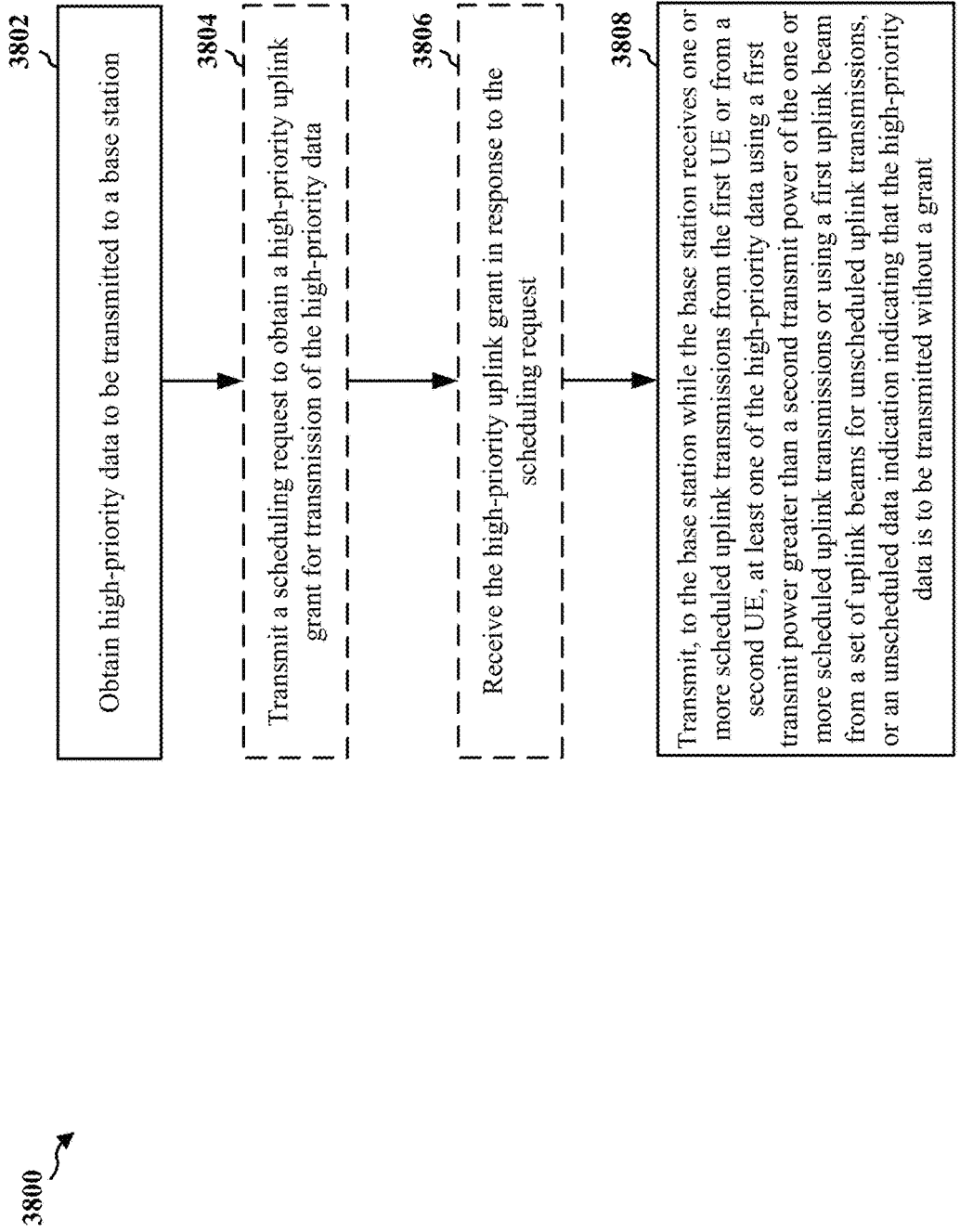
FIG. 38 is a flowchart of a method of wireless communication.

FIG. 38 is a flowchart 3800 of a method of wireless communication. The method may be performed by a first UE (e.g., the UE 1902, UE_2 2404, UE_3 2406; the apparatus 4002/4002'; the processing system 4114, which may include the memory 360 and which may be the entire UE 1902, UE_2 2404, UE_3 2406 or a component of the UE 1902, UE_2 2404, UE_3 2406, such as the TX processor 368, the RX processor 356, and/or the controller/processor 359). In FIG. 38, blocks indicated with dashed lines represent optional blocks.

At 3802, the first UE obtains high-priority data to be transmitted to a base station. For example, with reference to FIG. 19, the first UE 1902 may obtain high-priority data at 1916. For example, the high-priority data (also referred to as urgent data or urgent traffic) may be low-latency data, such as URLLC data.

At 3804, the first UE transmits a scheduling request to obtain a high-priority uplink grant for transmission of the high-priority data. The first UE transmits the scheduling request in one of a plurality of scheduling request transmission occasions using one or more resources allocated for the scheduling request. A time between any two consecutive scheduling request transmission occasions in the plurality of scheduling request transmission occasions is configured to be less than or equal to an acceptable latency for the high-priority data.

For example, with reference to FIG. 19, the first UE 1902 may transmit a scheduling request 1918 to the base station 1906 to receive an uplink resource allocation (e.g., an uplink grant). As shown in FIG. 19, the first UE 1902 may transmit the scheduling request 1918 to the base station 1906 while the base station 1906 receives the scheduled set of uplink transmissions 1908 from the second UE 1904.

At 3806, the first UE receives the high-priority uplink grant in response to the scheduling request. For example, with reference to FIG. 19, the first UE 1902 may receive the high-priority uplink grant 1920 in response to the scheduling request 1918.

Finally, at 3808, the first UE transmits, to the base station while the base station receives one or more scheduled uplink transmissions from the first UE or from a second UE, at least one of the high-priority data using a first transmit power greater than a second transmit power of the one or more scheduled uplink transmissions or using a first uplink beam from a set of uplink beams for unscheduled uplink transmissions, or an unscheduled data indication indicating that the high-priority data is to be transmitted without a grant. The high-priority data is transmitted using the high-priority uplink grant.

For example, with reference to FIG. 19, the first UE 1902 may transmit the high-priority data (e.g., the high-priority data obtained at 1916) in an uplink transmission 1922 based on the high-priority uplink grant 1920. For example, the high-priority uplink grant 1920 may include an uplink resource allocation that the first UE 1902 can use for the uplink transmission 1922 including the high-priority data. In some examples, the first UE 1902 may optionally transmit the uplink transmission 1922 including high-priority data using an uplink beam from the set of uplink beams for unscheduled uplink transmissions indicated in the beam information message 1907.

Figure 39:
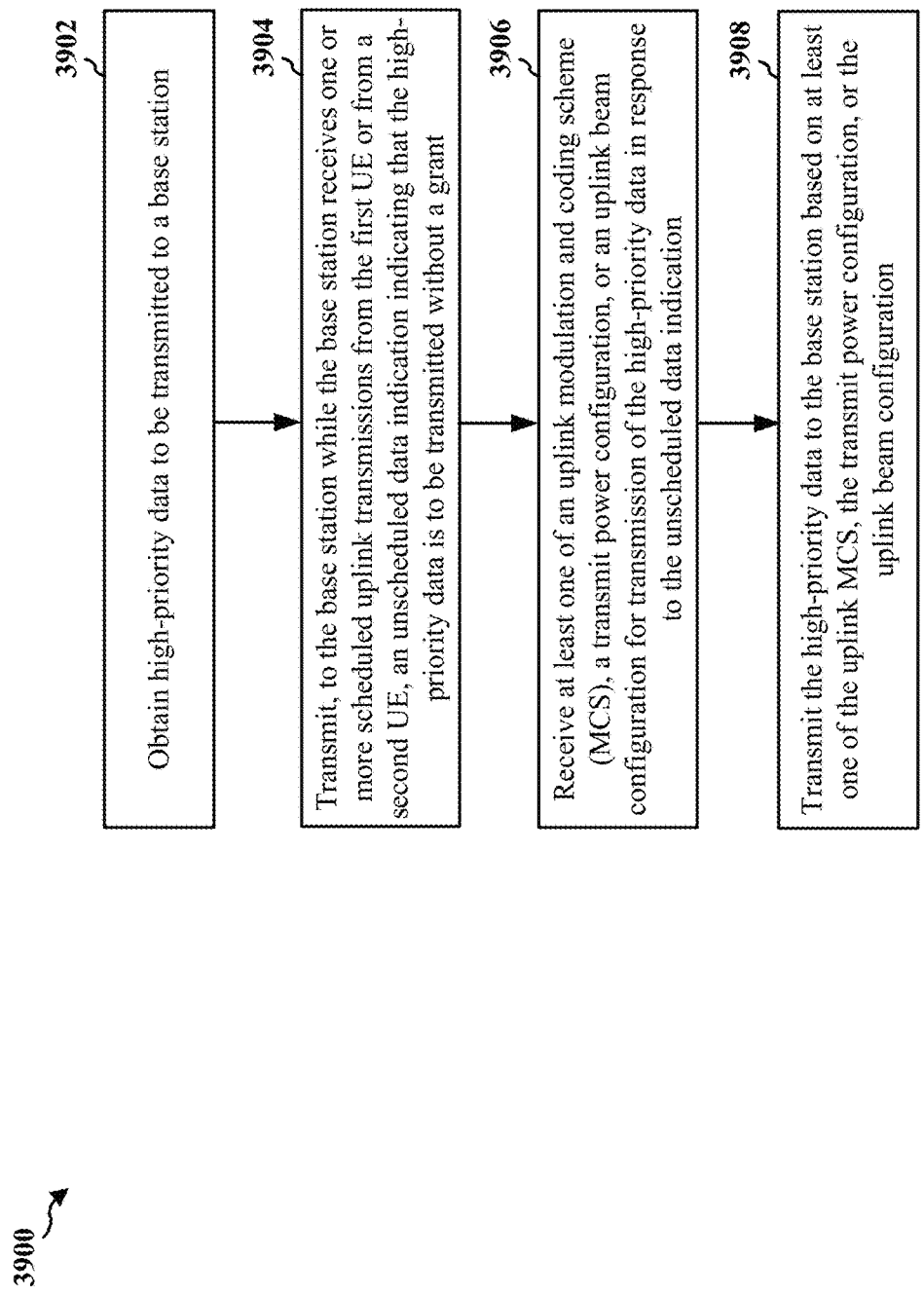
FIG. 39 is a flowchart of a method of wireless communication.

FIG. 39 is a flowchart 3900 of a method of wireless communication. The method may be performed by a first UE (e.g., the UE 3002; the apparatus 4002/4002'; the processing system 4114, which may include the memory 360 and which may be the entire UE 3002 or a component of the UE 3002, such as the TX processor 368, the RX processor 356, and/or the controller/processor 359).

At 3902, the first UE obtains high-priority data to be transmitted to a base station. For example, with reference to FIG. 30, the first UE 3002 may obtain high-priority data at 3016. For example, the high-priority data (also referred to as urgent data or urgent traffic) may be low-latency data, such as URLLC data.

At 3904, the first UE transmits, to the base station while the base station receives one or more scheduled uplink transmissions from the first UE or from a second UE, an unscheduled data indication indicating that the high-priority data is to be transmitted without a grant.

For example, with reference to FIG. 30, the first UE 3002 may transmit an unscheduled data indication 3018 to the base station 3006 to indicate that the first UE 3002 is to transmit high-priority data to the base station 3006 without an uplink resource allocation (e.g., without an uplink grant). The first UE 3002 may transmit the unscheduled data indication 3018 to the base station 3006 while the base station 3006 receives the set of uplink transmissions 3008 from the second UE 3004.

At 3906, the first UE receives at least one of an uplink MCS, a transmit power configuration, or an uplink beam configuration for transmission of the high-priority data in response to the unscheduled data indication.

For example, with reference to FIG. 30, when the base station 3006 detects the unscheduled data indication 3018 from the first UE 3002, the base station 3006 may respond by transmitting second configuration information 3020 to the first UE 3002. The second configuration information 3020 may facilitate or improve the ability of the base station 3006 to receive the high-priority data. In some examples, the second configuration information 3020 may include an uplink MCS, a transmit power configuration, and/or an uplink beam configuration for transmission of the high-priority data.

In one example, the uplink MCS indicated in the second configuration information 3020 may include a higher MCS value (e.g., a higher MCS index value) than the MCS value used for the set of uplink transmissions 3008. In another example, the uplink MCS indicated in the second configuration information 3020 may include an MCS value that is greater than or equal to a threshold MCS value (e.g., a threshold MCS index value).

In some examples, the transmit power configuration indicated in the second configuration information 3020 may include a transmit power that is greater than or equal to a threshold transmit power. In some examples, the transmit power configuration may include a transmit power that is the maximum permissible transmission power the first UE 3002 may use for an uplink transmission. In some examples, the uplink beam configuration may indicate an uplink beam (e.g., a best uplink beam from a set of candidate uplink beams) to be used for transmission of an uplink transmission (e.g., uplink transmission 3022).

Finally at 3908, the first UE transmits the high-priority data to the base station based on at least one of the uplink MCS, the transmit power configuration, or the uplink beam configuration. For example, the first UE 3002 may transmit an uplink transmission 3022 including the high-priority data based on at least one of the uplink MCS, the transmit power configuration, or the uplink beam configuration. In some examples, the first UE 3002 may transmit the uplink transmission 3022 including the high-priority data during (e.g., concurrent with) the transmission of the scheduled set of uplink transmissions 3008 from the second UE 3004.

Figure 40:
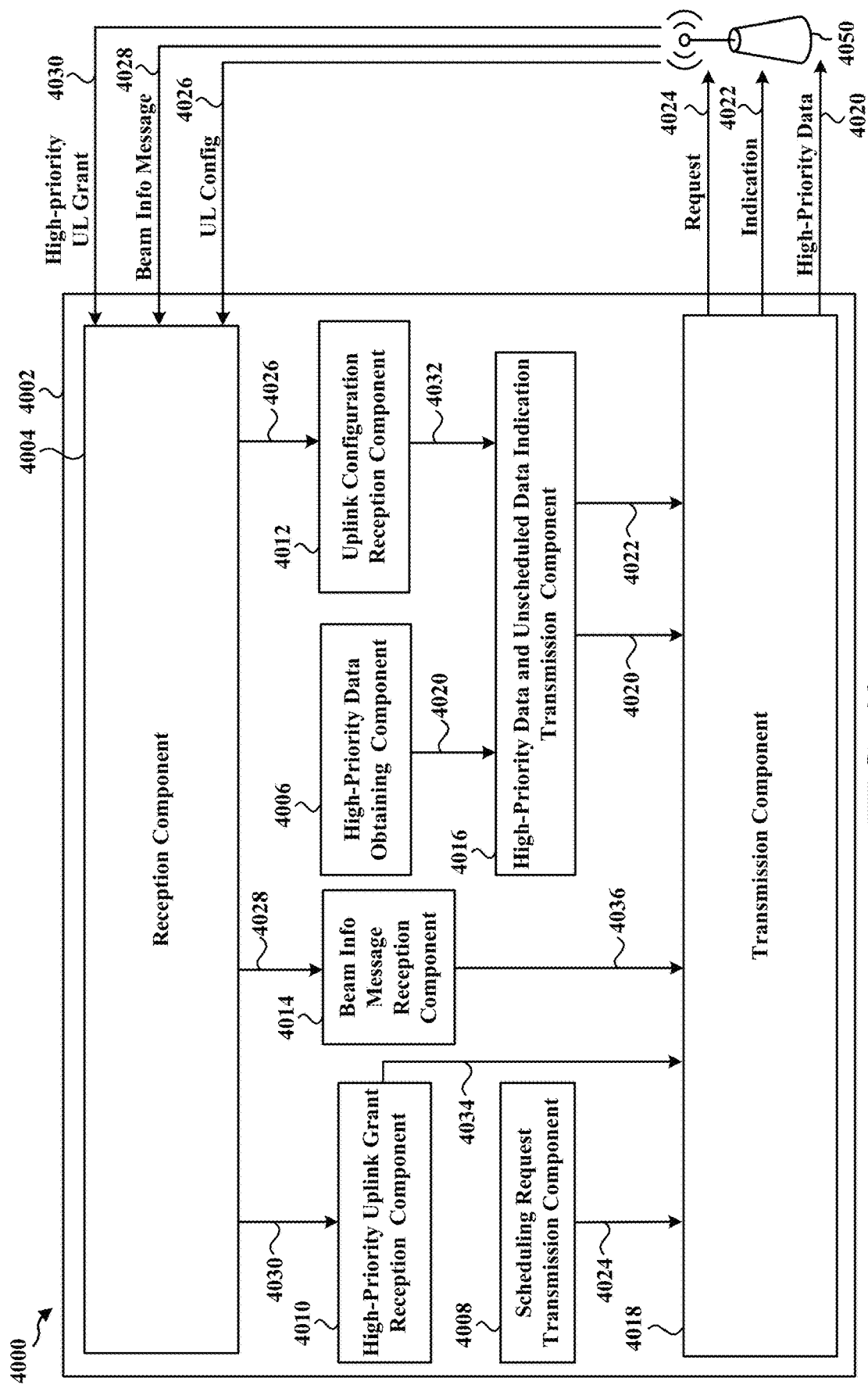
FIG. 40 is a conceptual data flow diagram illustrating the data flow between different means/components in an example apparatus.

FIG. 40 is a conceptual data flow diagram 4000 illustrating the data flow between different means/components in an example first apparatus 4002. The first apparatus may be a UE. The first apparatus includes a reception component 4004 that receives an uplink configuration 4026, a beam information message 4028, and/or a high-priority uplink grant 4030.

The first apparatus further includes a high-priority data obtaining component 4006 that obtains high-priority data to be transmitted to a base station 4050 while the base station is transmitting downlink transmissions to a different apparatus or receiving uplink transmissions from a different apparatus. The high-priority data obtaining component 4006 may output the high-priority data 4020 for transmission to the base station 4050.

In some examples, the high-priority data obtaining component 4006 may obtain the high-priority data 4020 by generating the high-priority data 4020, receiving the high-priority data 4020, and/or fetching the high-priority data 4020. In one example, the high-priority data obtaining component 4006 may generate the high-priority data 4020 by operating or executing an application that causes an output of the high-priority data 4020 for transmission on the uplink. In another example, the high-priority data obtaining component 4006 may receive the high-priority data 4020 from an internal source (e.g., a processor) or an external source (e.g., a sensor device, a wireless communication device, or other suitable device capable of transmitting the high-priority data 4020 to the high-priority data obtaining component 4006). In another example, the high-priority data obtaining component 4006 may fetch the high-priority data 4020 from an internal or external memory device.

The first apparatus further includes a scheduling request transmission component 4008 that transmits a scheduling request 4024 (e.g., via the transmission component 4018) to obtain a high-priority uplink grant for transmission of the high-priority data.

The first apparatus further includes a high-priority uplink grant reception component 4010 that receives a high-priority uplink grant 4030 (e.g., via the reception component 4004) for the high-priority data 4020 and provides one or more transmission parameters 4034 included in the high-priority uplink grant 4030 to the transmission component 4018.

The first apparatus further includes an uplink configuration reception component 4012 that receives an uplink configuration 4026 (e.g., via the reception component 4004) from the base station 4050. The uplink configuration 4026 may include an uplink MCS, a transmit power configuration, or an uplink beam configuration for transmission of the high-priority data 4020. The uplink configuration reception component 4012 may output one or more configuration values 4032 (e.g., an MCS value, a transmit power, and/or a best beam for transmission of the high-priority data 4020) from the uplink configuration 4026 for transmission of the high-priority data 4020.

The first apparatus further includes a beam information message reception component 4014 that receives a beam information message 4028 (e.g., via the reception component 4004) from the base station 4050. The beam information message 4028 may indicate a pairing or association between a downlink beam or an uplink beam used for scheduled transmissions, and a set of uplink beams for unscheduled uplink transmissions. The beam information message reception component 4014 may provide a set of uplink beams for unscheduled uplink transmissions 4036 to the transmission component 4018 for transmission of the high-priority data 4020.

The first apparatus further includes a high-priority data and unscheduled data indication transmission component 4016 that transmits (e.g., via the transmission component 4018), to the base station 4050 while the base station 4050 performs one or more scheduled downlink transmissions to the first apparatus or to a second apparatus, at least one of the high-priority data 4020 via a first uplink beam from a set of uplink beams for unscheduled uplink transmissions or an unscheduled data indication 4022 indicating that the high-priority data 4020 is to be transmitted without an uplink grant.

The high-priority data and unscheduled data indication transmission component 4016 further transmits (e.g., via the transmission component 4018), to the base station 4050 while the base station 4050 receives one or more scheduled uplink transmissions from the first apparatus or a second apparatus, at least one of the high-priority data 4020 using a first transmit power greater than a second transmit power of the one or more scheduled uplink transmissions or using a first uplink beam from a set of uplink beams for unscheduled uplink transmissions 4036, or an unscheduled data indication 4022 indicating that the high-priority data 4020 is to be transmitted without an uplink grant. In some examples, the unscheduled data indication 4022 is transmitted using at least one of a frequency division multiplexing (FDM) configuration, a space division multiplexing (SDM) configuration, or a transmit power that enables reception of the unscheduled data indication 4022 at the base station 4050.

The first apparatus further includes a transmission component 4018 that transmits the high-priority data 4020, the unscheduled data indication 4022, and/or the scheduling request 4024 to the base station 4050.

The apparatus may include additional components that perform each of the blocks of the algorithm in the aforementioned flowcharts of FIGS. 32-39. As such, each block in the aforementioned flowcharts of FIGS. 32-39 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 41:
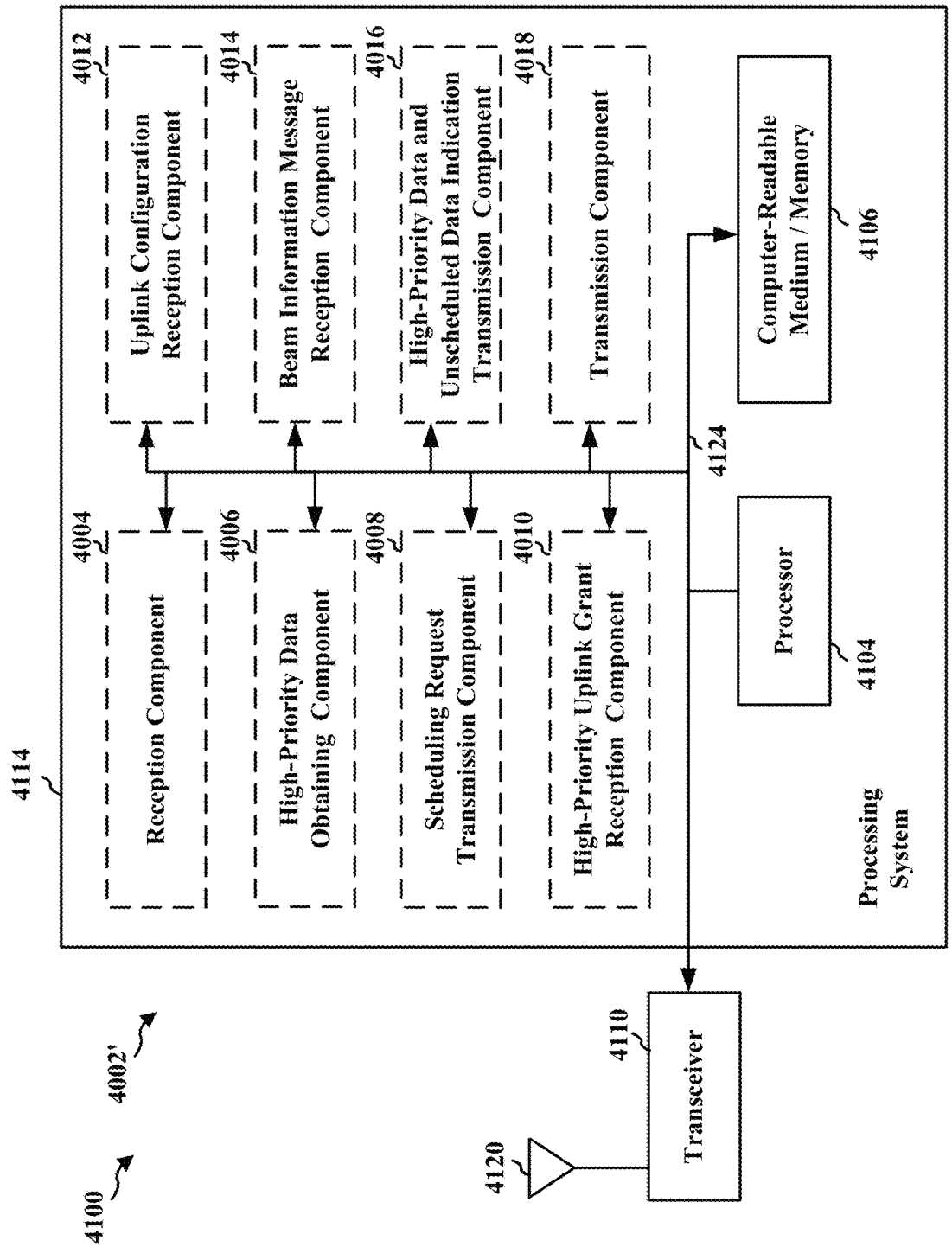
FIG. 41 is a diagram illustrating an example of a hardware implementation for an apparatus employing a processing system.

FIG. 41 is a diagram 4100 illustrating an example of a hardware implementation for an apparatus 4002' employing a processing system 4114. The processing system 4114 may be implemented with a bus architecture, represented generally by the bus 4124. The bus 4124 may include any number of interconnecting buses and bridges depending on the specific application of the processing system 4114 and the overall design constraints. The bus 4124 links together various circuits including one or more processors and/or hardware components, represented by the processor 4104, the components 4004, 4006, 4008, 4010, 4012, 4014, 4016, 4018, and the computer-readable medium/memory 4106. The bus 4124 may also link various other circuits such as timing sources, peripherals, voltage regulators, and power management circuits, which are well known in the art, and therefore, will not be described any further.

The processing system 4114 may be coupled to a transceiver 4110. The transceiver 4110 is coupled to one or more antennas 4120. The transceiver 4110 provides a means for communicating with various other apparatus over a transmission medium. The transceiver 4110 receives a signal from the one or more antennas 4120, extracts information from the received signal, and provides the extracted information to the processing system 4114, specifically the reception component 4004. In addition, the transceiver 4110 receives information from the processing system 4114, specifically the transmission component 4018, and based on the received information, generates a signal to be applied to the one or more antennas 4120. The processing system 4114 includes a processor 4104 coupled to a computer-readable medium/memory 4106. The processor 4104 is responsible for general processing, including the execution of software stored on the computer-readable medium/memory 4106. The software, when executed by the processor 4104, causes the processing system 4114 to perform the various functions described supra for any particular apparatus. The computer-readable medium/memory 4106 may also be used for storing data that is manipulated by the processor 4104 when executing software. The processing system 4114 further includes at least one of the components 4004, 4006, 4008, 4010, 4012, 4014, 4016, 4018. The components may be software components running in the processor 4104, resident/stored in the computer readable medium/memory 4106, one or more hardware components coupled to the processor 4104, or some combination thereof. The processing system 4114 may be a component of the UE 350 and may include the memory 360 and/or at least one of the TX processor 368, the RX processor 356, and the controller/processor 359. Alternatively, the processing system 4114 may be the entire UE (e.g., see 350 of FIG. 3).

In one configuration, the apparatus 4002/4002' for wireless communication includes means for obtaining high-priority data to be transmitted to a base station. The apparatus 4002/4002' for wireless communication further includes means for transmitting, to the base station while the base station performs one or more scheduled downlink transmissions to the apparatus 4002/4002' or to a second apparatus, at least one of the high-priority data via a first uplink beam from a set of uplink beams for unscheduled uplink transmissions or an unscheduled data indication indicating that the high-priority data is to be transmitted without an uplink grant.

The apparatus 4002/4002' for wireless communication further includes means for transmitting a scheduling request to obtain a high-priority uplink grant for transmission of the high-priority data, means for receiving a high-priority uplink grant in response to the scheduling request, means for receiving at least one of an uplink MCS, a transmit power configuration, or an uplink beam configuration for transmission of the high-priority data in response to the unscheduled data indication, means for transmitting the high-priority data to the base station based on at least one of the uplink MCS, the transmit power configuration, or the uplink beam configuration, means for receiving a beam information message from the base station indicating an association between a downlink beam used for the one or more scheduled downlink transmissions and the set of uplink beams, means for transmitting, to the base station while the base station receives one or more scheduled uplink transmissions from the apparatus 4002/4002' or a second apparatus, at least one of the high-priority data using a first transmit power greater than a second transmit power of the one or more scheduled uplink transmissions or using a first uplink beam from a set of uplink beams for unscheduled uplink transmissions, or an unscheduled data indication indicating that the high-priority data is to be transmitted without an uplink grant.

The apparatus 4002/4002' for wireless communication further includes means for receiving a beam information message from the base station indicating an association between an uplink beam used for the one or more scheduled uplink transmissions and the set of uplink beams, wherein the set of uplink beams is for the apparatus 4002/4002' or a group of apparatuses including the apparatus 4002/4002' for concurrent uplink transmissions.

The aforementioned means may be one or more of the aforementioned components of the apparatus 4002 and/or the processing system 4114 of the apparatus 4002' configured to perform the functions recited by the aforementioned means. As described supra, the processing system 4114 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 42:
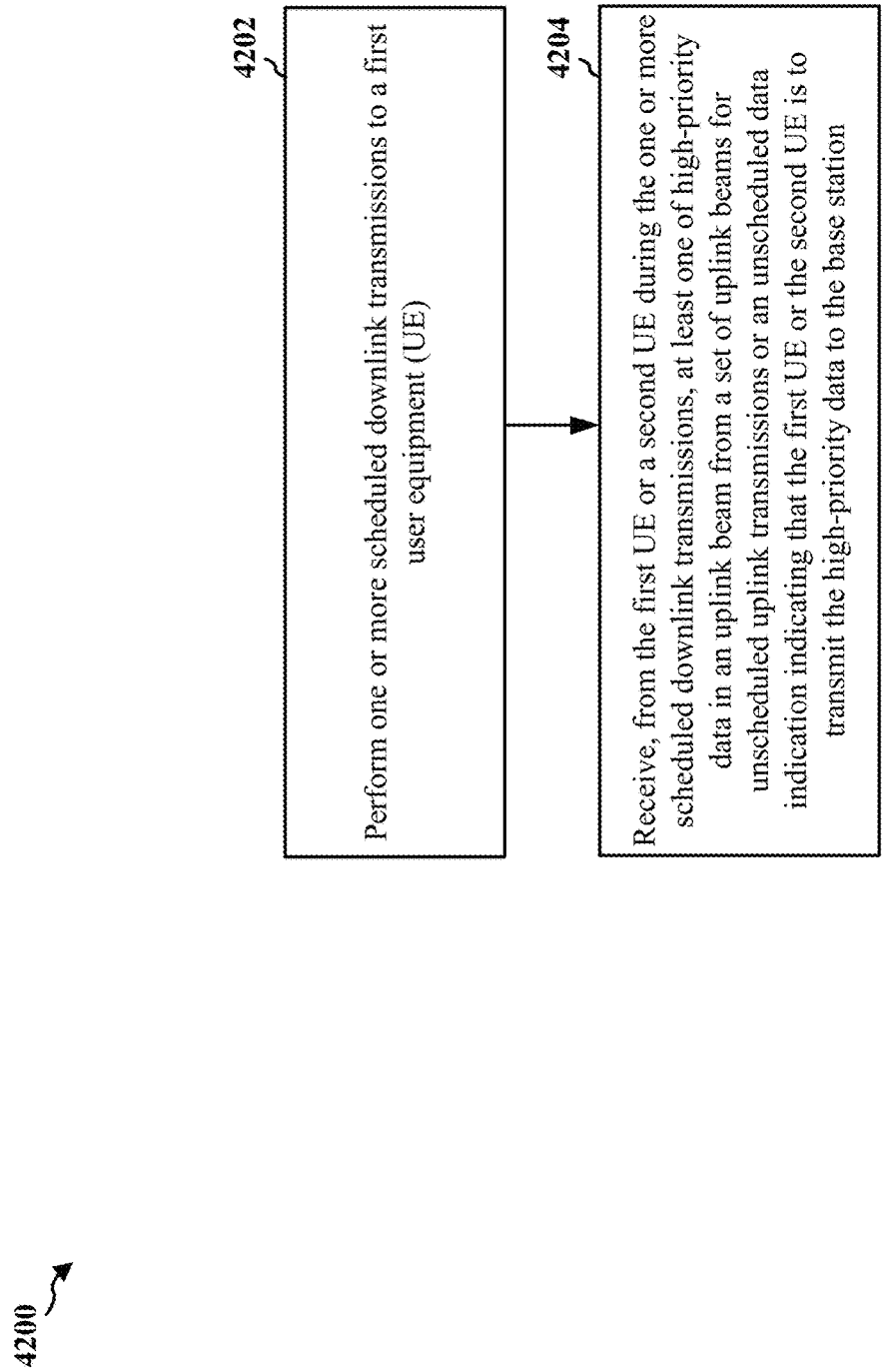
FIG. 42 is a flowchart of a method of wireless communication.

FIG. 42 is a flowchart 4200 of a method of wireless communication. The method may be performed by a base station (e.g., the base station 806, 906, 1108, 1506, 1606, 1706, 1804; the apparatus 5102/5102'; the processing system 5214, which may include the memory 376 and which may be the entire base station 806, 906, 1108, 1506, 1606, 1706, 1804 or a component of the base station 806, 906, 1108, 1506, 1606, 1706, 1804, such as the TX processor 316, the RX processor 370, and/or the controller/processor 375).

At 4202, the base station performs one or more scheduled downlink transmissions to a first user equipment (UE). For example, with reference to FIG. 8, the base station 806 may transmit a scheduled set of downlink transmissions 808 to the UE 804.

Finally, at 4204, the base station receives, from the first UE or a second UE during the one or more scheduled downlink transmissions, at least one of high-priority data in an uplink beam from a set of uplink beams for unscheduled uplink transmissions or an unscheduled data indication indicating that the first UE or the second UE is to transmit the high-priority data to the base station.

In one example, with reference to FIG. 8, the base station 806 may receive the high-priority data in an uplink transmission 822 from the UE 802 in an uplink beam from a set of uplink beams for unscheduled uplink transmissions indicated in the beam information message 807. In another example, with reference to FIG. 9, the base station 906 may receive the high-priority data in an uplink transmission 922 from the UE 902 in an uplink beam from a set of uplink beams for unscheduled uplink transmissions indicated in the beam information message 908.

In some examples, the unscheduled data indication indicating the first UE or the second UE is to transmit the high-priority data to the base station may be any one of the unscheduled data indications 1518, 1628, 1718, 1822 described herein. In some examples, the unscheduled data indication may include a unique indication sequence associated with the first UE or the second UE.

For example, with reference to FIG. 15, the base station 1506 may receive the unscheduled data indication 1518 to indicate that the UE 1502 is to transmit high-priority data to the base station 1506 without an uplink resource allocation (e.g., without an uplink grant). The base station 1506 may receive the unscheduled data indication 1518 while the base station 1506 transmits the scheduled set of downlink (DL) transmissions 1508 to the UE 1504.

In some aspects of the disclosure, the first UE transmits the high-priority data in a periodic uplink resource allocation associated with a configured grant. A periodicity of the periodic uplink resource allocation associated with the configured grant is configured to be less than or equal to an acceptable latency for the high-priority data. Therefore, the base station may receive the high-priority data in the periodic uplink resource allocation associated with the configured grant. In some examples, the configured grant is associated with at least a second uplink beam of the UE 1602.

In some examples, the base station receives the high-priority data within a threshold time after the unscheduled data indication. In one example, with reference to FIG. 16, the base station 1606 may receive an uplink transmission 1632 including the high-priority data from the UE 16026 within a threshold time after reception of the unscheduled data indication 1628. In some examples, the threshold time may be set according to the acceptable latency of the high-priority data. For example, if the high-priority data is associated with a mission-critical service or an application where URLLC services are needed, the threshold time may be less than or equal to 1 ms. In other examples, the threshold time may be within a range of 1 ms to 2 ms. In some aspects, the base station 1606 may receive the uplink transmission 1632 including the high-priority data immediately after reception of the unscheduled data indication 1628.

Figure 43:
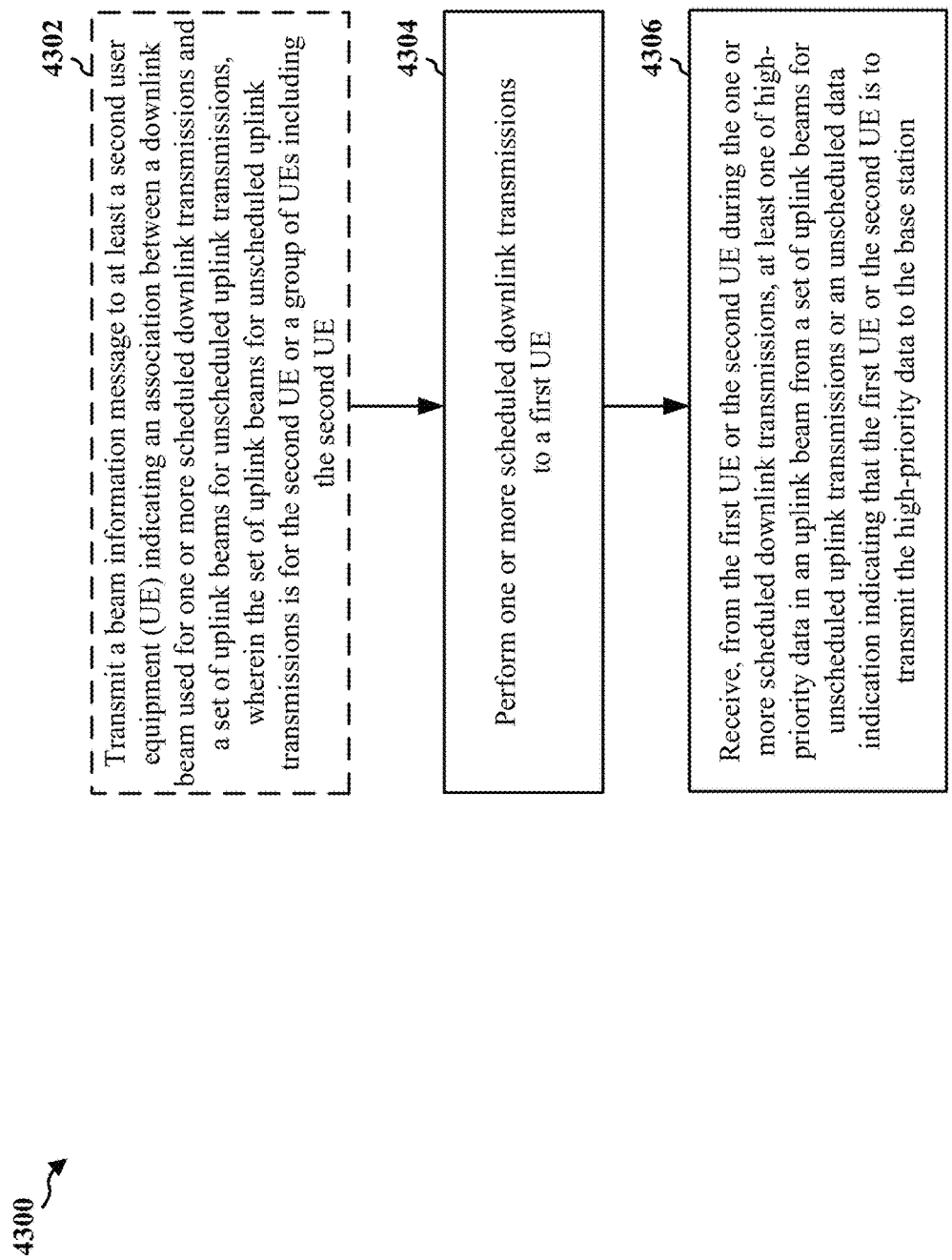
FIG. 43 is a flowchart of a method of wireless communication.

FIG. 43 is a flowchart 4300 of a method of wireless communication. The method may be performed by a base station (e.g., the base station 806, 906, 1108, 1506, 1606, 1706, 1804; the apparatus 5102/5102'; the processing system 5214, which may include the memory 376 and which may be the entire base station 806, 906, 1108, 1506, 1606, 1706, 1804 or a component of the base station 806, 906, 1108, 1506, 1606, 1706, 1804, such as the TX processor 316, the RX processor 370, and/or the controller/processor 375). In FIG. 43, blocks indicated with dashed lines represent optional blocks.

At 4302, the base station transmits a beam information message to at least a second UE indicating an association between a downlink beam used for one or more scheduled downlink transmissions and a set of uplink beams for unscheduled uplink transmissions, wherein the set of uplink beams for unscheduled uplink transmissions is for the second UE or a group of UEs including the second UE.

For example, with reference to FIG. 8, the base station 806 may transmit a beam information message 807 to the UE 802. As described in detail herein with reference to the beam information message 1110 or 1112 in FIG. 11, the beam information message 807 may indicate a pairing or association between a downlink beam and a set of uplink beams for unscheduled uplink transmissions. The downlink beam (e.g., the downlink beam used for the scheduled set of downlink transmissions 808) may be associated with a specific UE (e.g., the UE 804) and the set of uplink beams for unscheduled uplink transmissions may be associated with a different UE (e.g., the UE 802) or a group of different UEs.

At 4304, the base station performs one or more scheduled downlink transmissions to a first UE. For example, with reference to FIG. 8, the base station 806 may transmit a scheduled set of downlink transmissions 808 to the UE 804. As another example, with reference to FIG. 9, the base station 906 may transmit a scheduled set of downlink transmissions 912 to the UE 904.

Finally, at 4306, the base station receives, from the first UE or the second UE during the one or more scheduled downlink transmissions, at least one of high-priority data in an uplink beam from a set of uplink beams for unscheduled uplink transmissions or an unscheduled data indication indicating that the first UE or the second UE is to transmit the high-priority data to the base station.

In one example, with reference to FIG. 8, the base station 806 may receive the high-priority data in an uplink beam from a set of uplink beams for unscheduled uplink transmissions indicated in the beam information message 807. In another example, with reference to FIG. 9, the base station 906 may receive high-priority data from the UE 902 in an uplink beam from a set of uplink beams for unscheduled uplink transmissions indicated in the beam information message 908.

In some examples, the unscheduled data indication indicating that the high-priority data is to be transmitted without a grant may be any one of the unscheduled data indications 1518, 1628, 1718, 1822 described herein. In some examples, the unscheduled data indication may include a unique indication sequence associated with the second UE.

For example, with reference to FIG. 15, the base station 1506 may receive the unscheduled data indication 1518 from the UE 1502 to indicate that the UE 1502 is to transmit high-priority data to the base station 1506 without an uplink resource allocation (e.g., without an uplink grant). The base station 1506 may receive the unscheduled data indication 1518 while the base station 1506 transmits the set of downlink (DL) transmissions 1508 to the UE 1504.

Figure 44:
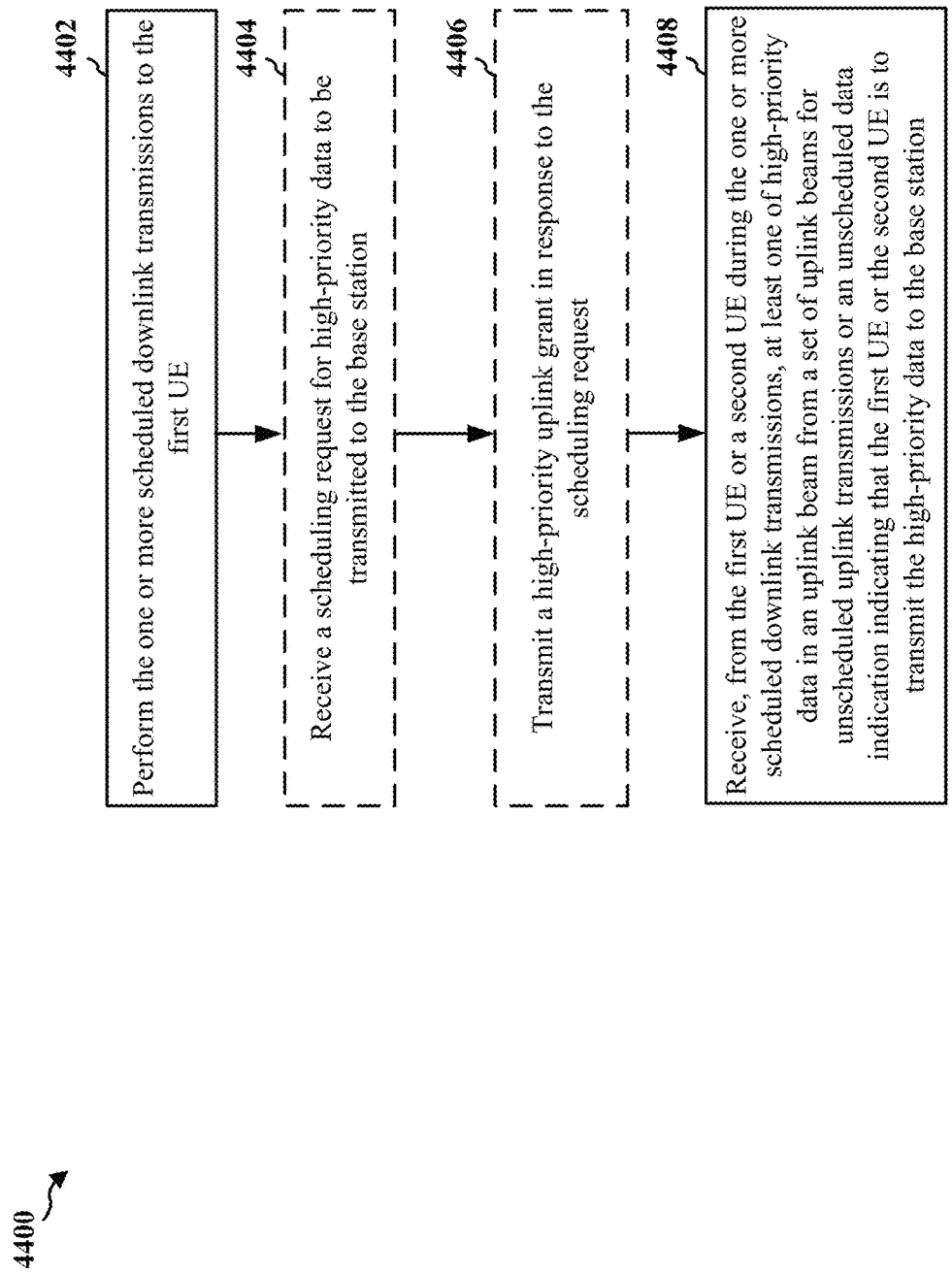
FIG. 44 is a flowchart of a method of wireless communication.

FIG. 44 is a flowchart 4400 of a method of wireless communication. The method may be performed by a base station (e.g., the base station 806, 906, 1108, 1506, 1606, 1706, 1804; the apparatus 5102/5102'; the processing system 5214, which may include the memory 376 and which may be the entire base station 806, 906, 1108, 1506, 1606, 1706, 1804 or a component of the base station 806, 906, 1108, 1506, 1606, 1706, 1804, such as the TX processor 316, the RX processor 370, and/or the controller/processor 375). In FIG. 44, blocks indicated with dashed lines represent optional blocks.

At 4402, the base station performs one or more scheduled downlink transmissions to a first user equipment (UE). For example, with reference to FIG. 8, the base station 806 may transmit a scheduled set of downlink transmissions 808 to the UE 804.

At 4404, the base station receives a scheduling request for high-priority data to be transmitted to the base station. The scheduling request is received in one of a plurality of scheduling request transmission occasions configured for at least the first UE or the second UE. A time between any two consecutive scheduling request transmission occasions in the plurality of scheduling request transmission occasions is configured to be less than or equal to an acceptable latency for the high-priority data. For example, with reference to FIG. 8, the base station 806 may receive the scheduling request 818 from the UE 802.

At 4406, the base station transmits a high-priority uplink grant in response to the scheduling request. For example, with reference to FIG. 8, the base station 806 transmits the high-priority uplink grant 820.

At 4408, the base station receives, from the first UE or the second UE during the one or more scheduled downlink transmissions, at least one of the high-priority data in an uplink beam from a set of uplink beams for unscheduled uplink transmissions or an unscheduled data indication indicating that the first UE or the second UE is to transmit the high-priority data to the base station. In one example, with reference to FIG. 8, the base station 806 may receive the high-priority data (e.g., via the uplink transmission 822) in an uplink beam from a set of uplink beams for unscheduled uplink transmissions indicated in the beam information message 807. In another example, with reference to FIG. 9, the base station 906 may receive the high-priority data from the UE 902 (e.g., via the uplink transmission 922) in an uplink beam from a set of uplink beams for unscheduled uplink transmissions indicated in the beam information message 908.

In some examples, the unscheduled data indication includes the first unique indication sequence or the second unique indication sequence. In some examples, the high-priority data is received based on the high-priority uplink grant (e.g., the high-priority uplink grant 820).

Figure 45:
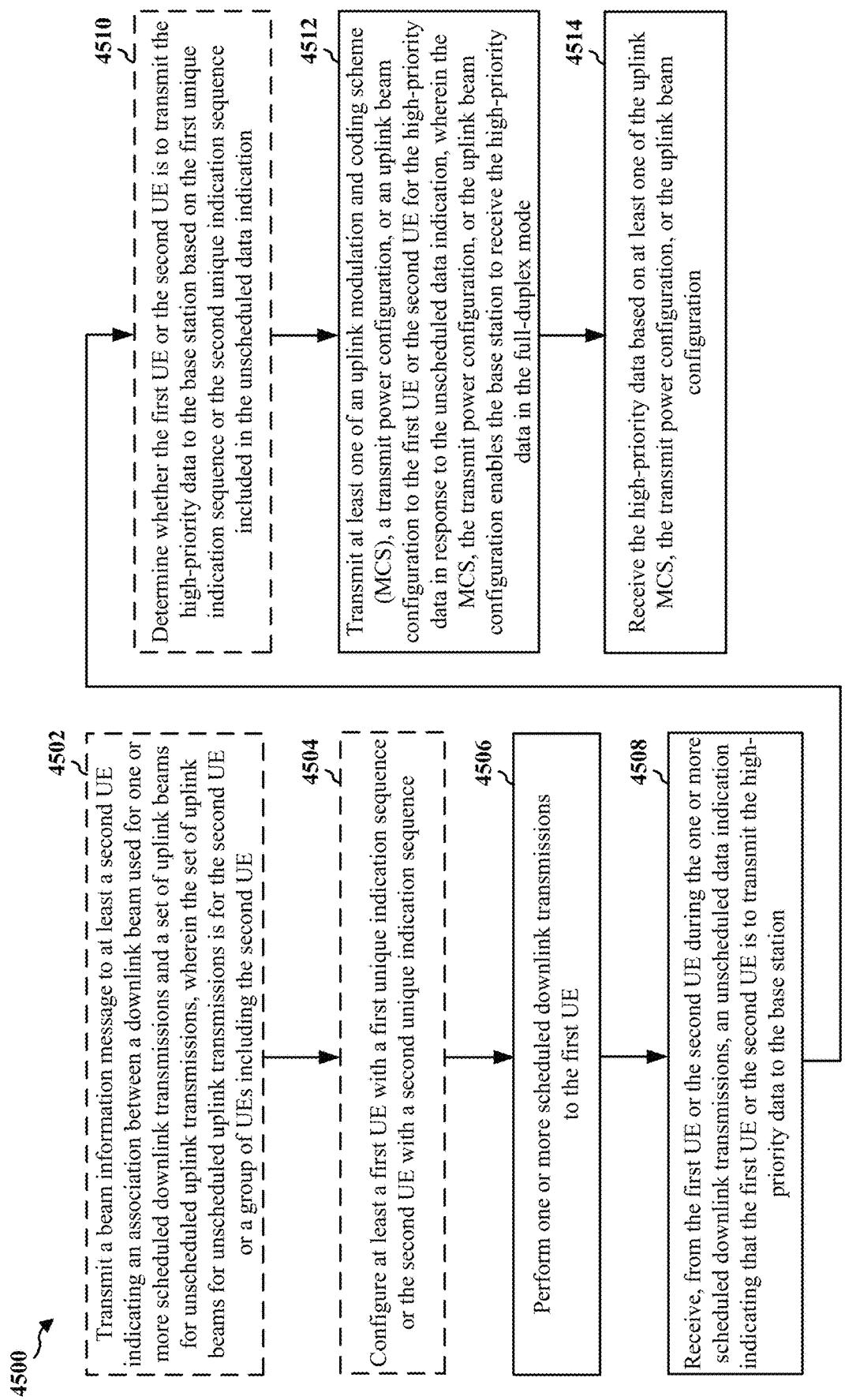
FIG. 45 is a flowchart of a method of wireless communication.

FIG. 45 is a flowchart 4500 of a method of wireless communication. The method may be performed by a base station (e.g., the base station 806, 906, 1108, 1506, 1606, 1706, 1804; the apparatus 5102/5102'; the processing system 5214, which may include the memory 376 and which may be the entire base station 806, 906, 1108, 1506, 1606, 1706, 1804 or a component of the base station 806, 906, 1108, 1506, 1606, 1706, 1804, such as the TX processor 316, the RX processor 370, and/or the controller/processor 375). In FIG. 45, blocks indicated with dashed lines represent optional blocks.

At 4502, the base station transmits a beam information message to at least a second UE indicating an association between a downlink beam used for one or more scheduled downlink transmissions and a set of uplink beams for unscheduled uplink transmissions, wherein the set of uplink beams for unscheduled uplink transmissions is for the second UE or a group of UEs including the second UE.

For example, with reference to FIG. 8, the base station 806 may transmit a beam information message 807 to the UE 802. As described in detail herein with reference to the beam information message 1110 or 1112 in FIG. 11, the beam information message 807 may indicate a pairing or association between a downlink beam and a set of uplink beams for unscheduled uplink transmissions. The downlink beam (e.g., the downlink beam used for the scheduled set of downlink transmissions 808) may be associated with a specific UE (e.g., the UE 804) and the set of uplink beams for unscheduled uplink transmissions may be associated with a different UE (e.g., the UE 802) or a group of different UEs.

At 4504, the base station configures at least a first UE with a first unique indication sequence or the second UE with a second unique indication sequence. For example, with reference to FIG. 15, the base station 1506 may transmit first configuration information 1507. In some examples, the first configuration information 1507 may include a unique indication sequence associated with the UE 1502. For example, base station 1506 may preconfigure the UE 1502 with the unique indication sequence using the first configuration information 1507.

At 4506, the base station performs one or more scheduled downlink transmissions to the first user equipment (UE). For example, with reference to FIG. 15, the base station 1506 transmits the scheduled set of downlink transmissions 1508 to the UE 1504.

At 4508, the base station receives, from the first UE or the second UE during the one or more scheduled downlink transmissions, an unscheduled data indication indicating that the first UE or the second UE is to transmit the high-priority data to the base station. In some examples, the unscheduled data indication includes the first unique indication sequence or the second unique indication sequence. For example, with reference to FIG. 15, the base station 1506 receives the unscheduled data indication 1518 from the UE 1502.

At 4510, the base station determines whether the first UE or the second UE is to transmit the high-priority data to the base station based on the first unique indication sequence or the second unique indication sequence included in the unscheduled data indication.

At 4512, the base station transmits at least one of an uplink MCS, a transmit power configuration, or an uplink beam configuration to the first UE or the second UE for the high-priority data in response to the unscheduled data indication, wherein the MCS, the transmit power configuration, or the uplink beam configuration enables the base station to receive the high-priority data in the full-duplex mode.

For example, with reference to FIG. 15, the base station 1506 may transmit the second configuration information 1520 to the UE 1502 in response to the unscheduled data indication 1518. The second configuration information 1520 may facilitate or improve the ability of the base station 1506 to receive the high-priority data in the full-duplex mode. In some examples, the second configuration information 1520 may include an uplink MCS, a transmit power configuration, and/or an uplink beam configuration for transmission of the high-priority data.

For example, the MCS indicated in the second configuration information 1520 may include a higher MCS value (e.g., a higher MCS index value) than the MCS value used for the set of downlink transmissions 1508. For example, the transmit power configuration indicated in the second configuration information 1520 may include a transmit power that is greater than or equal to a threshold transmit power. In some examples, the transmit power configuration may include a transmit power that is the maximum permissible transmission power the first UE 1502 may use for an uplink transmission. In some examples, the uplink beam configuration may indicate an uplink beam (e.g., a best uplink beam from a set of candidate uplink beams) to be used for transmission of the uplink transmission 1522.

At 4514, the base station receives the high-priority data based on at least one of the uplink MCS, the transmit power configuration, or the uplink beam configuration. For example, the base station 1506 may receive an uplink transmission 1522 including the high-priority data from the UE 1502 based on at least one of the uplink MCS, the transmit power configuration, or the uplink beam configuration.

Figure 46:
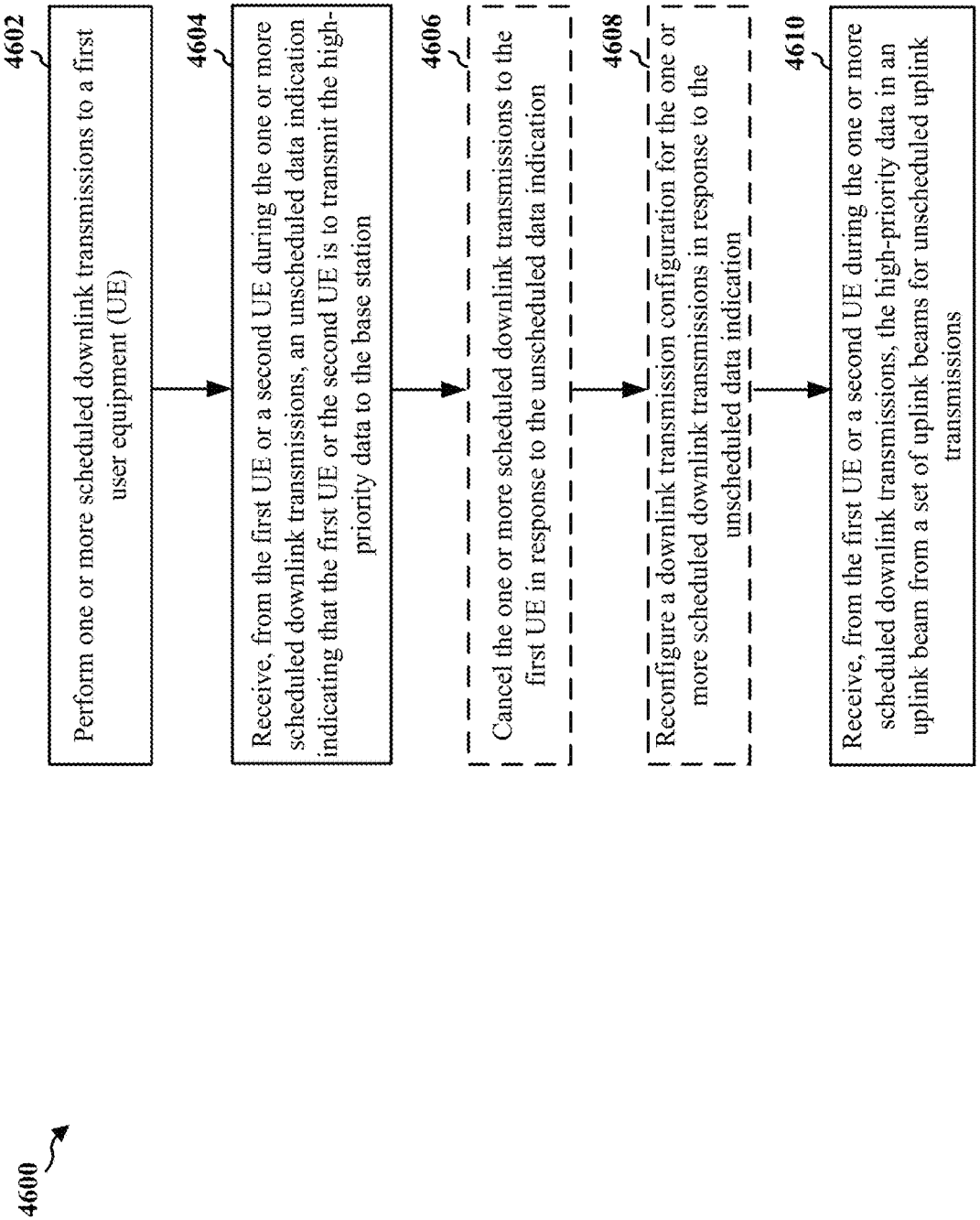
FIG. 46 is a flowchart of a method of wireless communication.

FIG. 46 is a flowchart 4600 of a method of wireless communication. The method may be performed by a base station (e.g., the base station 806, 906, 1108, 1506, 1606, 1706, 1804; the apparatus 5102/5102'; the processing system 5214, which may include the memory 376 and which may be the entire base station 806, 906, 1108, 1506, 1606, 1706, 1804 or a component of the base station 806, 906, 1108, 1506, 1606, 1706, 1804, such as the TX processor 316, the RX processor 370, and/or the controller/processor 375). In FIG. 46, blocks indicated with dashed lines represent optional blocks.

At 4602, the base station performs one or more scheduled downlink transmissions to a first user equipment (UE). For example, with reference to FIG. 16, the base station 1606 transmits the scheduled set of downlink transmissions 1608 to the UE 1604.

At 4604, the base station receives, from the first UE or a second UE during the one or more scheduled downlink transmissions, an unscheduled data indication indicating that the first UE or the second UE is to transmit the high-priority data to the base station. For example, with reference to FIG. 16, the base station 1606 receives the unscheduled data indication 1628 from the UE 1602.

At 4606, the base station cancels the one or more scheduled downlink transmissions to the first UE in response to the unscheduled data indication. For example, with reference to FIG. 16, the base station 1606 cancels one or more downlink transmissions at 1630. In this example, the base station cancels one or more of the scheduled set of downlink transmissions 1608 to the UE 1604.

At 4608, the base station reconfigures a downlink transmission configuration for the one or more scheduled downlink transmissions in response to the unscheduled data indication. In some examples, the downlink transmission configuration includes at least one of an MCS or a transmit power for the one or more scheduled downlink transmissions. The reconfigured downlink transmission configuration enables the base station to receive the high-priority data in the full-duplex mode. For example, with reference to FIG. 17, the base station 1706 at 1720 reconfigures a downlink transmission configuration for the scheduled set of downlink transmissions 1708.

The downlink transmission configuration may include at least one of an MCS or a transmit power for the one or more scheduled downlink transmissions, wherein the reconfigured downlink transmission configuration enables the base station to receive the high-priority data in the full-duplex mode. For example, with reference to FIG. 17, the base station 1706 may configure a different MCS for the scheduled set of downlink transmissions 1708 and/or a different transmit power for the scheduled set of downlink transmissions 1708 in response to the unscheduled data indication 1718. For example, the different MCS may include a lower MCS value (e.g., a lower MCS index value) for the set of downlink transmissions 1708. For example, the different transmit power may include a lower transmit power for the set of downlink transmissions 1708 to avoid or reduce self-interference at the base station 1706 while operating in the full-duplex mode, thereby improving the ability of the base station 1706 to successfully receive any uplink transmissions that may follow the unscheduled data indication 1718.

Finally, at 4610, the base station receives, from the first UE or the second UE during the one or more scheduled downlink transmissions, the high-priority data in an uplink beam from a set of uplink beams for unscheduled uplink transmissions. For example, with reference to FIG. 16, the base station 1606 may receive the uplink transmission 1632 including the high-priority data. For example, with reference to FIG. 17, the base station 1706 may receive the uplink transmission 1722 including the high-priority data.

Figure 47:
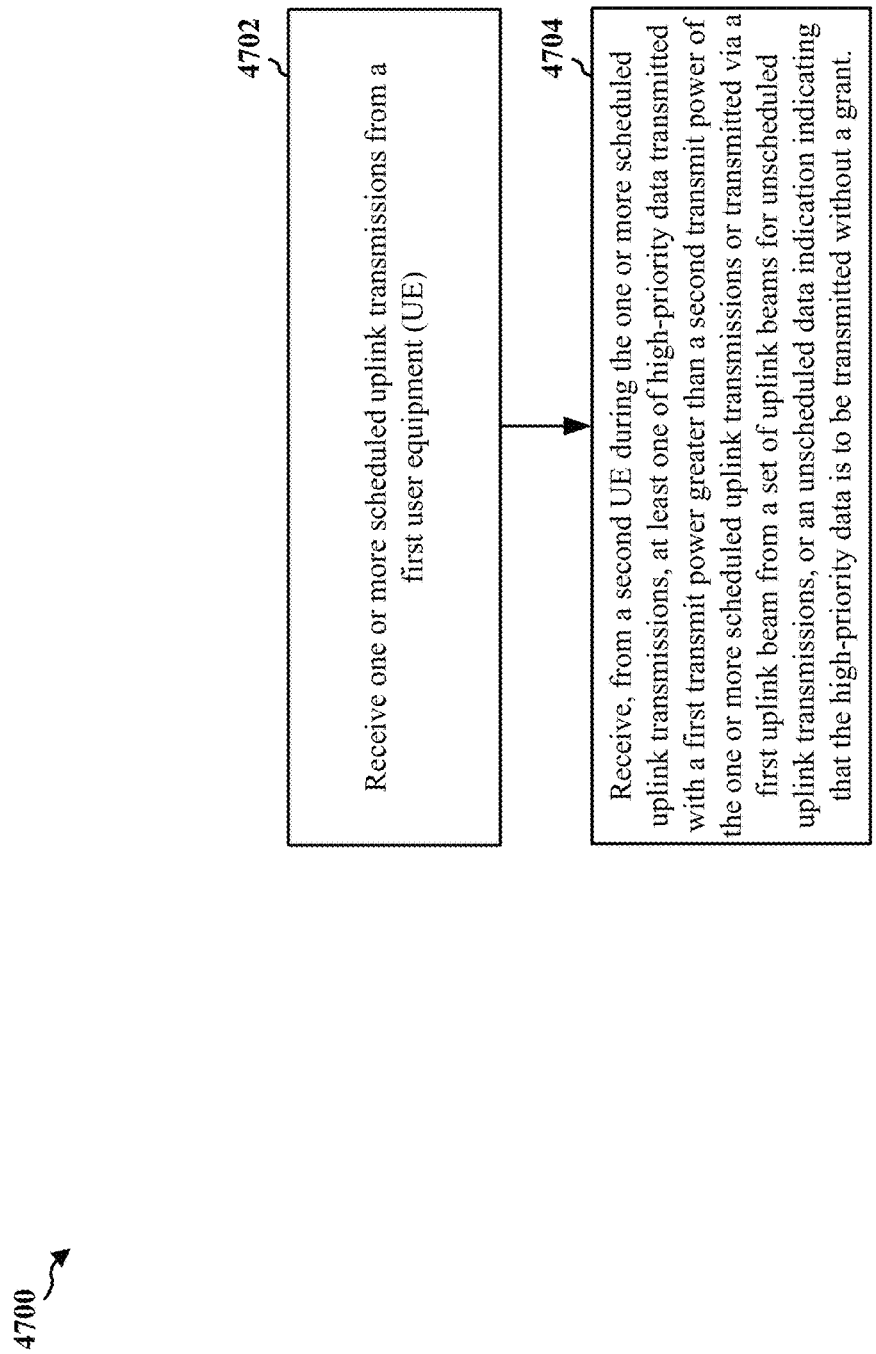
FIG. 47 is a flowchart of a method of wireless communication.

FIG. 47 is a flowchart 4700 of a method of wireless communication. The method may be performed by a base station (e.g., the base station 1906, 2006, 2104, 2304, 2408, 2806, 2906, 3006, 3106; the apparatus 5102/5102'; the processing system 5214, which may include the memory 376 and which may be the entire base station 1906, 2006, 2104, 2304, 2408, 2806, 2906, 3006, 3106 or a component of the base station 1906, 2006, 2104, 2304, 2408, 2806, 2906, 3006, 3106, such as the TX processor 316, the RX processor 370, and/or the controller/processor 375).

At 4702, the base station receives one or more scheduled uplink transmissions from a first user equipment (UE). For example, with reference to FIG. 19, the base station 1906 receives a scheduled set of uplink transmissions 1908 from the UE 1904.

Finally, at 4704, the base station receives, from a second UE during the one or more scheduled uplink transmissions, at least one of high-priority data transmitted with a first transmit power greater than a second transmit power of the one or more scheduled uplink transmissions or transmitted via a first uplink beam from a set of uplink beams for unscheduled uplink transmissions, or an unscheduled data indication indicating that the high-priority data is to be transmitted without a grant.

In one example, with reference to FIG. 19, the base station 1906 may receive the uplink transmission 1922 including high-priority data using an uplink beam from the set of uplink beams for unscheduled uplink transmissions indicated in the beam information message 1907. In another example, with reference to FIG. 20, the base station 2006 may receive the uplink transmission 2022 including high-priority data using an uplink beam from the set of uplink beams for unscheduled uplink transmissions indicated in the beam information message 2008.

In some examples, the unscheduled data indication indicating that the high-priority data is to be transmitted without a grant may be any one of the unscheduled data indications 2828, 2918, 3018 described herein. In some examples, the unscheduled data indication includes one or more indication bits preconfigured for the second UE or a unique indication sequence associated with the second UE.

In some examples, the base station receives the high-priority data from the second UE within a threshold time after the unscheduled data indication. In some examples, the threshold time may be set according to the acceptable latency of the high-priority data. For example, if the high-priority data is associated with a mission-critical service or an application where URLLC services are needed, the threshold time may be less than or equal to 1 ms. In other examples, the threshold time may be within a range of 1 ms to 2 ms.

In some examples, the high-priority data is transmitted in a periodic uplink resource allocation associated with a configured grant, wherein a periodicity of the periodic uplink resource allocation is configured to be less than or equal to an acceptable latency for the high-priority data. In some examples, the configured grant is associated with at least a second uplink beam of the first apparatus.

In some examples, the unscheduled data indication is received using at least one of a frequency division multiplexing (FDM) configuration, a space division multiplexing (SDM) configuration, or a transmit power that enables reception of the unscheduled data indication. For example, the parameters and/or values for the FDM configuration, SDM configuration, or transmit power may be set to facilitate reception of the unscheduled data indication at the base station while the base station receives a set of scheduled uplink transmissions from the first UE.

For example, with reference to FIG. 31, the base station 3106 may receive the high-priority data in the uplink transmission 3118 transmitted using a transmit power that is greater than or equal to a threshold transmit power. In some examples, the transmit power may be the maximum permissible transmission power the UE 3102 may use for an uplink transmission. In some examples, the UE 3102 may transmit the high-priority data in the uplink transmission 3118 using a transmit power that is greater than the transmit power of the scheduled set of uplink transmissions 3108 from the UE 3104.

Figure 48:
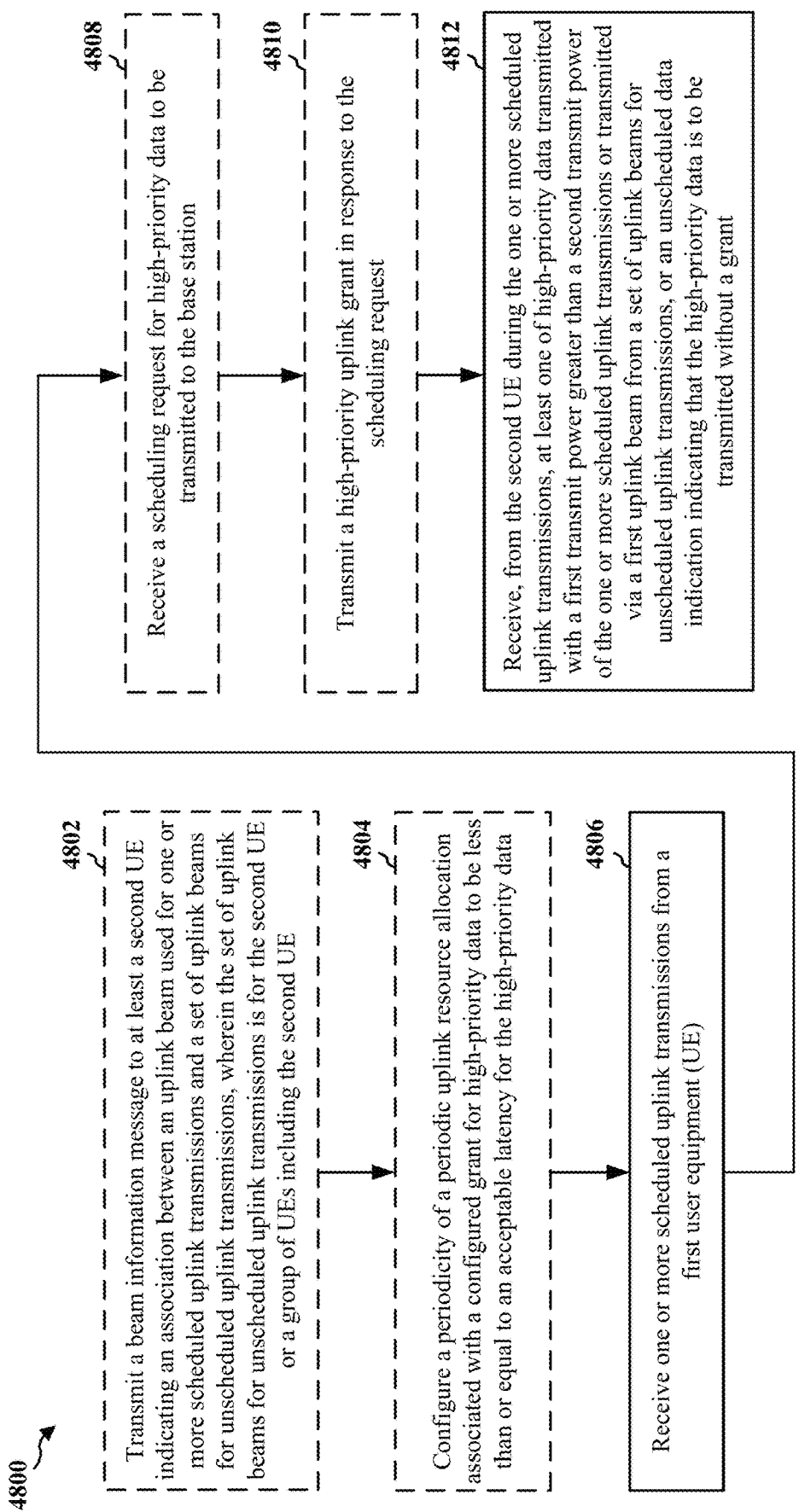
FIG. 48 is a flowchart of a method of wireless communication.

FIG. 48 is a flowchart 4800 of a method of wireless communication. The method may be performed by a base station (e.g., the base station 1906, 2006, 2104, 2304, 2408, 2806, 2906, 3006, 3106; the apparatus 5102/5102'; the processing system 5214, which may include the memory 376 and which may be the entire base station 1906, 2006, 2104, 2304, 2408, 2806, 2906, 3006, 3106 or a component of the base station 1906, 2006, 2104, 2304, 2408, 2806, 2906, 3006, 3106, such as the TX processor 316, the RX processor 370, and/or the controller/processor 375). In FIG. 48, blocks indicated with dashed lines represent optional blocks.

At 4802, the base station transmits a beam information message to at least a second UE indicating an association between an uplink beam used for one or more scheduled uplink transmissions and a set of uplink beams for unscheduled uplink transmissions, wherein the set of uplink beams for unscheduled uplink transmissions is for the second UE or a group of UEs including the second UE.

At 4804, the base station configures a periodicity of a periodic uplink resource allocation associated with a configured grant for high-priority data to be less than or equal to an acceptable latency for the high-priority data. In some examples, the configured grant is associated with at least a second uplink beam of a first UE.

For example, with reference to FIG. 20, the base station 2006 may transmit control information 2010 to the UE 2002 including a configured grant (CG) for uplink transmissions. The configured grant may indicate a periodic uplink resource for the UE 2002 and a periodicity of the periodic uplink resource. In some examples, the base station 2006 may transmit the control information 2010 including the configured grant whether or not the first UE 2002 has data to be transmitted to the base station 2006. For example, with reference to FIG. 10, the shaded symbols (e.g., symbols 1008 and 1012) may include uplink resources the UE 2002 can use to transmit the high-priority data. The non-shaded symbols (e.g., symbol 1010) in FIG. 10 may not include uplink resources. When the base station 2006 implements a configured grant, the periodic uplink resources may be allocated for the first UE 2002 without the need for a scheduling request from the first UE 2002 and/or may be allocated whether or not the first UE 2002 has data to transmit on the uplink.

At 4806, the base station receives one or more scheduled uplink transmissions from a first user equipment (UE). For example, with reference to FIG. 19, the base station 1906 receives the scheduled set of uplink transmissions 1908. For example, with reference to FIG. 20, the base station 2006 receives the scheduled set of uplink transmissions 2012.

At 4808, the base station receives a scheduling request for high-priority data to be transmitted to the base station. The scheduling request is received in one of a plurality of scheduling request transmission occasions configured for the second UE. A time between any two consecutive scheduling request transmission occasions in the plurality of scheduling request transmission occasions is configured to be less than or equal to an acceptable latency for the high-priority data. For example, the base station 1906 may receive the scheduling request 1918 from the UE 1902.

At 4810, the base station transmits a high-priority uplink grant in response to the scheduling request. For example, the base station 1906 may transmit the high-priority uplink grant 1920 to the UE 1902 in response to the scheduling request 1918.

Finally, at 4812, the base station receives, from the second UE during the one or more scheduled uplink transmissions, at least one of high-priority data transmitted with a first transmit power greater than a second transmit power of the one or more scheduled uplink transmissions or transmitted via a first uplink beam from a set of uplink beams for unscheduled uplink transmissions, or an unscheduled data indication indicating that the high-priority data is to be transmitted without a grant. In some examples, the high-priority data is received based on the high-priority uplink grant.

Figure 49:
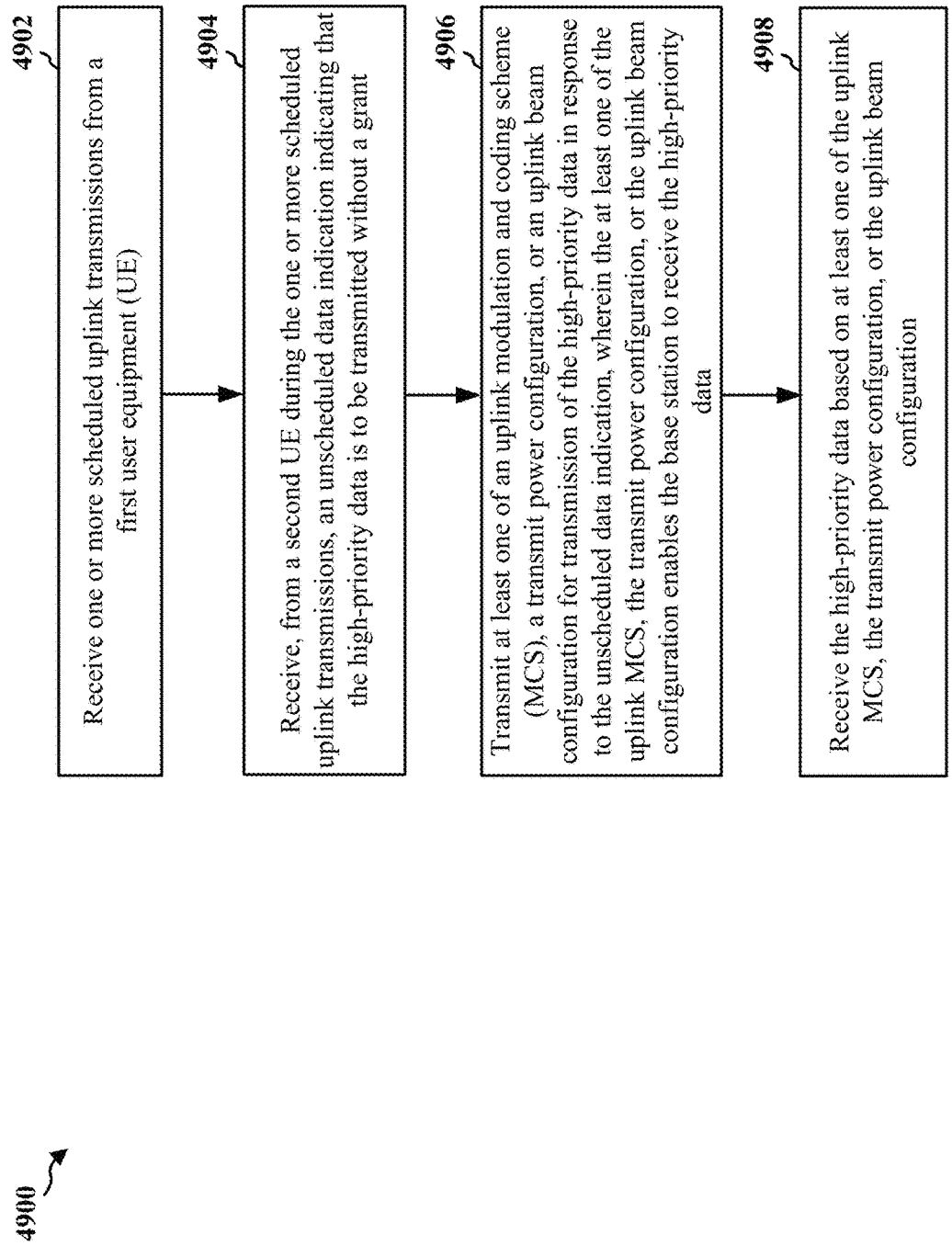
FIG. 49 is a flowchart of a method of wireless communication.

FIG. 49 is a flowchart 4900 of a method of wireless communication. The method may be performed by a base station (e.g., the base station 1906, 2006, 2104, 2304, 2408, 2806, 2906, 3006, 3106; the apparatus 5102/5102'; the processing system 5214, which may include the memory 376 and which may be the entire base station 1906, 2006, 2104, 2304, 2408, 2806, 2906, 3006, 3106 or a component of the base station 1906, 2006, 2104, 2304, 2408, 2806, 2906, 3006, 3106, such as the TX processor 316, the RX processor 370, and/or the controller/processor 375).

At 4902, the base station receives one or more scheduled uplink transmissions from a first user equipment (UE).

At 4904, the base station receives, from a second UE during the one or more scheduled uplink transmissions, an unscheduled data indication indicating that the high-priority data is to be transmitted without a grant.

At 4906, the base station transmits at least one of an uplink MCS, a transmit power configuration, or an uplink beam configuration for transmission of the high-priority data in response to the unscheduled data indication. Each of the uplink MCS, the transmit power configuration, or the uplink beam configuration may enable the base station to receive the high-priority data or may improve the base stations ability to receive the high-priority data.

Finally, at 4908, the base station receives the high-priority data based on at least one of the uplink MCS, the transmit power configuration, or the uplink beam configuration.

Figure 50:
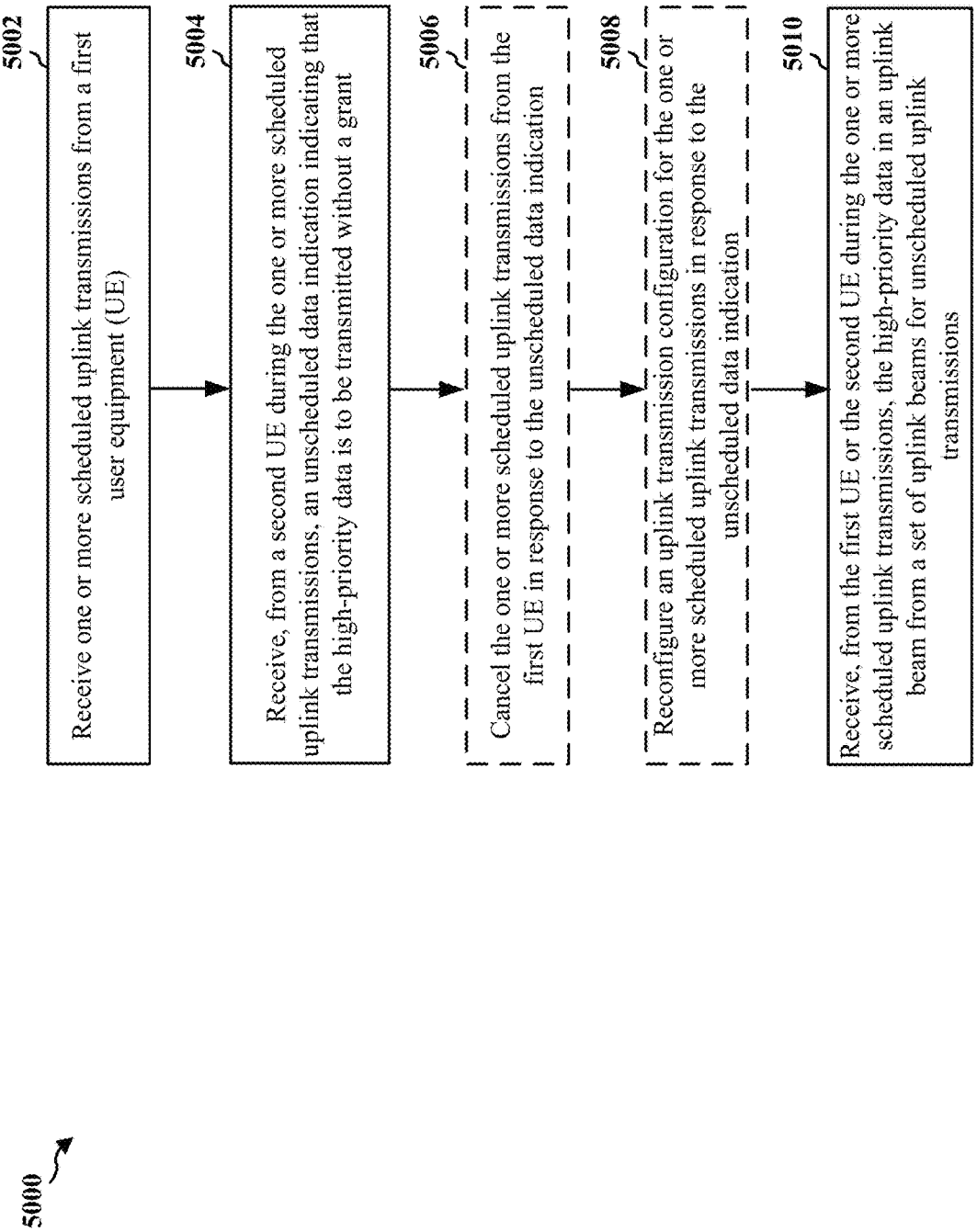
FIG. 50 is a flowchart of a method of wireless communication.

FIG. 50 is a flowchart 5000 of a method of wireless communication. The method may be performed by a base station (e.g., the base station 1906, 2006, 2104, 2304, 2408, 2806, 2906, 3006, 3106; the apparatus 5102/5102'; the processing system 5214, which may include the memory 376 and which may be the entire base station 1906, 2006, 2104, 2304, 2408, 2806, 2906, 3006, 3106 or a component of the base station 1906, 2006, 2104, 2304, 2408, 2806, 2906, 3006, 3106, such as the TX processor 316, the RX processor 370, and/or the controller/processor 375). In FIG. 50, blocks indicated with dashed lines represent optional blocks.

At 5002, the base station receives one or more scheduled uplink transmissions from a first user equipment (UE). For example, with reference to FIG. 28, the base station 2806 receives the scheduled set of uplink transmissions 2809 from the UE 2804.

At 5004, the base station receives, from a second UE during the one or more scheduled uplink transmissions, an unscheduled data indication indicating that the high-priority data is to be transmitted without a grant. For example, with reference to FIG. 28, the base station 2806 receives the unscheduled data indication 2828 from the UE 2802.

At 5006, the base station cancels the one or more scheduled uplink transmissions from the first UE in response to the unscheduled data indication. For example, with reference to FIG. 28, the base station 2806 at 2830 may cancel one or more uplink transmissions in the scheduled set of uplink transmissions 2809 in response to the unscheduled data indication 2828. For example, the base station 2806 may apply the DCI format 2-4 to cancel one or more of the scheduled set of uplink transmissions 2809.

At 5008, the base station reconfigures an uplink transmission configuration for the one or more scheduled uplink transmissions in response to the unscheduled data indication. The uplink transmission configuration includes at least one of an MCS, an uplink beam configuration, or a transmit power for the one or more scheduled uplink transmissions from the first UE. The reconfigured uplink transmission configuration enables the base station to receive the high-priority data or improves the ability of the base station to receive the high-priority data.

For example, with reference to FIG. 29, when the base station 2906 detects the unscheduled data indication 2918 from the UE 2902, the base station 2906 at 2920 may reconfigure an uplink transmission configuration for the scheduled set of uplink transmissions 2909 in response to the unscheduled data indication 2918. For example, the base station 2906 may configure a different MCS for the scheduled set of uplink transmissions 2909 and/or a different transmit power for the scheduled set of uplink transmissions 2909 in response to the unscheduled data indication 2918. For example, the different MCS may include a lower MCS value (e.g., a lower MCS index value) for the scheduled set of uplink transmissions 2909. For example, the different transmit power may include a lower transmit power for the scheduled set of uplink transmissions 2909 to avoid or reduce self-interference at the base station 2906, thereby improving the ability of the base station 2906 to successfully receive any uplink transmissions that may follow the unscheduled data indication 2918.

Finally, at 5010, the base station receives, from the first UE or the second UE during the one or more scheduled uplink transmissions, the high-priority data in an uplink beam from a set of uplink beams for unscheduled uplink transmissions.

Figure 51:
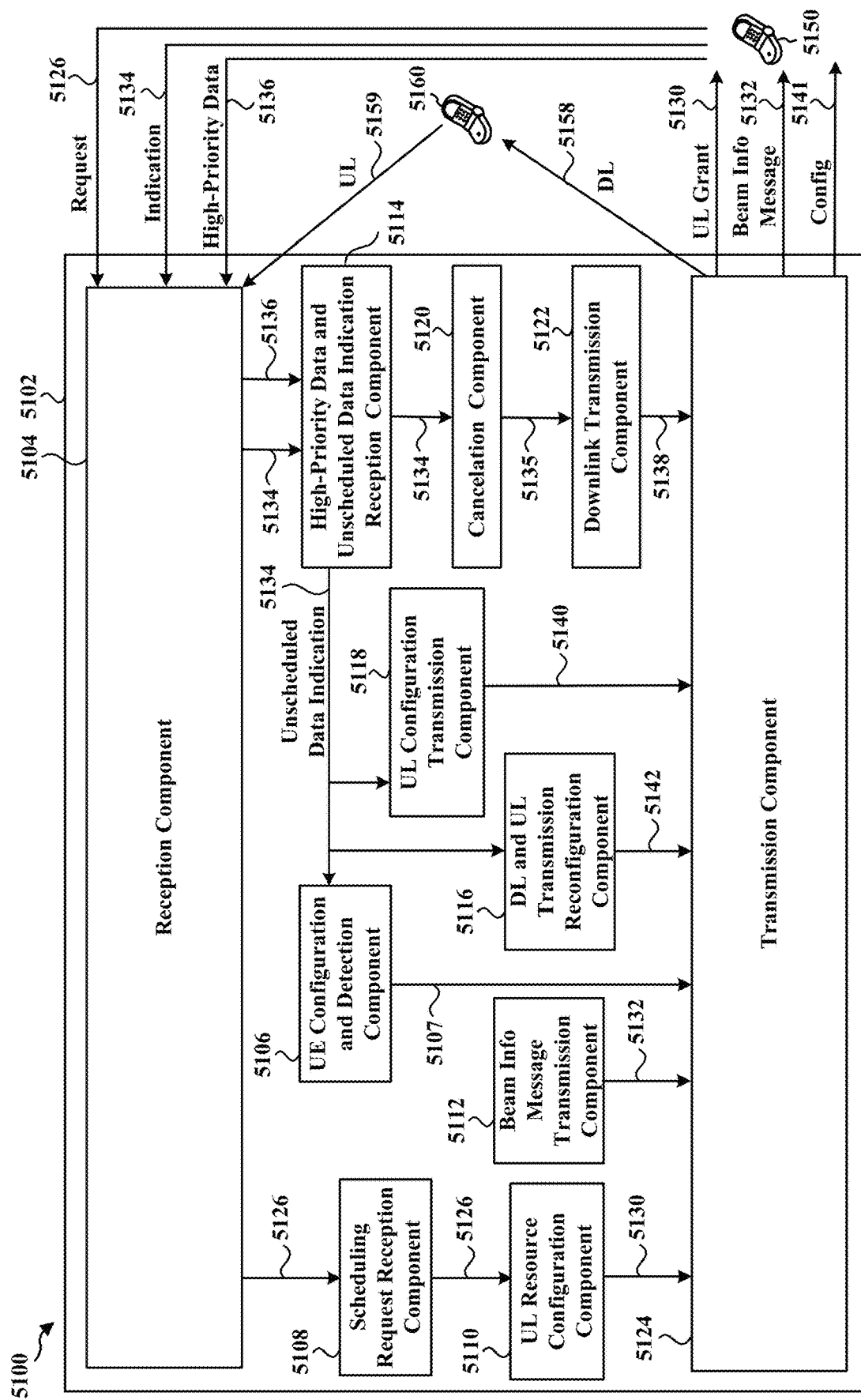
FIG. 51 is a conceptual data flow diagram illustrating the data flow between different means/components in an example apparatus.

FIG. 51 is a conceptual data flow diagram 5100 illustrating the data flow between different means/components in an example apparatus 5102. The apparatus may be a base station. The apparatus includes a reception component 5104 that receives one or more scheduled uplink transmissions 5159 from a user equipment (UE) 5160, a scheduling request 5126 from a UE 5150, an unscheduled data indication 5134 from the UE 5150, and/or an uplink transmission 5136 including high-priority data from the UE 5150.

The apparatus further includes a UE configuration and detection component 5106 that configures at least the first UE (e.g., the UE 5150) with a first unique indication sequence 5107 (e.g., via the configuration message 5141) and determines whether the first UE or the second UE (e.g., the UE 5160) is to transmit high-priority data to the apparatus based on a unique indication sequence in an unscheduled data indication (e.g., the unscheduled data indication 5134).

The apparatus further includes a scheduling request reception component 5108 that receives a scheduling request 5126 for high-priority data to be transmitted to the apparatus. The scheduling request reception component 5108 may provide the scheduling request 5126 to the uplink resource configuration component 5110.

The apparatus further includes an uplink resource configuration component 5110 that transmits a high-priority uplink grant 5130 in response to the scheduling request 5126. The uplink resource configuration component 5110 further configures a periodicity of a periodic uplink resource allocation associated with a configured grant for the high-priority data to be less than or equal to an acceptable latency for the high-priority data. The uplink resource configuration component 5110 may transmit the high-priority uplink grant 5130 to the UE 5150 via the transmission component 5124.

The apparatus further includes a beam information message transmission component 5112 that transmits a beam information message 5132 via the transmission component 5124 to at least the UE 5150 indicating an association between a downlink beam used for one or more scheduled downlink transmissions and a set of uplink beams for unscheduled uplink transmissions, or an association between an uplink beam used for one or more scheduled uplink transmissions and a set of uplink beams for unscheduled uplink transmissions.

The apparatus further includes a high-priority data and unscheduled data indication reception component 5114 that receives, from the UE 5160 or the UE 5150 during the one or more scheduled downlink transmissions (e.g., downlink transmission 5158), at least one of high-priority data (e.g., via the uplink transmission 5136) in an uplink beam from a set of uplink beams for unscheduled uplink transmissions, or an unscheduled data indication (e.g., unscheduled data indication 5134) indicating that the UE 5160 or the UE 5150 is to transmit the high-priority data to the apparatus. The high-priority data and unscheduled data indication reception component 5114 further receives high-priority data (e.g., via the uplink transmission 5136) transmitted with a first transmit power greater than a second transmit power of the one or more scheduled uplink transmissions or transmitted via a first uplink beam from a set of uplink beams for unscheduled uplink transmissions.

The apparatus includes a downlink and uplink transmission reconfiguration component 5116 that reconfigures (e.g., via the reconfiguration signal 5142) a downlink transmission configuration for the one or more scheduled downlink transmissions (e.g., downlink transmission 5158) in response to the unscheduled data indication 5134.

The downlink and uplink transmission reconfiguration component 5116 further reconfigures (e.g., via the reconfiguration signal 5142) an uplink transmission configuration for the one or more scheduled uplink transmissions (e.g., uplink transmission 5159) in response to the unscheduled data indication 5134, the uplink transmission configuration including at least one of an MCS, an uplink beam configuration, or a transmit power for the one or more scheduled uplink transmissions from the first UE.

The apparatus includes an uplink configuration transmission component 5118 that transmits an uplink configuration 5140 (e.g., via the configuration message 5141) including at least one of an uplink MCS, a transmit power configuration, or an uplink beam configuration to the UE 5160 or the UE 5150 for the high-priority data in response to the unscheduled data indication 5134. The high-priority data and unscheduled data indication reception component 5114 may receive the high-priority data via the uplink transmission 5136 based on at least one of the uplink MCS, the transmit power configuration, or the uplink beam configuration.

The apparatus further includes a cancelation component 5120 that cancels (via the cancelation signal 5135) one or more scheduled uplink transmissions from the UE 5160 or one or more scheduled downlink transmissions to the UE 5160 in response to the unscheduled data indication 5134. For example, the downlink transmission component 5122 may transmit the cancelation signal 5135 to the UE 5160 via the downlink message 5138 and the downlink transmission 5158.

The apparatus further includes a downlink transmission component 5122 that performs one or more scheduled downlink transmissions (e.g., downlink transmission 5158) to the UE 5160.

The apparatus further includes a transmission component 5124 that transmits a high-priority uplink (UL) grant 5130, a beam information message 5132, a configuration message 5141, and/or one or more scheduled downlink transmissions 5158.

The apparatus may include additional components that perform each of the blocks of the algorithm in the aforementioned flowcharts of FIGS. 42-50. As such, each block in the aforementioned flowcharts of FIGS. 42-50 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 52:
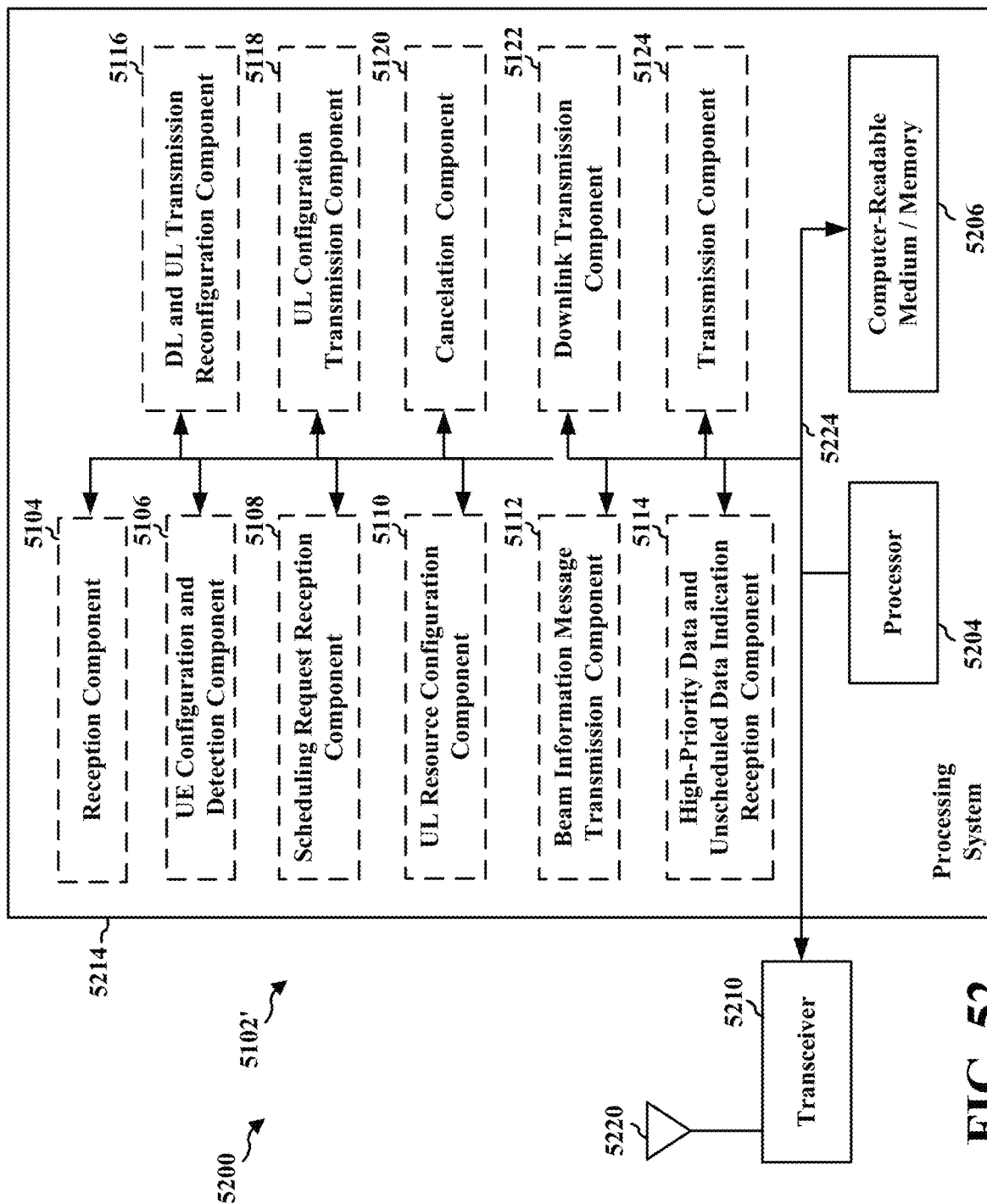
FIG. 52 is a diagram illustrating an example of a hardware implementation for an apparatus employing a processing system.

FIG. 52 is a diagram 5200 illustrating an example of a hardware implementation for an apparatus 5102' employing a processing system 5214. The processing system 5214 may be implemented with a bus architecture, represented generally by the bus 5224. The bus 5224 may include any number of interconnecting buses and bridges depending on the specific application of the processing system 5214 and the overall design constraints. The bus 5224 links together various circuits including one or more processors and/or hardware components, represented by the processor 5204, the components 5104, 5106, 5108, 5110, 5112, 5114, 5116, 5118, 5120, 5122, 5124, and the computer-readable medium/memory 5206. The bus 5224 may also link various other circuits such as timing sources, peripherals, voltage regulators, and power management circuits, which are well known in the art, and therefore, will not be described any further.

The processing system 5214 may be coupled to a transceiver 5210. The transceiver 5210 is coupled to one or more antennas 5220. The transceiver 5210 provides a means for communicating with various other apparatus over a transmission medium. The transceiver 5210 receives a signal from the one or more antennas 5220, extracts information from the received signal, and provides the extracted information to the processing system 5214, specifically the reception component 5104. In addition, the transceiver 5210 receives information from the processing system 5214, specifically the transmission component 5124, and based on the received information, generates a signal to be applied to the one or more antennas 5220. The processing system 5214 includes a processor 5204 coupled to a computer-readable medium/memory 5206. The processor 5204 is responsible for general processing, including the execution of software stored on the computer-readable medium/memory 5206. The software, when executed by the processor 5204, causes the processing system 5214 to perform the various functions described supra for any particular apparatus. The computer-readable medium/memory 5206 may also be used for storing data that is manipulated by the processor 5204 when executing software. The processing system 5214 further includes at least one of the components 5104, 5106, 5108, 5110, 5112, 5114, 5116, 5118, 5120, 5122, 5124. The components may be software components running in the processor 5204, resident/stored in the computer readable medium/memory 5206, one or more hardware components coupled to the processor 5204, or some combination thereof. The processing system 5214 may be a component of the base station 310 and may include the memory 376 and/or at least one of the TX processor 316, the RX processor 370, and the controller/processor 375. Alternatively, the processing system 5214 may be the entire base station (e.g., see 310 of FIG. 3).

In one configuration, the apparatus 5102/5102' for wireless communication includes means for performing one or more scheduled downlink transmissions to a first user equipment (UE), means for receiving, from the first UE or a second UE during the one or more scheduled downlink transmissions, at least one of high-priority data in an uplink beam from a set of uplink beams for unscheduled uplink transmissions or an unscheduled data indication indicating that the first UE or the second UE is to transmit the high-priority data to the apparatus 5102/5102', means for transmitting a beam information message to at least the second UE indicating an association between a downlink beam used for one or more scheduled downlink transmissions and a set of uplink beams for unscheduled uplink transmissions, wherein the set of uplink beams for unscheduled uplink transmissions is for the second UE or a group of UEs including the second UE, means for receiving a scheduling request for high-priority data to be transmitted to the apparatus 5102/5102', means for transmitting a high-priority uplink grant in response to the scheduling request, means for configuring at least a first UE with a first unique indication sequence or a second UE with a second unique indication sequence, means for receiving, from the first UE or a second UE during the one or more scheduled downlink transmissions, an unscheduled data indication indicating that the first UE or the second UE is to transmit the high-priority data to the apparatus 5102/5102', means for determining whether the first UE or the second UE is to transmit the high-priority data to the apparatus 5102/5102' based on the first unique indication sequence or the second unique indication sequence included in the unscheduled data indication, means for transmitting at least one of an uplink MCS, a transmit power configuration, or an uplink beam configuration to the first UE or the second UE for the high-priority data in response to the unscheduled data indication, wherein the MCS, the transmit power configuration, or the uplink beam configuration enables the apparatus 5102/5102' to receive the high-priority data in the full-duplex mode, means for receiving the high-priority data based on at least one of the uplink MCS, the transmit power configuration, or the uplink beam configuration, means for canceling the one or more scheduled downlink transmissions to the first UE in response to the unscheduled data indication, means for reconfiguring a downlink transmission configuration for the one or more scheduled downlink transmissions in response to the unscheduled data indication, means for receiving, from the first UE or a second UE during the one or more scheduled downlink transmissions, the high-priority data in an uplink beam from a set of uplink beams for unscheduled uplink transmissions, means for receiving one or more scheduled uplink transmissions from the first UE.

The apparatus 5102/5102' for wireless communication further includes means for receiving, from a second UE during one or more scheduled uplink transmissions, at least one of high-priority data transmitted with a first transmit power greater than a second transmit power of the one or more scheduled uplink transmissions or transmitted via a first uplink beam from a set of uplink beams for unscheduled uplink transmissions, or an unscheduled data indication indicating that the high-priority data is to be transmitted without a grant, means for transmitting a beam information message to at least a second UE indicating an association between an uplink beam used for one or more scheduled uplink transmissions and a set of uplink beams for unscheduled uplink transmissions, wherein the set of uplink beams for unscheduled uplink transmissions is for the second UE or a group of UEs including the second UE, means for configuring a periodicity of a periodic uplink resource allocation associated with a configured grant for high-priority data to be less than or equal to an acceptable latency for the high-priority data, means for receiving one or more scheduled uplink transmissions from a first user equipment (UE), means for receiving, from a second UE during the one or more scheduled uplink transmissions, an unscheduled data indication indicating that the high-priority data is to be transmitted without a grant, means for transmitting at least one of an uplink MCS, a transmit power configuration, or an uplink beam configuration for transmission of the high-priority data in response to the unscheduled data indication, wherein the at least one of the uplink MCS, the transmit power configuration, or the uplink beam configuration enables the apparatus 5102/5102' to receive the high-priority data, means for receiving the high-priority data based on at least one of the uplink MCS, the transmit power configuration, or the uplink beam configuration, means for canceling the one or more scheduled uplink transmissions from the first UE in response to the unscheduled data indication, means for reconfiguring an uplink transmission configuration for the one or more scheduled uplink transmissions in response to the unscheduled data indication, means for receiving, from the first UE or a second UE during the one or more scheduled uplink transmissions, the high-priority data in an uplink beam from a set of uplink beams for unscheduled uplink transmissions.

The aforementioned means may be one or more of the aforementioned components of the apparatus 5102 and/or the processing system 5214 of the apparatus 5102' configured to perform the functions recited by the aforementioned means. As described supra, the processing system 5214 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

The aspects described herein may enable a UE to transmit high-priority data to a base station in scenarios where the base station is transmitting downlink transmissions (e.g., scheduled downlink transmissions) or receiving uplink transmissions (e.g., scheduled uplink transmissions). Therefore, in some examples, the UE described herein may not have to wait until the base station has completed the transmission of the downlink transmissions or reception of the uplink transmissions before transmitting the high-priority data to the base station. This may avoid delays at the UE, thereby enabling the UE to timely transit the high-priority data within the delay tolerance of the high-priority data.

The following provides an overview of aspects of the present disclosure:

Aspect 1: A method of wireless communication for a first user equipment (UE), comprising: obtaining high-priority data to be transmitted to a base station operating in a full-duplex mode; and transmitting, to the base station while the base station performs one or more scheduled downlink transmissions to the first UE or to a second UE, at least one of the high-priority data via a first uplink beam from a set of uplink beams for unscheduled uplink transmissions or an unscheduled data indication indicating that the high-priority data is to be transmitted without an uplink grant.

Aspect 2: The method of aspect 1, further comprising: transmitting a scheduling request to obtain a high-priority uplink grant for transmission of the high-priority data, wherein the scheduling request is transmitted in one of a plurality of scheduling request transmission occasions using one or more resources for the scheduling request, and wherein a time between any two consecutive scheduling request transmission occasions in the plurality of scheduling request transmission occasions is configured to be less than or equal to an acceptable latency for the high-priority data; and receiving the high-priority uplink grant in response to the scheduling request, wherein the high-priority data is transmitted using the high-priority uplink grant.

Aspect 3: The method of aspect 1 or 2, wherein the unscheduled data indication includes a unique indication sequence associated with the first UE.

Aspect 4: The method of any of aspects 1 through 3, wherein the first UE transmits the high-priority data within a threshold time after the unscheduled data indication.

Aspect 5: The method of any of aspects 1 through 4, wherein the first UE transmits the unscheduled data indication, further comprising: receiving at least one of an uplink MCS, a transmit power configuration, or an uplink beam configuration for transmission of the high-priority data in response to the unscheduled data indication, and transmitting the high-priority data to the base station based on at least one of the uplink MCS, the transmit power configuration, or the uplink beam configuration, wherein the at least one of the uplink MCS, the transmit power configuration, or the uplink beam configuration enables the base station to receive the high-priority data in the full-duplex mode.

Aspect 6: The method of any of aspects 1 through 5, wherein the first UE transmits the high-priority data in a periodic uplink resource allocation associated with a configured grant, wherein a periodicity of the periodic uplink resource allocation associated with the configured grant is configured to be less than or equal to an acceptable latency for the high-priority data.

Aspect 7: The method of aspect 6, wherein the configured grant is associated with at least a second uplink beam of the first UE.

Aspect 8: The method of any of aspects 1 through 7, further comprising:
receiving a beam information message from the base station indicating an association between a downlink beam used for the one or more scheduled downlink transmissions and the set of uplink beams, wherein the set of uplink beams is for the first UE or a group of UEs including the first UE.

Aspect 9: An apparatus for wireless communication, comprising: a memory; and at least one processor coupled to the memory and configured to perform a method of any one of aspects 1 through 8.

Aspect 10: An apparatus for wireless communication comprising at least one means for performing a method of any one of aspects 1 through 8.

Aspect 11: A computer-readable medium storing computer executable code, the code when executed by a processor cause the processor to perform a method of any one of aspects 1 through 8.

Aspect 12: A method of wireless communication for a first user equipment (UE), comprising: obtaining high-priority data to be transmitted to a base station; and transmitting, to the base station while the base station receives one or more scheduled uplink transmissions from the first UE or a second UE, at least one of: the high-priority data using a first transmit power greater than a second transmit power of the one or more scheduled uplink transmissions or using a first uplink beam from a set of uplink beams for unscheduled uplink transmissions, or an unscheduled data indication indicating that the high-priority data is to be transmitted without an uplink grant.

Aspect 13: The method of aspect 12, further comprising: transmitting a scheduling request to obtain a high-priority uplink grant for transmission of the high-priority data, wherein the scheduling request is transmitted in one of a plurality of scheduling request transmission occasions using one or more resources allocated for the scheduling request, and wherein a time between any two consecutive scheduling request transmission occasions in the plurality of scheduling request transmission occasions is configured to be less than or equal to an acceptable latency for the high-priority data; and receiving the high-priority uplink grant in response to the scheduling request, wherein the high-priority data is transmitted using the high-priority uplink grant.

Aspect 14: The method of aspect 12 or 13, wherein the unscheduled data indication includes one or more indication bits preconfigured for the first UE or a unique indication sequence associated with the first UE.

Aspect 15: The method of any of aspects 12 through 14, further comprising: transmitting the high-priority data to the base station within a threshold time after the unscheduled data indication.

Aspect 16: The method of any of aspects 12 through 15, wherein the first UE transmits the unscheduled data indication, further comprising: receiving at least one of an uplink MCS, a transmit power configuration, or an uplink beam configuration for transmission of the high-priority data in response to the unscheduled data indication; and transmitting the high-priority data to the base station based on at least one of the uplink MCS, the transmit power configuration, or the uplink beam configuration.

Aspect 17: The method of any of aspects 12, 14, 15, and/or 16, wherein the high-priority data is transmitted in a periodic uplink resource allocation associated with a configured grant, wherein a periodicity of the periodic uplink resource allocation is configured to be less than or equal to an acceptable latency for the high-priority data.

Aspect 18: The method of aspect 17, wherein the configured grant is associated with at least a second uplink beam of the first UE.

Aspect 19: The method of any of aspects 12 through 18, further comprising: receiving a beam information message from the base station indicating an association between an uplink beam used for the one or more scheduled uplink transmissions and the set of uplink beams, wherein the set of uplink beams is for the first UE or a group of UEs including the first UE for concurrent uplink transmissions.

Aspect 20: The method of any of aspects 12 through 19, wherein the unscheduled data indication is transmitted using at least one of a frequency division multiplexing (FDM) configuration, a space division multiplexing (SDM) configuration, or a transmit power that enables reception of the unscheduled data indication at the base station.

Aspect 21: The method of any of aspects 12 through 20, wherein the first UE includes a first antenna panel and a second antenna panel, further comprising: transmitting the high-priority data from the first antenna panel concurrently with the one or more scheduled uplink transmissions from the second antenna panel.

Aspect 22: An apparatus for wireless communication, comprising: a memory; and at least one processor coupled to the memory and configured to perform a method of any one of aspects 12 through 21.

Aspect 23: An apparatus for wireless communication comprising at least one means for performing a method of any one of aspects 12 through 21.

Aspect 24: A computer-readable medium storing computer executable code, the code when executed by a processor cause the processor to perform a method of any one of aspects 12 through 21.

Aspect 25: A method of wireless communication for a base station operating in a full-duplex mode, comprising: performing one or more scheduled downlink transmissions to a first user equipment (UE); and receiving, from the first UE or a second UE during the one or more scheduled downlink transmissions, at least one of high-priority data in an uplink beam from a set of uplink beams for unscheduled uplink transmissions or an unscheduled data indication indicating that the first UE or the second UE is to transmit the high-priority data to the base station.

Aspect 26: The method of aspect 25, further comprising: receiving a scheduling request for high-priority data to be transmitted to the base station, wherein the scheduling request is received in one of a plurality of scheduling request transmission occasions configured for at least the first UE or the second UE, and wherein a time between any two consecutive scheduling request transmission occasions in the plurality of scheduling request transmission occasions is configured to be less than or equal to an acceptable latency for the high-priority data; and transmitting a high-priority uplink grant in response to the scheduling request, wherein the high-priority data is received based on the high-priority uplink grant.

Aspect 27: The method of aspect 25 or 26, wherein the unscheduled data indication includes a unique indication sequence associated with the first UE or the second UE.

Aspect 28: The method of any of aspects 25 or 27, wherein the base station receives the high-priority data within a threshold time after the unscheduled data indication.

Aspect 29: The method of any of aspects 25, 27, and/or 28, wherein the unscheduled data indication is received from the first UE or the second UE, further comprising: transmitting at least one of an uplink MCS, a transmit power configuration, or an uplink beam configuration to the first UE or the second UE for the high-priority data in response to the unscheduled data indication, wherein the MCS, the transmit power configuration, or the uplink beam configuration enables the base station to receive the high-priority data in the full-duplex mode; and receiving the high-priority data based on at least one of the uplink MCS, the transmit power configuration, or the uplink beam configuration.

Aspect 30: The method of any of aspects 25 through 29, further comprising: transmitting a beam information message to at least the second UE indicating an association between a downlink beam used for the one or more scheduled downlink transmissions and the set of uplink beams, wherein the set of uplink beams is for the second UE or a group of UEs including the second UE.

Aspect 31: The method of any of aspects 25, 27, 28, 29, and/or 30, wherein the high-priority data is received in a periodic uplink resource allocation associated with a configured grant, wherein a periodicity of the periodic uplink resource allocation is configured to be less than or equal to an acceptable latency for the high-priority data.

Aspect 32: The method of aspect 31, wherein the configured grant is associated with at least a second uplink beam of the second UE.

Aspect 33: The method of aspect 25, 27, 28, 29, and/or 30, wherein the base station receives the unscheduled data indication, further comprising: canceling the one or more scheduled downlink transmissions to the first UE in response to the unscheduled data indication.

Aspect 34: The method of any of aspects 25, 27, 28, 29, and/or 30, wherein the base station receives the unscheduled data indication, further comprising: reconfiguring a downlink transmission configuration for the one or more scheduled downlink transmissions in response to the unscheduled data indication, the downlink transmission configuration including at least one of an MCS or a transmit power for the one or more scheduled downlink transmissions, wherein the reconfigured downlink transmission configuration enables the base station to receive the high-priority data in the full-duplex mode.

Aspect 35: The method of any of aspects 25, 27, 28, 29, and/or 30, further comprising: configuring at least the first UE with a first unique indication sequence or the second UE with a second unique indication sequence, wherein the unscheduled data indication includes the first unique indication sequence or the second unique indication sequence; and determining whether the first UE or the second UE is to transmit the high-priority data to the base station based on the first unique indication sequence or the second unique indication sequence.

Aspect 36: An apparatus for wireless communication, comprising: a memory; and at least one processor coupled to the memory and configured to perform a method of any one of aspects 25 through 35.

Aspect 37: An apparatus for wireless communication comprising at least one means for performing a method of any one of aspects 25 through 35.

Aspect 38: A computer-readable medium storing computer executable code, the code when executed by a processor cause the processor to perform a method of any one of aspects 25 through 35.

Aspect 39: A method of wireless communication for a base station, comprising: receiving one or more scheduled uplink transmissions from a first user equipment (UE); and receiving, from a second UE during the one or more scheduled uplink transmissions, at least one of: high-priority data transmitted with a first transmit power greater than a second transmit power of the one or more scheduled uplink transmissions or transmitted via a first uplink beam from a set of uplink beams for unscheduled uplink transmissions, or an unscheduled data indication indicating that the high-priority data is to be transmitted without an uplink grant.

Aspect 40: The method of aspect 39, further comprising: receiving a scheduling request for high-priority data to be transmitted to the base station, wherein the scheduling request is received in one of a plurality of scheduling request transmission occasions configured for the second UE, and wherein a time between any two consecutive scheduling request transmission occasions in the plurality of scheduling request transmission occasions is configured to be less than or equal to an acceptable latency for the high-priority data: and transmitting a high-priority uplink grant in response to the scheduling request, wherein the high-priority data is received based on the high-priority uplink grant.

Aspect 41: The method of aspect 39, wherein the unscheduled data indication includes one or more indication bits preconfigured for the second UE or a unique indication sequence associated with the second UE.

Aspect 42: The method of any of aspects 39 and/or 41, wherein the base station receives the unscheduled data indication, further comprising: canceling the one or more scheduled uplink transmissions from the first UE in response to the unscheduled data indication.

Aspect 43: The method of any of aspects 39 and/or 41, wherein the base station receives the unscheduled data indication, further comprising: reconfiguring an uplink transmission configuration for the one or more scheduled uplink transmissions in response to the unscheduled data indication, the uplink transmission configuration including at least one of an MCS, an uplink beam configuration, or a transmit power for the one or more scheduled uplink transmissions from the first UE, wherein the reconfigured uplink transmission configuration enables the base station to receive the high-priority data.

Aspect 44: The method of any of aspects 39 and/or 41, wherein the base station receives the high-priority data within a threshold time after the unscheduled data indication.

Aspect 45: The method of any of aspects 39 and/or 41, wherein the unscheduled data indication is received from the second UE, further comprising: transmitting at least one of an uplink MCS, a transmit power configuration, or an uplink beam configuration for transmission of the high-priority data in response to the unscheduled data indication, wherein the at least one of the uplink MCS, the transmit power configuration, or the uplink beam configuration enables the base station to receive the high-priority data.

Aspect 46: The method of aspect 39, further comprising: configuring a periodicity of a periodic uplink resource allocation associated with a configured grant for the high-priority data to be less than or equal to an acceptable latency for the high-priority data, wherein the high-priority data is received from the second UE in the periodic uplink resource allocation associated with the configured grant.

Aspect 47: The method of aspect 46, wherein the configured grant is associated with at least a second uplink beam of the first UE.

Aspect 48: The method of any of aspects 39 through 46, further comprising: transmitting a beam information message to at least the second UE indicating an association between an uplink beam used for the one or more scheduled uplink transmissions and the set of uplink beams, wherein the set of uplink beams is for the second UE or a group of UEs including the second UE.

Aspect 49: The method of any of aspects 39, 41, 42, 43, 44, 45, and/or 48, wherein the unscheduled data indication is received using at least one of a frequency division multiplexing (FDM) configuration, a space division multiplexing (SDM) configuration, or a transmit power that enables reception of the unscheduled data indication.

Aspect 50: An apparatus for wireless communication, comprising: a memory; and at least one processor coupled to the memory and configured to perform a method of any one of aspects 39 through 49.

Aspect 51: An apparatus for wireless communication comprising at least one means for performing a method of any one of aspects 39 through 49.

Aspect 52: A computer-readable medium storing computer executable code, the code when executed by a processor cause the processor to perform a method of any one of aspects 39 through 49.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:
1. A first apparatus for wireless communication, comprising:
   a memory; and
   at least one processor coupled to the memory and configured to:

receive a beam information message from a base station pairing a downlink beam for scheduled downlink transmissions and a set of uplink beams for unscheduled uplink transmissions, the set of uplink beams including two or more uplink beams for unscheduled uplink transmissions related to high-priority data, wherein the beam information message is a multicast group common downlink control information (DCI) that associates the set of uplink beams for unscheduled uplink transmissions with a group of apparatuses, including the first apparatus;

obtain high-priority data to be transmitted to the base station operating in a full-duplex mode; and transmit, to the base station while the base station performs one or more scheduled downlink transmissions on the downlink beam to the first apparatus or to a second apparatus, the high-priority data via an uplink beam from the set of uplink beams for unscheduled uplink transmissions.

2. The first apparatus of claim 1, wherein the at least one processor is further configured to:

transmit a scheduling request to obtain a high-priority uplink grant for transmission of the high-priority data, wherein the scheduling request is transmitted in one of a plurality of scheduling request transmission occasions using one or more resources for the scheduling request, and wherein a time between any two consecutive scheduling request transmission occasions in the plurality of scheduling request transmission occasions is configured to be less than or equal to an acceptable latency for the high-priority data; and receive a high-priority uplink grant in response to the scheduling request, wherein the high-priority data is transmitted using the high-priority uplink grant.

3. The first apparatus of claim 1, wherein the at least one processor transmits the high-priority data in a periodic uplink resource allocation, wherein a periodicity of the periodic uplink resource allocation is configured to be less than or equal to an acceptable latency for the high-priority data.

4. The first apparatus of claim 1, wherein, responsive to the first apparatus transmitting the high-priority data via the uplink beam from the set of uplink beams for unscheduled uplink transmissions, the base station performs one of:

cancels at least one downlink transmission of the one or more scheduled downlink transmissions; or reduces one or more of the modulation and coding scheme or transmit power of the at least one downlink transmission of the one or more scheduled downlink transmissions.

5. The first apparatus of claim 1, wherein the first apparatus transmits using the uplink beam for unscheduled transmissions while the base station transmits the one or more scheduled downlink transmissions to the second apparatus.

6. The first apparatus of claim 1, wherein the at least one processor is further configured to select the uplink beam from the set of uplink beams for unscheduled uplink transmissions.

7. The first apparatus of claim 1, wherein the at least one processor is further configured to receive an uplink beam configuration that indicates the uplink beam from the set of uplink beams for the unscheduled uplink transmission.

8. A method of wireless communication for a first user equipment (UE), comprising:

receiving a beam information message from a base station pairing a downlink beam for scheduled downlink transmissions and a set of uplink beams for unscheduled uplink transmissions, the set of uplink beams including two or more uplink beams for unscheduled uplink transmissions related to high-priority data, wherein the beam information message is a multicast group common downlink control information (DCI) that associates the set of uplink beams for unscheduled uplink transmissions with a group of UEs, including the first UE;

obtaining high-priority data to be transmitted to the base station operating in a full-duplex mode; and transmitting, to the base station while the base station performs one or more scheduled downlink transmissions on the downlink beam to the first UE or to a second UE, the high-priority data via an uplink beam from the set of uplink beams for unscheduled uplink transmissions.

9. The method of claim 8, further comprising:

transmitting a scheduling request to obtain a high-priority uplink grant for transmission of the high-priority data, wherein the scheduling request is transmitted in one of a plurality of scheduling request transmission occasions using one or more resources for the scheduling request, and wherein a time between any two consecutive scheduling request transmission occasions in the plurality of scheduling request transmission occasions is configured to be less than or equal to an acceptable latency for the high-priority data; and receiving the high-priority uplink grant in response to the scheduling request, wherein the high-priority data is transmitted using the high-priority uplink grant.

10. The method of claim 8, wherein the high-priority data is transmitted in a periodic uplink resource allocation, wherein a periodicity of the periodic uplink resource allocation is configured to be less than or equal to an acceptable latency for the high-priority data.

11. A first apparatus for wireless communication, comprising:

a memory; and at least one processor coupled to the memory and configured to:

receive a beam information message from a base station pairing an uplink beam for scheduled uplink transmissions and a set of uplink beams for unscheduled uplink transmissions, the set of uplink beams including two or more uplink beams for unscheduled uplink transmissions related to high-priority data, wherein the beam information message is a multicast group common downlink control information (DCI) that associates the set of uplink beams for unscheduled uplink transmissions with a group of apparatuses, including the first apparatus;

obtain high-priority data to be transmitted to the base station; and transmit, to the base station while the base station receives one or more scheduled uplink transmissions from the first apparatus or a second apparatus, using an uplink beam from the set of uplink beams for unscheduled uplink transmissions.

12. The first apparatus of claim 11, wherein the at least one processor is further configured to:

transmit a scheduling request to obtain a high-priority uplink grant for transmission of the high-priority data, wherein the scheduling request is transmitted in one of a plurality of scheduling request transmission occasions using one or more resources allocated for the scheduling request, and wherein a time between any two consecutive scheduling request transmission occasions in the plurality of scheduling request transmission occasions is configured to be less than or equal to an acceptable latency for the high-priority data; and receive the high-priority uplink grant in response to the scheduling request, wherein the high-priority data is transmitted using the high-priority uplink grant.

13. The first apparatus of claim 11, wherein the high-priority data is transmitted in a periodic uplink resource allocation overlapping with resources for scheduled uplink transmissions, wherein a periodicity of the periodic uplink resource allocation is configured to be less than or equal to an acceptable latency for the high-priority data.

14. The first apparatus of claim 11, wherein the unscheduled uplink transmissions are transmitted using at least one of a frequency division multiplexing (FDM) configuration, a space division multiplexing (SDM) configuration, or a transmit power that enables reception of the unscheduled uplink transmissions at the base station.

15. The first apparatus of claim 11, wherein the first apparatus includes a first antenna panel and a second antenna panel, wherein the at least one processor transmits the high-priority data from the first antenna panel concurrently with the one or more scheduled uplink transmissions from the second antenna panel.

16. The first apparatus of claim 11, wherein, responsive to the first apparatus transmitting the high-priority data via the uplink beam from a set of uplink beams for unscheduled uplink transmissions, one of the first apparatus or second apparatus one of:

cancels at least one scheduled uplink transmission of the one or more scheduled uplink transmissions; or reduces one or more of the modulation and coding scheme or transmit power of the at least one uplink transmission of the one or more scheduled uplink transmissions.

17. A method of wireless communication for a first user equipment (UE), comprising:

receiving a beam information message from a base station pairing an uplink beam for scheduled uplink transmissions and a set of uplink beams for unscheduled uplink transmissions, the set of uplink beams including two or more uplink beams for unscheduled uplink transmissions related to high-priority data, wherein the beam information message is a multicast group common downlink control information (DCI) that associates the set of uplink beams for unscheduled uplink transmissions with a group of UEs, including the first UE;

obtaining high-priority data to be transmitted to a base station; and transmitting, to the base station while the base station receives one or more scheduled uplink transmissions from the first UE or a second UE, using the uplink beam from the set of uplink beams for unscheduled uplink transmissions.

18. The method of claim 17, further comprising:

transmitting a scheduling request to obtain a high-priority uplink grant for transmission of the high-priority data, wherein the scheduling request is transmitted in one of a plurality of scheduling request transmission occasions using one or more resources allocated for the scheduling request, and wherein a time between any two consecutive scheduling request transmission occasions in the plurality of scheduling request transmission occasions is configured to be less than or equal to an acceptable latency for the high-priority data; and receiving the high-priority uplink grant in response to the scheduling request, wherein the high-priority data is transmitted using the high-priority uplink grant.

* * * * *